(12) United States Patent
Murata et al.

(10) Patent No.: US 11,982,917 B2
(45) Date of Patent: May 14, 2024

(54) LIQUID CRYSTAL PANEL AND LIQUID CRYSTAL DISPLAY DEVICE

(71) Applicant: Sharp Display Technology Corporation, Kameyama (JP)

(72) Inventors: Koji Murata, Kameyama (JP); Hiroshi Tsuchiya, Kameyama (JP); Takashi Satoh, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/882,249

(22) Filed: Aug. 5, 2022

(65) Prior Publication Data
US 2023/0101325 A1 Mar. 30, 2023

Related U.S. Application Data

(60) Provisional application No. 63/234,365, filed on Aug. 18, 2021.

(51) Int. Cl.
| | |
|---|---|
| *G02F 1/139* | (2006.01) |
| *G02F 1/13* | (2006.01) |
| *G02F 1/1335* | (2006.01) |
| *G02F 1/1337* | (2006.01) |
| *G02F 1/1343* | (2006.01) |

(Continued)

(52) U.S. Cl.
CPC .......... *G02F 1/1393* (2013.01); *G02F 1/1323* (2013.01); *G02F 1/133531* (2021.01); *G02F 1/133719* (2013.01); *G02F 1/133738* (2021.01); *G02F 1/134363* (2013.01);
(Continued)

(58) Field of Classification Search
None
See application file for complete search history.

(56) References Cited

U.S. PATENT DOCUMENTS

| | | | | |
|---|---|---|---|---|
| 5,612,803 A | * | 3/1997 | Yamada | G02F 1/133377 |
| | | | | 349/189 |
| 2002/0080311 A1 | * | 6/2002 | Tanada | G02F 1/1397 |
| | | | | 349/117 |

(Continued)

FOREIGN PATENT DOCUMENTS

| | | | |
|---|---|---|---|
| JP | 2002287151 A | * | 10/2002 |
| JP | 2008-111901 A | | 5/2008 |

(Continued)

*Primary Examiner* — Shan Liu
(74) *Attorney, Agent, or Firm* — ScienBiziP, P.C.

(57) ABSTRACT

The liquid crystal panel of the present invention sequentially includes: a first substrate including a first electrode; a first alignment film; a liquid crystal layer containing liquid crystal molecules having a positive anisotropy of dielectric constant; a second alignment film; and a second substrate including a second electrode, the liquid crystal molecules being homogeneously aligned with no voltage applied between the first electrode and the second electrode, a polar anchoring energy 2EA and an azimuthal anchoring energy 2EB of the second alignment film being smaller than a polar anchoring energy 1EA and an azimuthal anchoring energy 1EB of the first alignment film, respectively, the polar anchoring energy 2EA of the second alignment film being not greater than the azimuthal anchoring energy 2EB of the second alignment film.

24 Claims, 30 Drawing Sheets

(51) Int. Cl.
  *G02F 1/1347* (2006.01)
  *G02F 1/137* (2006.01)
(52) U.S. Cl.
  CPC ...... *G02F 1/134372* (2021.01); *G02F 1/1347* (2013.01); *G02F 1/13706* (2021.01)

(56) References Cited

U.S. PATENT DOCUMENTS

| | | |
|---|---|---|
| 2008/0117364 A1 | 5/2008 | Matsushima |
| 2009/0153780 A1* | 6/2009 | Takata ................ G02F 1/13471 349/161 |
| 2012/0160393 A1 | 6/2012 | Lamarque-Forget et al. |

FOREIGN PATENT DOCUMENTS

| | | | |
|---|---|---|---|
| JP | 2008-203565 A | | 9/2008 |
| JP | 2008-310271 A | | 12/2008 |
| JP | 2017083639 A | * | 5/2017 |
| JP | 2018-151438 A | | 9/2018 |
| WO | 2019/004433 A1 | | 1/2019 |

* cited by examiner

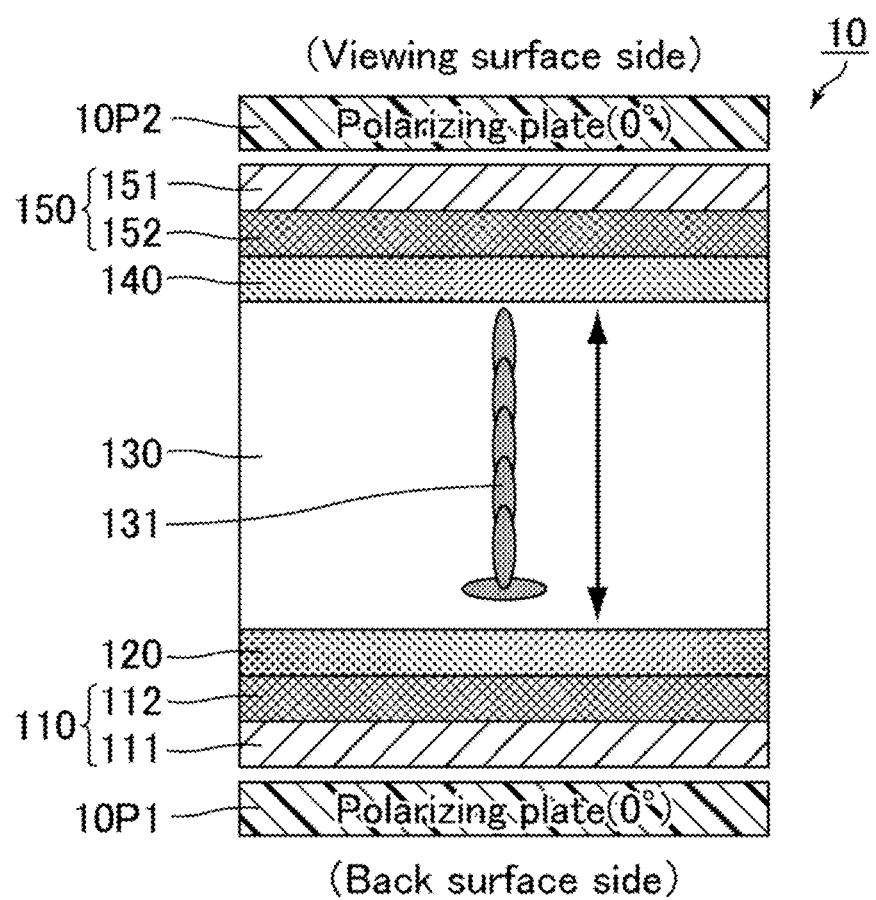

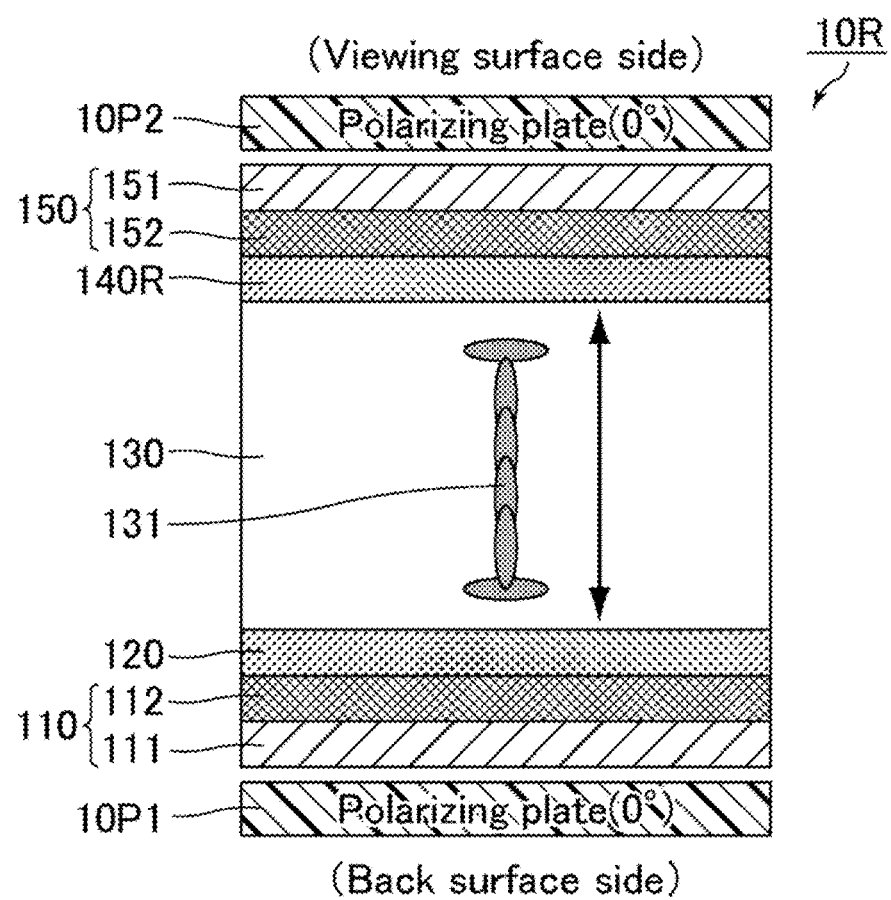

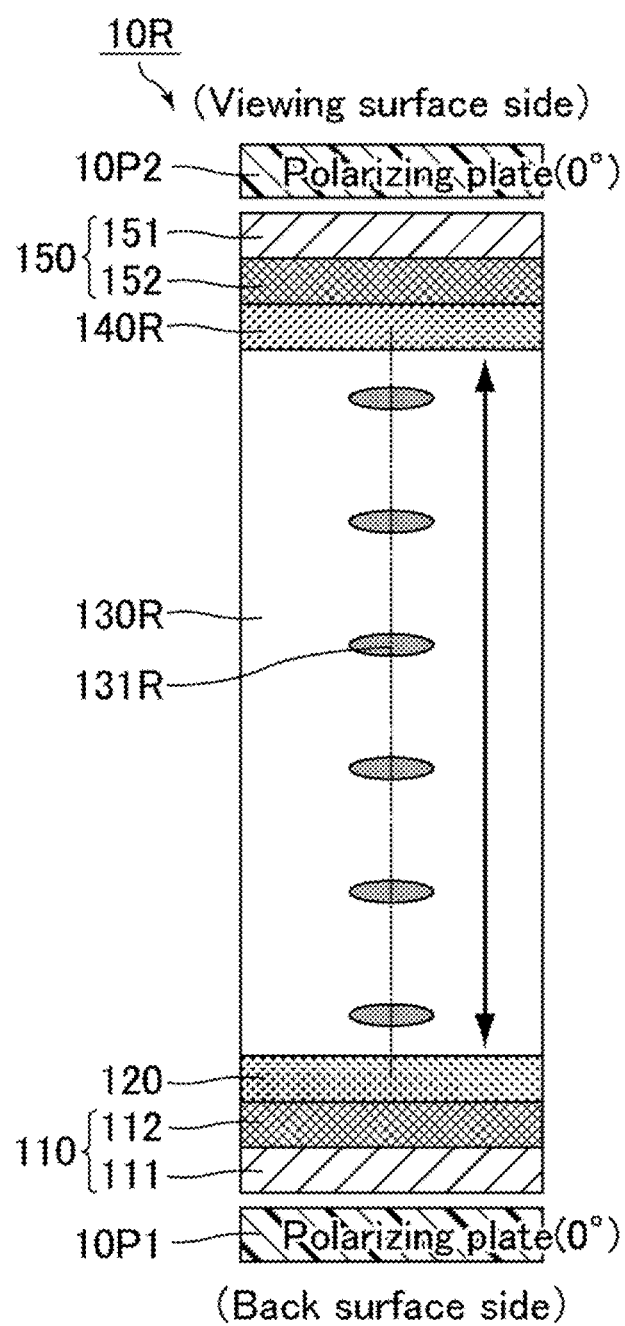

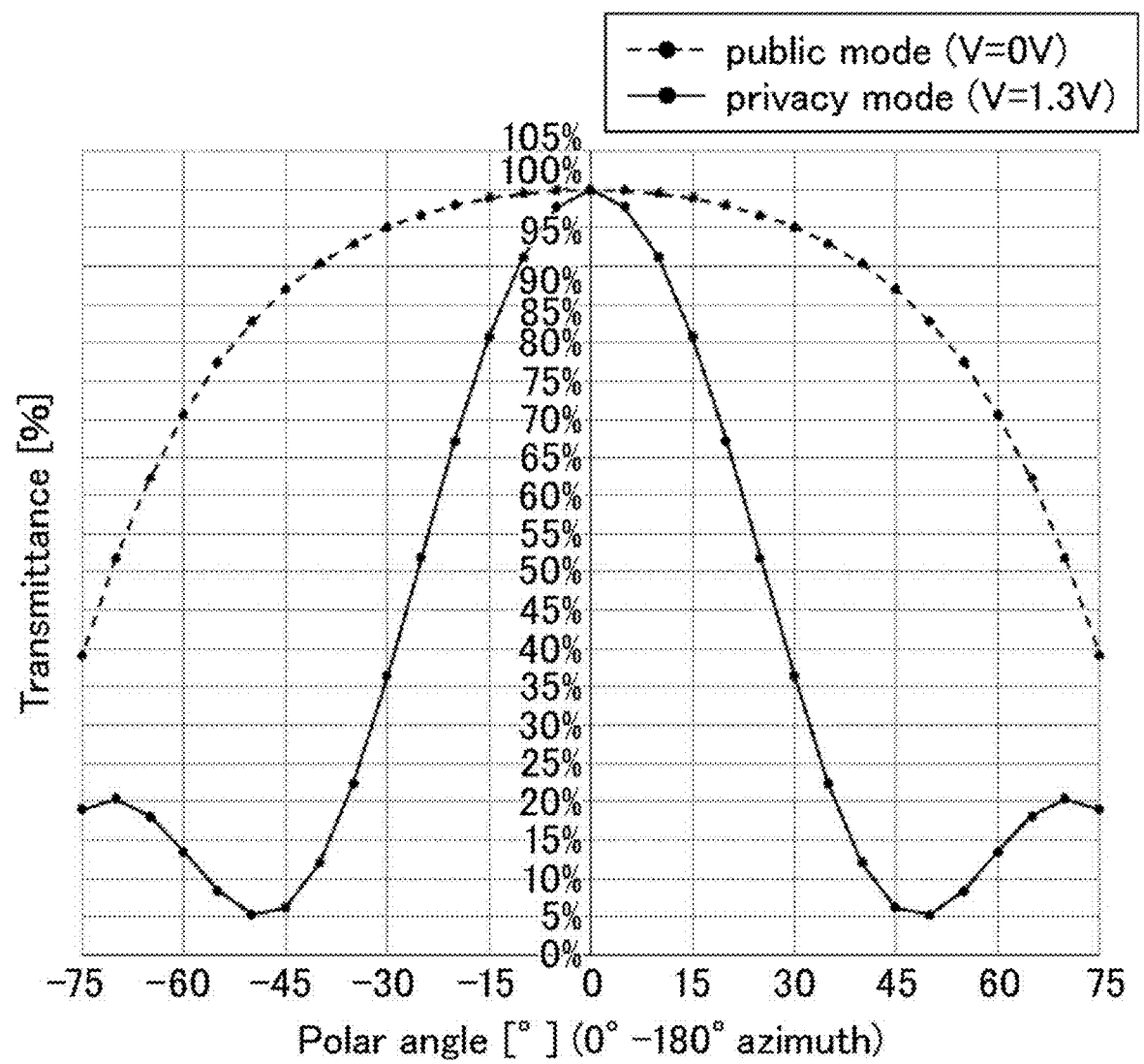

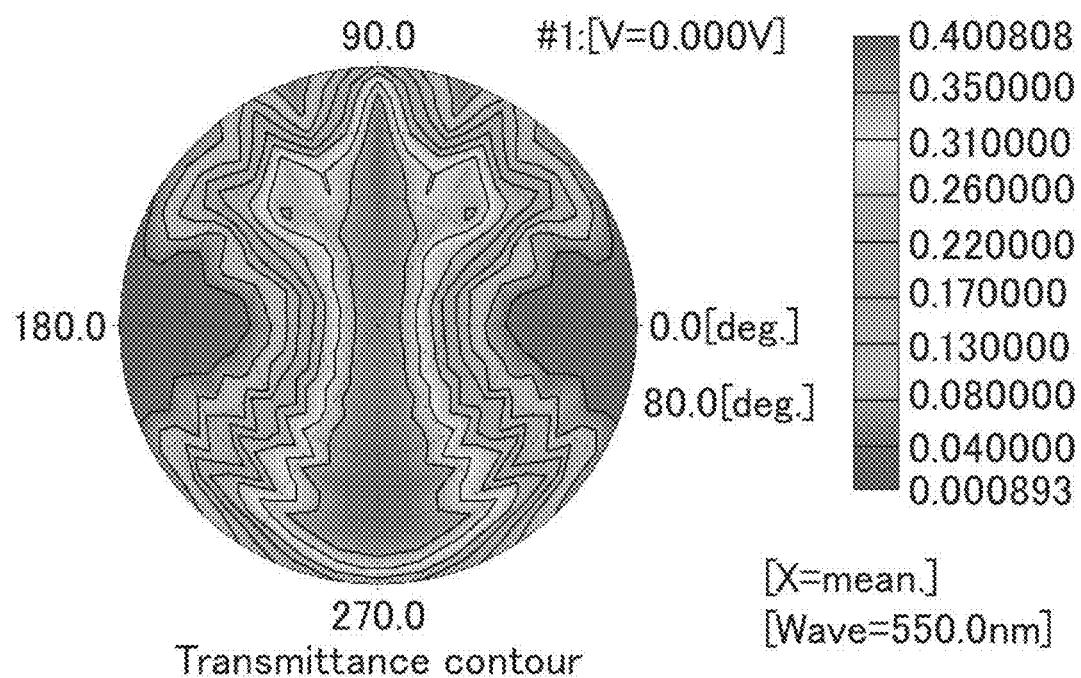

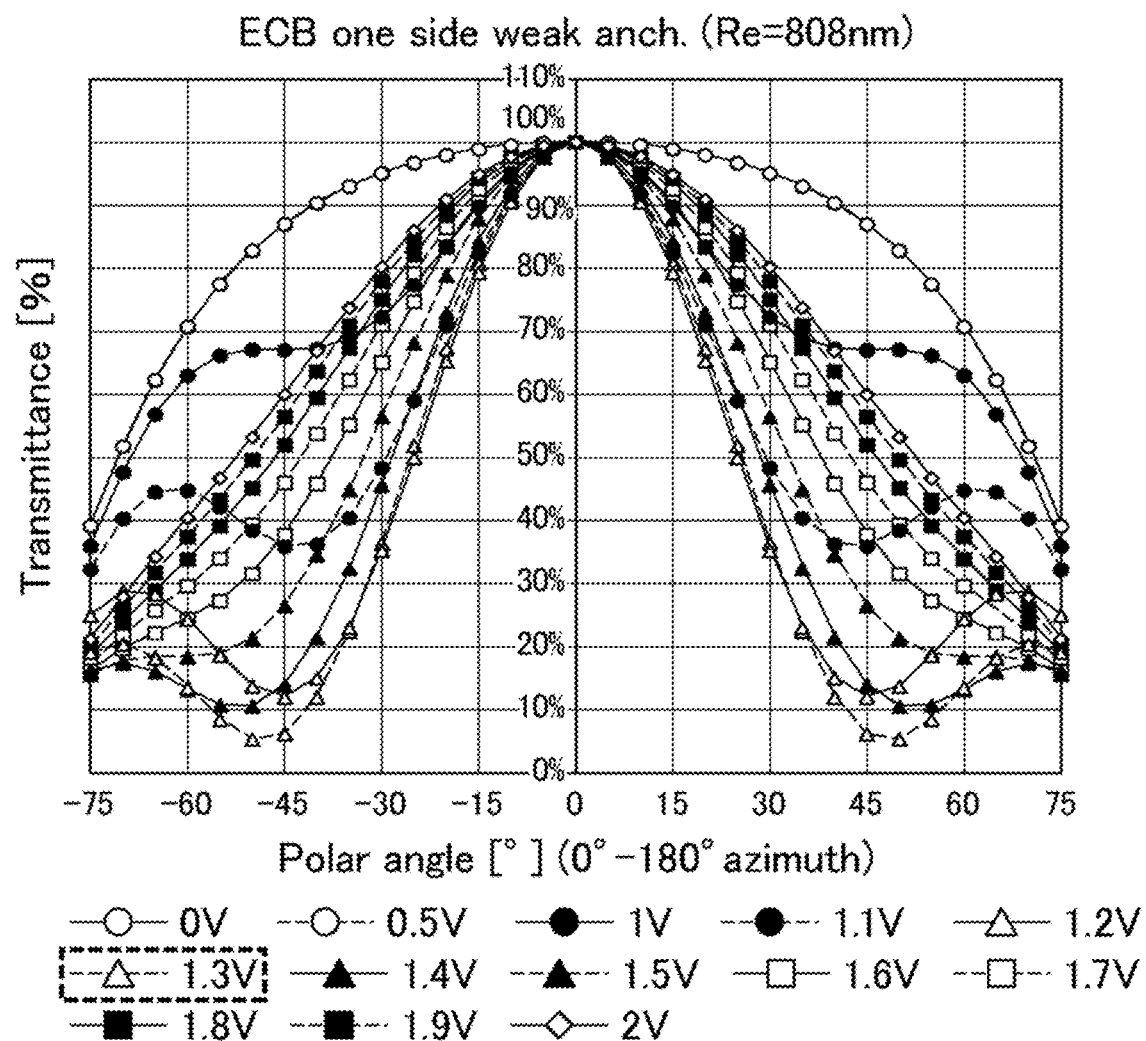

LIQUID CRYSTAL PANEL AND LIQUID CRYSTAL DISPLAY DEVICE

CROSS-REFERENCE TO RELATED APPLICATIONS

The present application claims priority under 35 U.S.C. § 119 to U.S. Provisional Patent Application No. 63/234,365 filed on Aug. 18, 2021, the contents of which are incorporated herein by reference in their entirety.

BACKGROUND OF THE INVENTION

Field of the Invention

The following disclosure relates to liquid crystal panels and liquid crystal display devices including the liquid crystal panels.

Description of Related Art

Liquid crystal panels are display panels utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the panel is controlled. Such liquid crystal panels have advantageous features such as thin profile, light weight, and low power consumption, and are therefore used in a variety of fields.

The alignment of liquid crystal molecules in a liquid crystal panel with no voltage applied is typically controlled by alignment films. An alignment film is obtained by, for example, applying a liquid crystal alignment agent to a substrate and performing an alignment treatment on the resulting film.

A technique related to alignment films disclosed in WO 2019/004433, for example, is a method of producing a zero-azimuthal surface anchoring film including a step of providing energy sufficient for polymerization of a radically polymerizable compound in a state where a liquid crystal composition containing a liquid crystal and the radically polymerizable compound is in contact with a radical generating film.

JP 2018-151438 A discloses a liquid crystal display device including a first substrate with a first alignment film formed thereon, a second substrate with a second alignment film formed thereon, and a liquid crystal layer, wherein at least one of the first alignment film or the second alignment film has a strong anchoring portion and a weak anchoring portion, the strong anchoring portion exhibits a stronger restraining force of keeping the liquid crystal molecules oriented in the initial alignment direction than the weak anchoring portion when supplied with an electric field, and the strong anchoring portion and the weak anchoring portion are mixed at a position where the strong anchoring portion and the weak anchoring portion overlap an electrode of a driving electrode layer and also at a position where the strong anchoring portion and the weak anchoring portion do not overlap an electrode of the driving electrode layer.

Studies to enhance the viewing angle characteristics of display devices have been made such that the same image can be observed regardless of whether the viewing angle range is narrow or wide. Meanwhile, a display method considered in terms of privacy protection is one that allows observation of an image in a narrow viewing angle range but makes the image difficult to observe in a wide viewing angle range.

A technique related to a liquid crystal panel used for such a display device is disclosed in JP 2008-203565 A, for example. JP 2008-203565 A discloses a viewing angle-controlling liquid crystal panel which, when placed on the front or back surface of a display panel, controls the viewing angle of an image displayed on the display panel, and includes a liquid crystal layer and pixels as units used in application of voltage to the liquid crystal layer. Linearly polarized light is to be incident on the liquid crystal layer. On the surface of the liquid crystal layer from which light is to be emitted is provided a polarizing plate that transmits only light components parallel to the polarization axis of the linearly polarized light incident on the liquid crystal layer, among the light components emitted from the liquid crystal layer. The liquid crystal molecules in the liquid crystal layer tilt in the direction parallel or perpendicular to the polarization axis of linearly polarized light incident on the liquid crystal layer when voltage is applied to the liquid crystal layer. The pixels are arranged in a matrix pattern.

BRIEF SUMMARY OF THE INVENTION

WO 2019/004433 and JP 2018-151438 A do not mention any examination on liquid crystal panels capable of controlling the viewing angle of an image displayed on a display panel when placed on the front or back surface of the display panel. JP 2008-203565 A discloses a liquid crystal display device including an electrically controlled birefringene (ECB) mode viewing angle-controlling liquid crystal panel and a display-providing liquid crystal panel and capable of operating in a narrow viewing angle mode by applying voltage to the ECB liquid crystal and capable of shifting into a wide viewing angle mode by applying no voltage to the ECB liquid crystal. This configuration can block light only at a certain polar angle (e.g., 45°) and achieves insufficient blocking of light due to the high transmittance at polar angles not smaller than the certain polar angle.

In response to the above issues, an object of the present invention is to provide a liquid crystal panel capable of sufficiently blocking light not only at a certain polar angle (e.g., 45°) but also at polar angles not smaller than the certain polar angle, and a liquid crystal display device including the liquid crystal panel.

(1) One embodiment of the present invention is directed to a liquid crystal panel sequentially including: a first substrate including a first electrode; a first alignment film; a liquid crystal layer containing liquid crystal molecules having a positive anisotropy of dielectric constant; a second alignment film; and a second substrate including a second electrode, the liquid crystal molecules being homogeneously aligned with no voltage applied between the first electrode and the second electrode, a polar anchoring energy 2EA and an azimuthal anchoring energy 2EB of the second alignment film being smaller than a polar anchoring energy 1EA and an azimuthal anchoring energy 1EB of the first alignment film, respectively, the polar anchoring energy 2EA of the second alignment film being not greater than the azimuthal anchoring energy 2EB of the second alignment film.

(2) In an embodiment of the present invention, the liquid crystal panel includes the structure (1), and the polar anchoring energy 2EA and the azimuthal anchoring energy 2EB of the second alignment film are each not greater than $1\times10^{-4}$ $J/m^2$.

(3) In an embodiment of the present invention, the liquid crystal panel includes the structure (1) or (2), and the second alignment film includes a polymer for an alignment film containing a silsesquioxane group.

(4) In an embodiment of the present invention, the liquid crystal panel includes the structure (1), (2), or (3), and further includes a first polarizing plate on a side of the first substrate remote from the liquid crystal layer and a second polarizing plate on a side of the second substrate remote from the liquid crystal layer, wherein a polarization axis of the first polarizing plate is parallel to a polarization axis of the second polarizing plate.

(5) In an embodiment of the present invention, the liquid crystal panel includes the structure (1), (2), (3), or (4), and the liquid crystal panel is in an ECB mode.

(6) In an embodiment of the present invention, the liquid crystal panel includes the structure (1), (2), (3), (4), or (5), and the liquid crystal layer has a maximum retardation And of not less than 600 nm and not more than 1600 nm with voltage applied between the first electrode and the second electrode.

(7) In an embodiment of the present invention, the liquid crystal panel includes the structure (1), (2), (3), (4), (5), or (6), and the liquid crystal layer has a thickness d of not smaller than 3 μm and not greater than 10 μm.

(8) Another embodiment of the present invention is directed to a liquid crystal display device including: the liquid crystal panel having the structure (1), (2), (3), (4), (5), (6), or (7) as a first liquid crystal panel; and a second liquid crystal panel different from the first liquid crystal panel.

(9) In an embodiment of the present invention, the liquid crystal display device includes the structure (8), and the second liquid crystal panel is in an IPS mode or an FFS mode.

(10) In an embodiment of the present invention, the liquid crystal display device includes the structure (8) or (9), the second liquid crystal panel includes, sequentially from a back surface side toward a viewing surface side, a third substrate, a third alignment film, a liquid crystal layer, a fourth alignment film, and a fourth substrate, and the fourth alignment film has an azimuthal anchoring energy of not greater than $1 \times 10^{-3}$ J/m$^2$.

The present invention can provide a liquid crystal panel capable of sufficiently blocking light not only at a certain polar angle (e.g., 45°) but also at polar angles not smaller than the certain polar angle, and a liquid crystal display device including the liquid crystal panel.

BRIEF DESCRIPTION OF THE DRAWINGS

FIG. 8B is a schematic cross-sectional view of the viewing angle-controlling liquid crystal panel of Example 1-1 with voltage applied.

FIG. 9B is a schematic cross-sectional view of the viewing angle-controlling liquid crystal panel of Comparative Example 1-1 with voltage applied.

FIG. 10B is a schematic cross-sectional view of the viewing angle-controlling liquid crystal panel of Comparative Example 2 with voltage applied.

FIG. 11 is a graph showing the polar angle dependence of transmittance measured using the viewing angle-controlling liquid crystal panel of Example 1-1 with no voltage applied and with voltage applied.

FIG. 15H is a graph showing the viewing angle dependence of white transmittance measured using the viewing angle-controlling liquid crystal panel of Comparative Example 4.

FIG. 16 is a graph showing the polar angle dependence of transmittance when the voltage applied to the viewing angle-controlling liquid crystal panel of Example 1-1 was varied.

DETAILED DESCRIPTION OF THE INVENTION

Hereinafter, embodiments of the present invention are described. The present invention is not limited to the following embodiments. The design may be modified as appropriate within the range satisfying the configuration of the present invention. In the following description, components having the same or similar functions in different drawings are commonly provided with the same reference sign so as to appropriately avoid repetition of description. The modes in the present invention may be combined as appropriate without departing from the spirit of the present invention.

[Definition of Terms]

The "viewing surface side" herein means the side closer to the screen (display surface) of the liquid crystal panel. The "back surface side" herein means the side farther from the screen (display surface) of the liquid crystal display device.

The "polar angle" herein means an angle formed by a direction in question (e.g., measurement direction) and the direction normal to the screen of the liquid crystal panel. The "azimuth" herein means the direction in question in a view projected onto the screen of the liquid crystal panel and is expressed as an angle (azimuthal angle) formed with the reference azimuth. The reference azimuth (0°) is set to the horizontally right direction on the screen of the liquid crystal panel. The angle and the azimuthal angle measure positive in the counterclockwise direction and measure negative in the clockwise direction. The counterclockwise direction and the clockwise direction are both the rotational directions when the screen of the liquid crystal panel is viewed from the viewing surface side (front). The angle represents a value measured in a plan view of the liquid crystal panel. Two straight lines (including axes, directions, and ridgelines) being perpendicular to each other mean that they are perpendicular to each other in a plan view of the liquid crystal panel.

(Embodiment 1)

Figure 1:
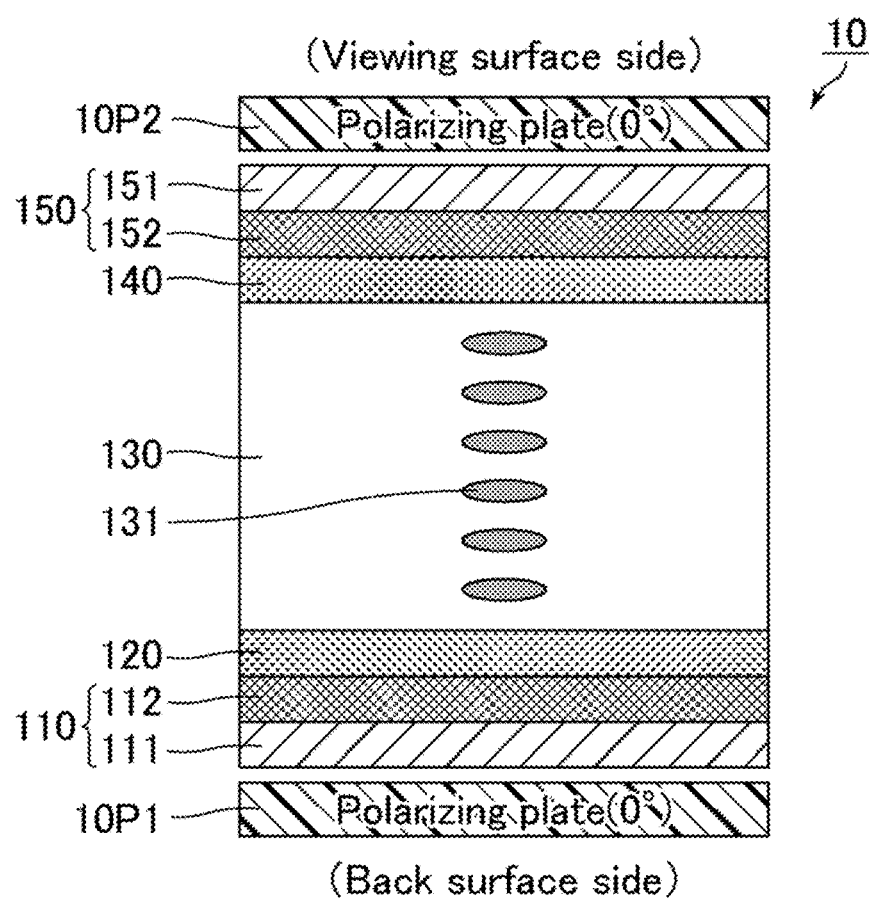
FIG. 1 is a schematic cross-sectional view of an example of a viewing angle-controlling liquid crystal panel of Embodiment 1 with no voltage applied.
Figure 2:
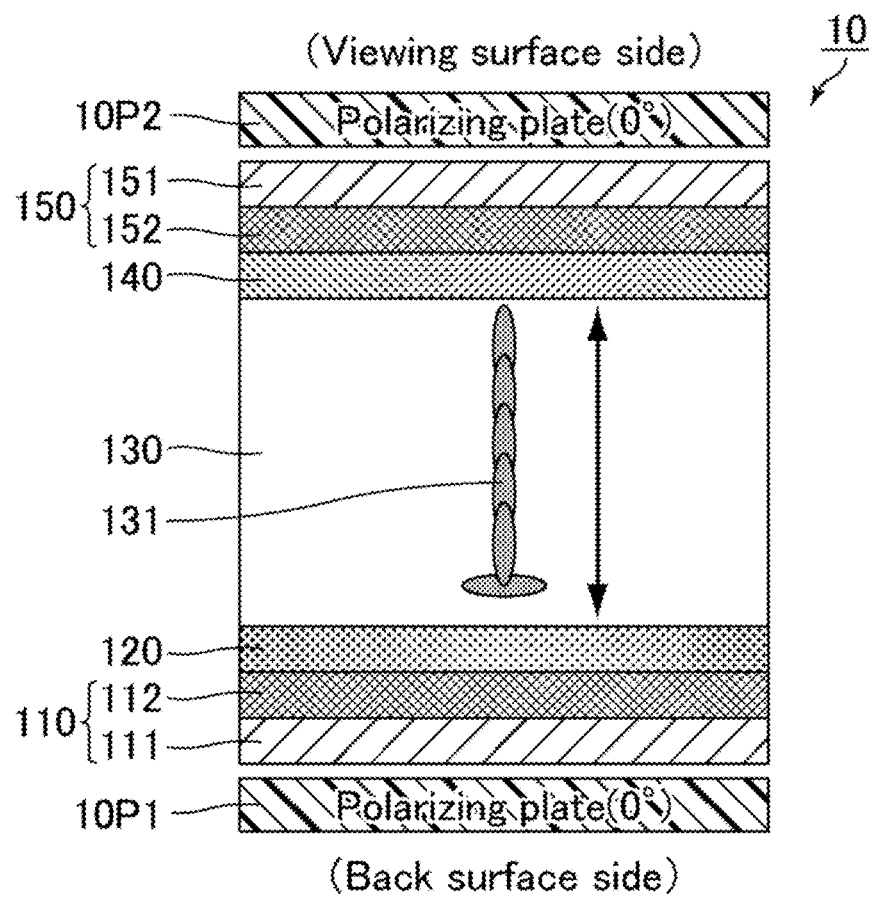
FIG. 2 is a schematic cross-sectional view of an example of the viewing angle-controlling liquid crystal panel of Embodiment 1 with voltage applied.

FIG. 1 is a schematic cross-sectional view of an example of a viewing angle-controlling liquid crystal panel of Embodiment 1 with no voltage applied. FIG. 2 is a schematic cross-sectional view of an example of the viewing angle-controlling liquid crystal panel of Embodiment 1 with voltage applied. FIG. 1 and FIG. 2 are each a schematic cross-sectional view of a single pixel. As shown in FIG. 1 and FIG. 2, a viewing angle-controlling liquid crystal panel 10 as the liquid crystal panel of the present embodiment sequentially includes a first substrate 110 including a first electrode 112; a first alignment film 120; a liquid crystal layer 130 containing liquid crystal molecules 131 having a positive anisotropy of dielectric constant; a second alignment film 140; and a second substrate 150 including a second electrode 152. With no voltage applied between the first electrode 112 and the second electrode 152, the liquid crystal molecules 131 are homogeneously aligned. This mode enables transmission of backlight illumination in a region ranging from small to large polar angles with no voltage applied when a backlight is placed on the back surface side of the viewing angle-controlling liquid crystal panel 10, thus achieving a wide viewing angle mode (public mode). Specifically, light from the backlight can be transmitted in a region ranging from small to large polar angles with no voltage applied when a first polarizing plate 10P1 and the backlight are sequentially placed on the side of the first substrate 110 remote from the liquid crystal layer 130 (i.e., back surface side), a second polarizing plate 10P2 is placed on the side of the second substrate 150 remote from the liquid crystal layer 130 (i.e., viewing surface side), and the polarization axis of the first polarizing plate 10P1 and the polarization axis of the second polarizing plate 10P2 are parallel to each other.

Also, in the viewing angle-controlling liquid crystal panel 10 of the present embodiment, a polar anchoring energy 2EA and an azimuthal anchoring energy 2EB of the second alignment film 140 are smaller than a polar anchoring energy 1EA and an azimuthal anchoring energy 1EB of the first alignment film 120, respectively, and the polar anchoring energy 2EA of the second alignment film 140 is not greater than the azimuthal anchoring energy 2EB of the second alignment film 140. This mode can vertically align the liquid crystal molecules 131 except for those in the vicinity of the first alignment film 120 as shown in FIG. 2 with voltage applied between the first electrode 112 and the second electrode 152 when the backlight is placed on the back surface side of the viewing angle-controlling liquid crystal panel 10. Thus, the panel can sufficiently block light from the backlight not only at a certain polar angle (e.g., polar angle of 45°) but also at polar angles not smaller than the certain polar angle (e.g., polar angles of 60° to 75°) in a narrow viewing angle mode (privacy mode).

The liquid crystal display devices of WO 2019/004433 and JP 2018-151438 A are in-plane switching (IPS) mode liquid crystal display devices each including a pair of electrodes on one of the pair of substrates. Meanwhile, the viewing angle-controlling liquid crystal panel 10 of the present embodiment includes the first electrode 112 in the first substrate 110 and the second electrode 152 in the second substrate 150, and thus has a structure different from the devices in WO 2019/004433 and JP 2018-151438 A. WO 2019/004433 and JP 2018-151438 A also lack consideration on sufficient blocking of light from the backlight not only at a certain polar angle (e.g., 45°) but also at polar angles not smaller than the certain polar angle.

The liquid crystal display device of JP 2008-203565 A has a structure in which a viewing angle-controlling liquid crystal panel and a display-providing liquid crystal panel both in the electrically controlled birefringence (ECB) mode are overlaid with each other. The liquid crystal display device of JP 2008-203565 A can switch between a narrow viewing angle mode achieved by applying voltage to the viewing angle-controlling liquid crystal panel and a wide viewing angle mode achieved by applying no voltage to the viewing angle-controlling liquid crystal panel. JP 2008-203565 A, however, does not mention the anchoring energy of the alignment films and includes no examinations on sufficient blocking of light from the backlight not only at a certain polar angle (e.g., 45°) but also at the polar angles not smaller than the certain polar angle.

The present embodiment is described in detail below.

The viewing angle-controlling liquid crystal panel 10 of the present embodiment is an ECB mode liquid crystal panel utilizing a nematic liquid crystal having a positive anisotropy of dielectric constant. The viewing angle-controlling liquid crystal panel 10 can change the voltage to be applied between the first electrode 112 and the second electrode 152 to change the retardation in the liquid crystal layer 130, thus controlling transmission and blocking of light in the liquid crystal layer 130.

Figure 3:
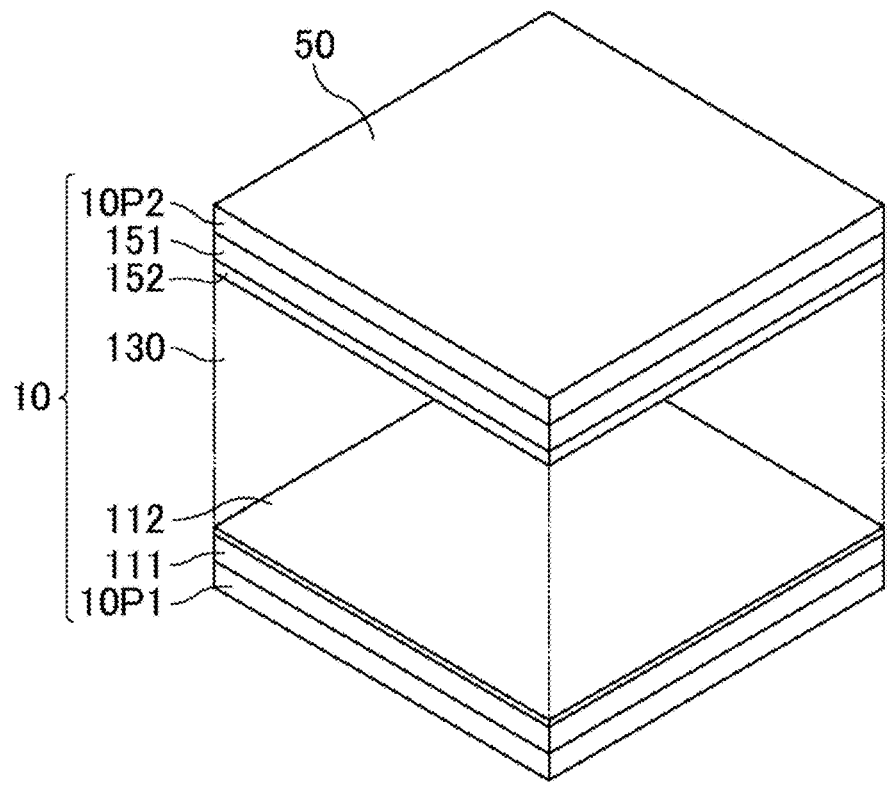
FIG. 3 is a schematic perspective view of the viewing angle-controlling liquid crystal panel of Embodiment 1.
Figure 4:
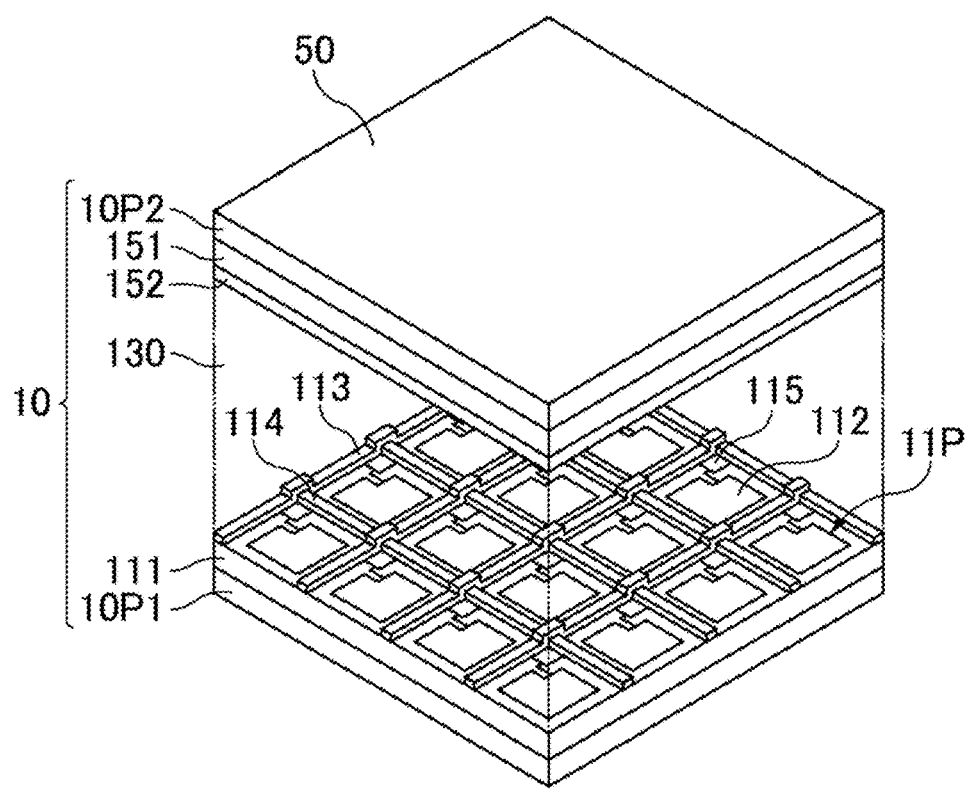
FIG. 4 is a schematic perspective view of a viewing angle-controlling liquid crystal panel of a modified example of Embodiment 1.

FIG. 3 is a schematic perspective view of the viewing angle-controlling liquid crystal panel of Embodiment 1. The first alignment film 120 and the second alignment film 140 are omitted in FIG. 3. As shown in FIG. 1 to FIG. 3, the viewing angle-controlling liquid crystal panel 10 of the present embodiment includes, sequentially from the back surface side toward the viewing surface side, the first polarizing plate 10P1, the first substrate 110, the first alignment film 120, the liquid crystal layer 130 containing the liquid crystal molecules 131, the second alignment film 140, the second substrate 150, and the second polarizing plate 10P2. The first substrate 110 includes a first support substrate 111 and the first electrode 112. The second substrate 150 includes a second support substrate 151 and the second electrode 152.

The viewing angle-controlling liquid crystal panel 10 is a passive liquid crystal panel which is passively driven. Similar to a typical passive liquid crystal panel, the first substrate 110 of the viewing angle-controlling liquid crystal panel 10 includes the first electrode 112 as a solid electrode covering the entire surface of a screen 50, and the second substrate 150 includes the second electrode 152 as a solid electrode covering the entire surface of the screen 50. This mode enables switching between the public mode and the privacy mode throughout the screen 50.

Examples of the first support substrate 111 and the second support substrate 151 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The first electrode 112 and the second electrode 152 may be transparent electrodes that can be formed from, for example, a transparent conductive material such as indium tin oxide (ITO), indium zinc oxide (IZO), zinc oxide (ZnO), or tin oxide (SnO) or an alloy of any of these materials.

The first alignment film 120 and the second alignment film 140 control the initial alignment azimuth for the liquid crystal molecules 131 with no voltage applied and the polar angle (pre-tilt angle) of the liquid crystal molecules 131 with no voltage applied. The first alignment film 120 and the second alignment film 140 may be horizontal alignment films or vertical alignment films. In order to increase the transmittance with no voltage applied, the first alignment film 120 and the second alignment film 140 are preferably horizontal alignment films.

A horizontal alignment film, when provided to a substrate in a liquid crystal display device, exerts an alignment control force of aligning the liquid crystal molecules in the liquid crystal layer substantially horizontally thereto, with no voltage applied to the liquid crystal layer. A vertical alignment film, when provided to a substrate in a liquid crystal display device, exerts an alignment control force of aligning the liquid crystal molecules in the liquid crystal layer substantially vertically thereto, with no voltage applied to the liquid crystal layer.

The expression "substantially horizontally" means that the pre-tilt angle is not smaller than 0° and not greater than 10°, preferably not smaller than 0° and not greater than 5°, more preferably not smaller than 0° and not greater than 2°. The expression "substantially vertically" means that the pre-tilt angle is not smaller than 83° and not greater than 90°, preferably not smaller than 85° and not greater than 90°, more preferably not smaller than 87.5° and not greater than 88.0°. The "pre-tilt angle" herein represents a tilt angle of a liquid crystal molecule (i.e., angle formed by the long axis of the liquid crystal molecule) from the direction parallel to the substrate surface having an alignment film formed thereon, with the angle parallel to the substrate surface measuring 0° and the angle of the line normal to the substrate surface measuring 90°.

The polar anchoring energy 2EA and the azimuthal anchoring energy 2EB of the second alignment film 140 are respectively smaller than the polar anchoring energy 1EA and the azimuthal anchoring energy 1EB of the first alignment film 120, and the polar anchoring energy 2EA of the second alignment film 140 is not greater than the azimuthal anchoring energy 2EB of the second alignment film 140. In other words, the polar anchoring energy 2EA of the second alignment film 140 is smaller than the polar anchoring energy 1EA of the first alignment film 120, the azimuthal anchoring energy 2EB of the second alignment film 140 is smaller than the azimuthal anchoring energy 1EB of the first alignment film 120, and the polar anchoring energy 2EA of the second alignment film 140 is not greater than the azimuthal anchoring energy 2EB of the second alignment film 140.

The anchoring energy is an index of the interaction between the alignment film and the liquid crystal molecules, and is divided into an azimuthal anchoring energy which restricts the rotation of the liquid crystal molecules in the plane of the alignment film and a polar anchoring energy which restricts the rise of the liquid crystal molecules from the alignment film surface, depending on the interaction between the alignment film and the liquid crystal molecules. The azimuthal anchoring energy and the polar anchoring energy used as indices can each quantitatively represent the degree of restriction that an alignment film places on the liquid crystal molecules. A greater anchoring energy shows a higher degree of interaction between the alignment film and the liquid crystal molecules.

Hereinafter, an alignment film having a polar anchoring energy and an azimuthal anchoring energy of not greater than $1 \times 10^{-4}$ J/m$^2$ is also referred to as a weak anchoring film or a slippery alignment film, while an alignment film having a polar anchoring energy and an azimuthal anchoring energy of greater than $1 \times 10^{-4}$ J/m$^2$ is also referred to as a strong anchoring film. An alignment film having a polar anchoring energy of not greater than $1 \times 10^{-4}$ J/m$^2$ is also referred to as a polar weak anchoring film, while an alignment film having a polar anchoring energy of greater than $1 \times 10^{-4}$ J/m$^2$ is also referred to as a polar strong anchoring film. An alignment film having an azimuthal anchoring energy of not greater than $1 \times 10^{-4}$ J/m$^2$ is also referred to as a azimuthal weak anchoring film, while an alignment film having an azimuthal anchoring energy of greater than $1 \times 10^{-4}$ J/m$^2$ is also referred to as an azimuthal strong anchoring film.

The polar anchoring energy and the azimuthal anchoring energy can be measured by a typical method such as a method utilizing electric field application or a method utilizing rotating magnetic fields. The method utilizing electric field application is described below.

First, a method of measuring the polar anchoring energy of an alignment film by the method utilizing electric field application is described. The alignment film whose anchoring energy is to be measured is simply referred to as an alignment film to be measured below. A liquid crystal cell (hereinafter, also referred to as a "both side-solid electrode cell") is prepared which includes a first substrate having a solid ITO electrode, the alignment film to be measured, a liquid crystal layer, the alignment film to be measured, and a second substrate having a solid ITO electrode. Voltage is applied between the paired solid ITO electrodes to generate a vertical electric field in the liquid crystal layer and then measure the inclination (dT/dV) of the rise of the voltage-relative transmittance (V-T) curve, so that the anchoring energy in the polar angle direction (polar anchoring energy) can be determined. The inclination dT/dV of the both side-solid electrode cell when the alignment films to be measured are each an azimuthal strong anchoring film as well as a polar strong anchoring film, i.e., the inclination dT/dV of the both side-solid electrode cell including an alignment film functioning as an azimuthal strong anchoring film as well as a polar strong anchoring film on each substrate, is smaller than that of a both side-solid electrode cell when the alignment films to be measured are polar weak anchoring films, i.e., a both side-solid electrode cell including a polar weak anchoring film on each substrate.

Next, a method of measuring the azimuthal anchoring energy of an alignment film by a method utilizing electric field application is described. A liquid crystal cell (hereinafter, also referred to as an IPS electrode cell) is prepared which includes a first substrate including a pair of IPS electrodes that are provided in the same electrode layer such that their comb electrodes fit each other, the alignment film to be measured, a liquid crystal layer, an alignment film functioning as an azimuthal strong anchoring film as well as a polar strong anchoring film, and a second substrate. Voltage is applied between the paired IPS electrodes to generate a horizontal electric field in the liquid crystal layer and then measure the inclination (dT/dV) of the rise of the voltage-relative transmittance (V-T) curve, so that the anchoring energy in the azimuthal angle direction (azimuthal anchoring energy) can be determined. The inclination dT/dV of the IPS electrode cell when the alignment films to be measured are each an azimuthal strong anchoring film as well as a polar strong anchoring film, i.e., the inclination dT/dV of the IPS electrode cell including an alignment film functioning as an azimuthal strong anchoring film as well as a polar strong anchoring film on each substrate, is smaller than that of an IPS electrode cell when the alignment film to be measured is an azimuthal weak anchoring film, i.e., an IPS electrode cell including an azimuthal weak anchoring film on the first substrate and an alignment film functioning as an azimuthal strong anchoring film as well as a polar strong anchoring film on the second substrate.

The second alignment film 140 preferably has a polar anchoring energy 2EA and an azimuthal anchoring energy 2EB of not greater than $1 \times 10^{-4}$ J/m$^2$. In other words, the second alignment film 140 is preferably a weak anchoring film. This mode enables more effective blocking of light from the backlight at large polar angles (e.g., polar angles of 60° to 75°) with voltage applied when the backlight is placed on the back surface side of the viewing angle-controlling liquid crystal panel 10. The second alignment film 140 more preferably has a polar anchoring energy 2EA and an azimuthal anchoring energy 2EB of not greater than $1 \times 10^{-5}$ J/m$^2$, still more preferably not greater than $1 \times 10^{-7}$ J/m$^2$.

The lower limit of the polar anchoring energy 2EA and the azimuthal anchoring energy 2EB of the second alignment film 140 is not limited. The second alignment film 140 has a polar anchoring energy 2EA and an azimuthal anchoring energy 2EB of, for example, $1 \times 10^{-9}$ J/m$^2$.

Provision of a strong anchoring film on each side of an ECB mode liquid crystal layer containing positive liquid crystal molecules results in insufficient blocking of light with voltage applied. Due to the transmittance control based on the retardation adjustment by vertical electric field application, the device can block light only at a certain polar angle (e.g., 45°) and insufficiently blocks light at polar angles greater than the certain polar angle due to an increased transmittance. Also, provision of a strong anchoring film on each side of a hybrid-aligned nematic (HAN) mode liquid crystal layer containing negative liquid crystal molecules results in sufficient blocking of light at polar angles not smaller than a certain polar angle (e.g., 45°) only when the liquid crystal layer provides a high retardation. This structure, however, requires negative liquid crystal molecules providing a high Δn and a cell thickness (thickness of the liquid crystal layer) d of not smaller than 20 μm, thus lacking mass productivity.

The polar anchoring energy 2EA of the second alignment film 140 is preferably not less than $10^{-3}$ times and not more than 1 times the azimuthal anchoring energy 2EB of the second alignment film 140. This mode enables more effective blocking of light from the backlight at large polar angles (e.g., polar angles of 60° to 75°) with voltage applied when the backlight is placed on the back surface side of the viewing angle-controlling liquid crystal panel 10. The polar anchoring energy 2EA of the second alignment film 140 is more preferably not less than $10^{-2}$ times and not more than 1 times, still more preferably not less than $10^{-1}$ times and not more than 1 times, the azimuthal anchoring energy 2EB of the second alignment film 140.

The polar anchoring energy 1EA and the azimuthal anchoring energy 1EB of the first alignment film 120 are not limited as long as they are respectively greater than the polar anchoring energy 2EA and the azimuthal anchoring energy 2EB of the second alignment film 140. In other words, the polar anchoring energy 1EA of the first alignment film 120 is not limited as long as it is greater than the polar anchoring energy 2EA of the second alignment film 140, and the azimuthal anchoring energy 1EB of the first alignment film 120 is not limited as long as it is greater than the azimuthal anchoring energy 2EB of the second alignment film 140. The polar anchoring energy 1EA and the azimuthal anchoring energy 1EB of the first alignment film 120 may be the same as or different from each other.

The polar anchoring energy 1EA and the azimuthal anchoring energy 1EB of the first alignment film 120 are each preferably greater than $1 \times 10^{-4}$ J/m$^2$. In other words, the first alignment film 120 is preferably a strong anchoring film. This mode stabilizes the alignment control force exerted by the first alignment film 120 to the liquid crystal molecules 131, achieving uniform alignment (homogeneous alignment) of the liquid crystal molecules 131 in the viewing angle-controlling liquid crystal panel 10. The upper limit of the polar anchoring energy 1EA and the azimuthal anchoring energy 1EB of the first alignment film 120 is not limited. The first alignment film 120 has a polar anchoring energy 1EA and an azimuthal anchoring energy 1EB of, for example, not greater than $1 \times 10^3$ J/m$^2$.

The polar anchoring energy 2EA of the second alignment film 140 is preferably not less than $10^{-10}$ times and less than 1 times the polar anchoring energy 1EA of the first alignment film 120. This mode enables more effective blocking of light from the backlight at large polar angles (e.g., polar angles of 60° to 75°) with voltage applied when the backlight is placed on the back surface side of the viewing angle-controlling liquid crystal panel 10. The polar anchoring energy 2EA of the second alignment film 140 is more preferably not less than $10^{-9}$ times and less than 1 times, still more preferably not less than $10^{-8}$ times and less than 1 times, the polar anchoring energy 1EA of the first alignment film 120.

The azimuthal anchoring energy 2EB of the second alignment film 140 is preferably not less than $10^{-10}$ times and less than 1 times the azimuthal anchoring energy 1EB of the first alignment film 120. This mode enables more effective blocking of light from the backlight at large polar angles (e.g., polar angles of 60° to 75°) with voltage applied when the backlight is placed on the back surface side of the viewing angle-controlling liquid crystal panel 10. The azimuthal anchoring energy 2EB of the second alignment film 140 is more preferably not less than $10^{-9}$ times and less than 1 times, still more preferably not less than $10^{-8}$ times and less than 1 times, the azimuthal anchoring energy 1EB of the first alignment film 120.

A strong anchoring film is formed by alignment treatment. A weak anchoring film is formed by performing alignment treatment or without alignment treatment. Specifically, the strong anchoring film may be a rubbed alignment film on which the rubbing treatment has been performed or a photoalignment film on which the photoalignment treatment has been performed. The weak anchoring film may be a rubbed alignment film, a photoalignment film, or an untreated alignment film on which no alignment treatment has been performed. For example, the polar anchoring energy and the azimuthal anchoring energy can be reduced by selecting the conditions including the monomers to induce weak anchoring, the composition ratio between the liquid crystal material and the monomers to induce weak anchoring, and the process for producing a liquid crystal panel (polymer sustained alignment (PSA) conditions).

A rubbed alignment film may be obtained by, for example, forming on a substrate a film of an alignment film material containing a polymer for a rubbed alignment film, rotating a roller wrapped with cloth formed from a material such as rayon or cotton at a constant rotating speed while keeping a constant distance between the roller and the substrate, and rubbing the surface of the film containing the polymer for a rubbed alignment film in a predetermined direction (rubbing method). Changing the conditions of the rubbing treatment can adjust the anchoring energy value(s) of the alignment film and thus can provide a strong anchoring film and a weak anchoring film.

An example of the polymer for a rubbed alignment film is polyimide. The polymer for a rubbed alignment film contained in the rubbed alignment film may be one kind or two kinds or more.

The photo-alignment film can be obtained by, for example, forming on a substrate a film of an alignment film material containing a photo-alignment polymer containing a photo-functional group, irradiating the film with polarized ultraviolet light so as to give anisotropy on the surface of the film containing the photo-alignment polymer (photo-alignment method). Changing the conditions of the photo-alignment treatment and the material structure and thereby adjusting the anchoring energy value(s) of the alignment film can provide a strong anchoring film and a weak anchoring film.

Examples of the photo-alignment polymer include photo-alignment polymers containing at least one photo-functional group selected from the group consisting of cyclobutane, azobenzene, chalcone, cinnamate, coumarin, stilbene, phenol ester, and phenyl benzoate groups. The photo-functional group means one that can undergo a structural change such as photodimerization (formation of dimers), photoisomerization, photo-Fries rearrangement, and photolysis (cleavage) when irradiated with light (electromagnetic waves) such as ultraviolet rays or visible light (preferably polarized light, more preferably polarized ultraviolet rays, particularly preferably linearly polarized ultraviolet rays), and thereby exhibit an ability of controlling the alignment of liquid crystal molecules. The photo-functional group contained in the photo-alignment polymer may be located in the main chain, in a side chain, or in both of the main chain and a side chain of the polymer. The photo-alignment polymer contained in the photo-alignment layer may be one kind or two kinds or more.

The photo-alignment polymer may cause any type of photo-reaction and preferred examples of the polymer include a photolysis polymer, a photo-rearranging polymer (preferably, a photo-Fries rearranging polymer), a photoisomerizable polymer, a photodimerizable polymer, and a photo-crosslinking polymer. Any of these may be used alone or in combination of two or more thereof. In terms of the alignment stability, particularly preferred among these are a photolysis polymer having a reaction wavelength (main sensitive wavelength) around 254 nm and a photo-rearranging polymer having a reaction wavelength (main sensitive wavelength) around 254 nm. Also preferred are a photoisomerizable polymer containing a photo-functional group in a side chain and a photodimerizable polymer containing a photo-functional group in a side chain.

The photo-alignment polymer may contain any main chain structure, and suitable examples of the main chain structure include a polyamic acid structure, a polyimide structure, a poly(meth)acrylic acid structure, a polysiloxane structure, a polyethylene structure, a polystyrene structure, and a polyvinyl structure.

The untreated alignment film may be obtained by, for example, forming on a substrate a film of an alignment film material containing a polymer for an alignment film. Examples of the polymer for an alignment film include polyimide and polyhexyl methacrylate. The polymer for an alignment film contained in the untreated alignment layer may be one kind or two kinds or more.

Preferred examples of the polymer for an alignment film contained in the untreated alignment film include polyalkylene oxides such as polyethylene glycol and polypropylene glycol as well as polyimide and polyhexyl methacrylate.

The first alignment film 120 contains a first polymer for an alignment film. The first polymer for an alignment film contains, for example, at least one structure selected from a polyamic acid structure, a polyimide structure, a polyamide structure, and a polysiloxane structure in its main chain. The first alignment film 120 may be a rubbed alignment film or a photoalignment film. The polyimide is obtained by imidization of a polyamic acid through hydrolyzation and/or cyclization of carboxy groups in an amic acid (amide acid) in the polyamic acid by heating or any other process. Herein, a polyamic acid having an imidization ratio of 50% or higher is referred to as a polyimide.

The second alignment film 140 contains a second polymer for an alignment film as the polymer for an alignment film. The second polymer for an alignment film contains, for example, at least one structure selected from a polyamic acid structure, a polyimide structure, and a polysiloxane structure in its main chain.

The second polymer for an alignment film preferably contains a silsesquioxane group. This mode can reduce the polar anchoring energy of the alignment film to not greater than $1 \times 10^{-4}$ J/m², for example. This mode thus enables more effective blocking of light from the backlight at large polar angles with voltage applied when the backlight is placed on the back surface side of the viewing angle-controlling liquid crystal panel 10.

The silsesquioxane group is obtained by removing at least one R group from a structure represented by $(RSiO_{1.5})_n$. R in the chemical formula $(RSiO_{1.5})_n$ represents an isobutyl group ($-CH_2CH(CH_3)_2$).

A silsesquioxane is a network polymer or a polyhedral cluster having a structure represented by $(RSiO_{1.5})_n$ which is intermediate between silica ($SiO_2$) and silicones ($R_2SiO$) and obtainable by hydrolyzing a trifunctional silane. Each silicon atom binds to 1.5 (sesqui) oxygen atoms and one hydrocarbon group on average. The silsesquioxane is an inorganic compound that adopts a cage-like skeleton with at most eight organic functional groups and Si—O linkages.

The silsesquioxane group may have a structure represented by the following chemical formula (1). The structure represented by the following chemical formula (1) is a cage-like silsesquioxane group.

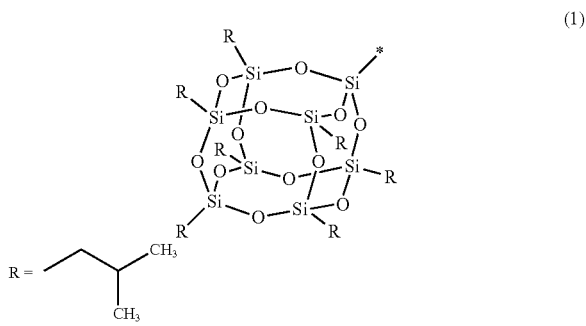

(1)

The second polymer for an alignment film may include a structure that contains a polyamic acid represented by the following chemical formula (2) as its main chain.

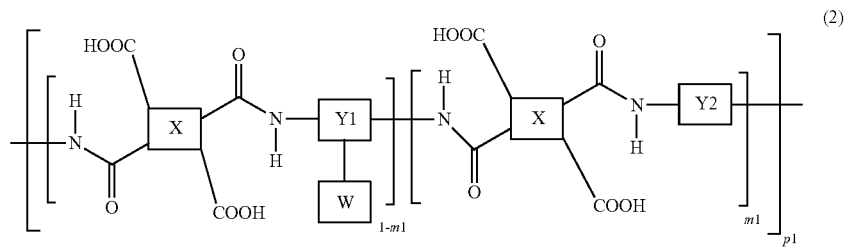

(2)

In the formula, X represents a structure represented by any one of the following chemical formulas (X-1) to (X-12), Y1 represents a structure represented by any one of the following chemical formulas (Y1-1) to (Y1-16), Y2 represents a structure represented by the following chemical formula (Y2-1), W represents a side chain, m1 represents a real number greater than 0 and smaller than 1, and p1 represents the number of repetitions and is an integer of not smaller than 1.

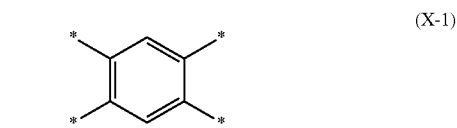

(X-1)

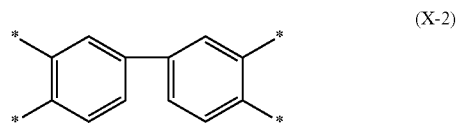

(X-2)

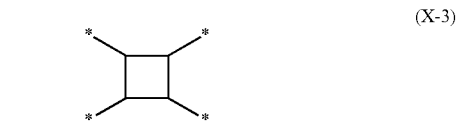

(X-3)

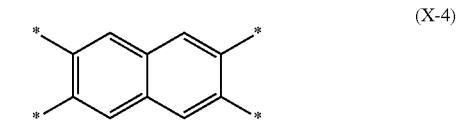

(X-4)

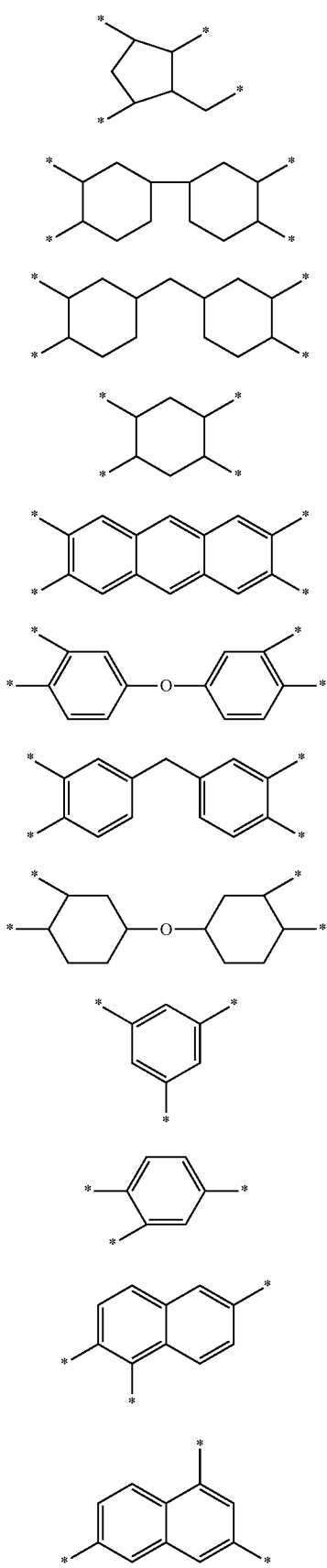
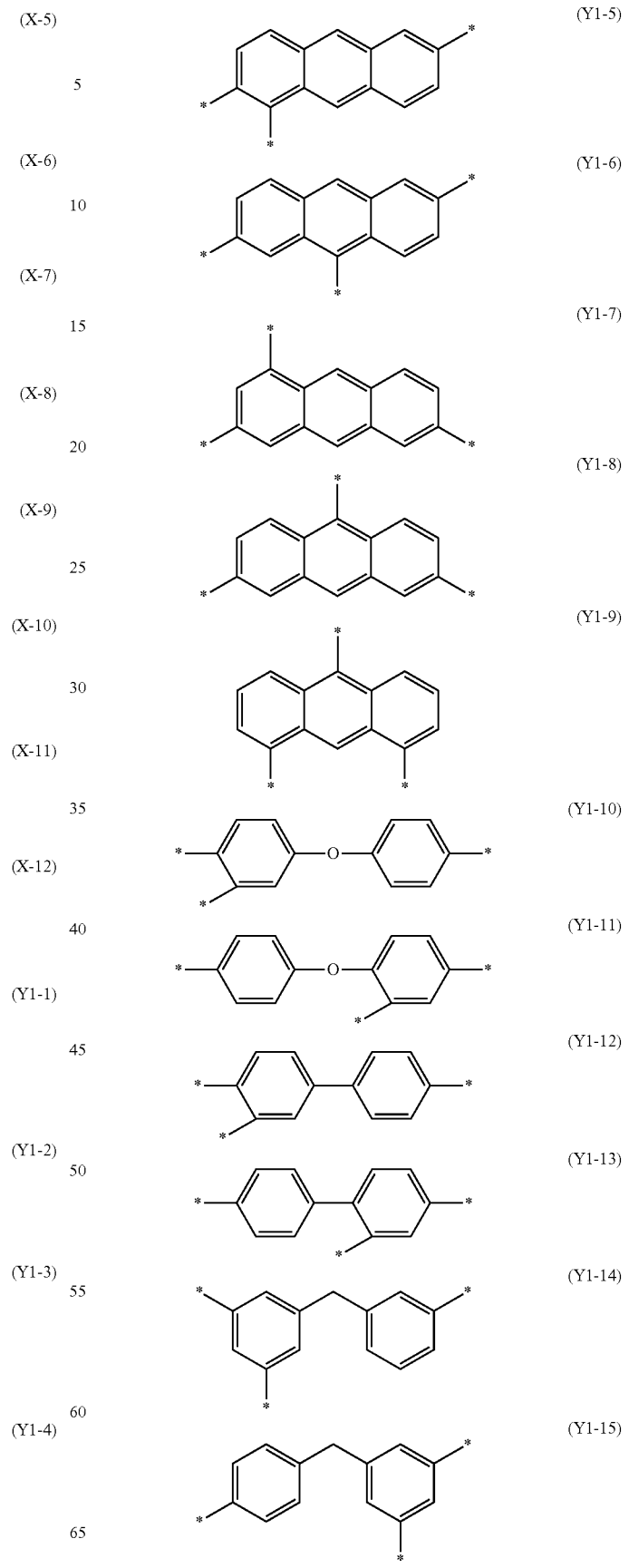

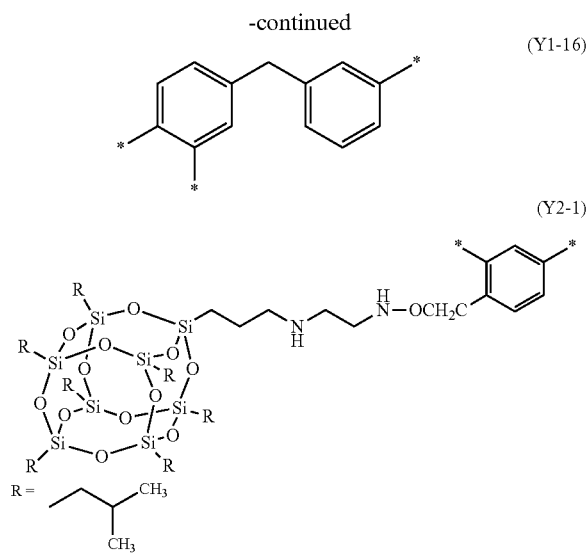

(Y1-16)

(Y2-1)

The second polymer for an alignment film may have a structure that contains a polyimide represented by the following chemical formula (3) as its main chain.

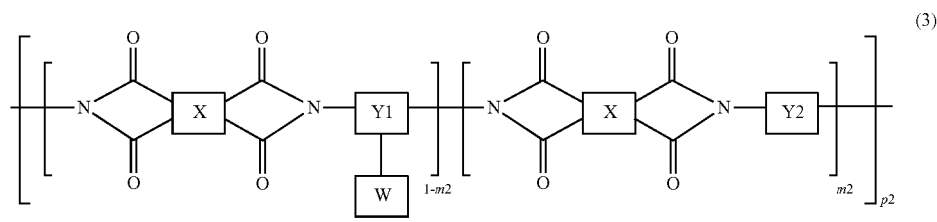

(3)

In the formula, X represents a structure represented by any one of the chemical formulas (X-1) to (X-12), Y1 represents a structure represented by any one of the chemical formulas (Y1-1) to (Y1-16), Y2 represents a structure represented by the chemical formula (Y2-1), W represents a side chain, m2 is a real number greater than 0 and smaller than 1, and p2 represents the number of repetition and is an integer of not smaller than 1.

The second polymer for an alignment film preferably contains an alignable functional group. The alignable functional group is more preferably introduced into the side chain W in each of the chemical formulas (2) and (3). One alignable functional group or two or more alignable functional groups may be introduced into the side chain W. The alignable functional group(s) in the second polymer for an alignment film may be a horizontally alignable functional group(s) or a vertically alignable functional group(s). Herein, the "horizontally alignable functional group" and the "vertically alignable functional group" are functional groups that, when a substrate with the alignment film is used for a liquid crystal display device, exert the alignment control force of aligning the liquid crystal molecules in the liquid crystal layer substantially horizontally and substantially vertically to the alignment film, respectively, with no voltage applied to the liquid crystal layer.

The alignable functional group in the second polymer for an alignment film may be a photoreactive group having a photoreactive site. The photoreactive site means a structure that can undergo a structural change when irradiated with light (electromagnetic waves) such as ultraviolet light or visible light. Examples of the structural change of the photoreactive site include photodimerization (formation of dimers), photoisomerization, photo-Fries rearrangement, and photolysis. The structural change of the photoreactive site causes the alignment film to exert the alignment control force or changes the size and/or direction of the alignment control force. The alignment control force means a property of controlling the alignment of liquid crystal molecules present in the vicinity of the alignment film. The photoreactive group herein encompasses functional groups having a photoreactive site among the horizontally alignable functional groups and the vertically alignable functional groups. Herein, an alignment film containing a first polymer having a photoreactive group and/or a second polymer having a photoreactive group is also referred to as a photoalignment film.

In the chemical formulas (2) and (3), W preferably represents, for example, a structure represented by any one of the following chemical formulas (W-1-1) to (W-1-8). The structures represented by the following chemical formulas (W-1-1) to (W-1-8) are functional groups having no photoreactive site among the horizontally alignable functional groups.

$*-H$ (W-1-1)

$*-CH_3$ (W-1-2)

$*-C_2H_5$ (W-1-3)

$*-CF_3$ (W-1-4)

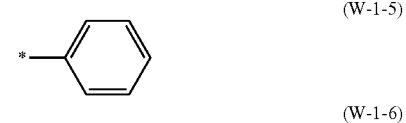

(W-1-5)

(W-1-6)

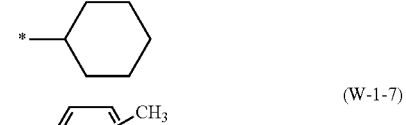

(W-1-7)

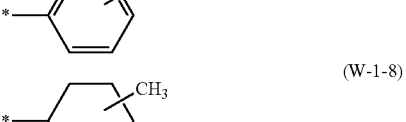

(W-1-8)

In the chemical formulas (2) and (3), W also preferably represents, for example, a structure represented by any one of the following chemical formulas (W-2-1) to (W-2-7). The structure represented by any one of the following chemical formulas (W-2-1) to (W-2-7) is a functional group having no photoreactive site among the vertically alignable functional groups.

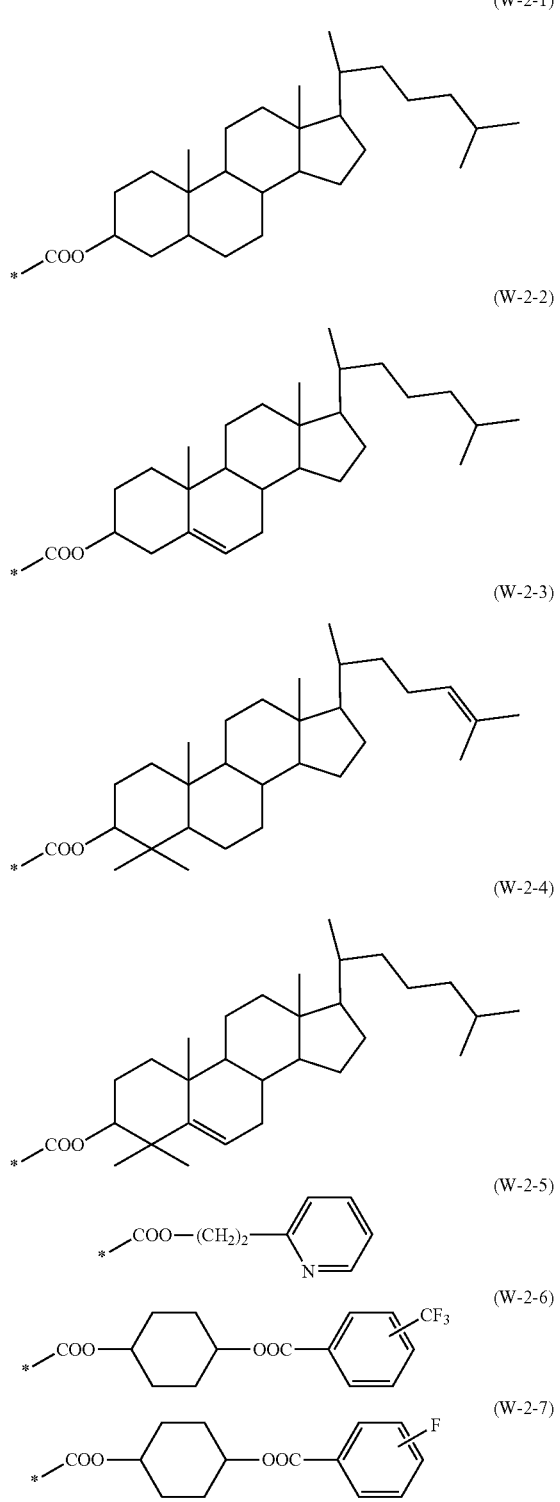

The vertically alignable functional groups may contain an alkyl group or a cholesterol group. A vertically alignable functional group containing an alkyl group preferably contains a phenyl group or a pyridine skeleton, more preferably an ester bond as well as a phenyl group or a pyridine skeleton. Examples of the vertically alignable functional group containing an alkyl group include the structures represented by the chemical formulas (W-2-5) to (W-2-7). Examples of the vertically alignable functional group containing a cholesterol group include the structures represented by the chemical formulas (W-2-1) to (W-2-4).

In the chemical formulas (2) and (3), W also preferably represents, for example, a structure represented by any one of the following chemical formulas (W-3-1) to (W-3-6). The structures represented by the following chemical formulas (W-3-1) to (W-3-6) are functional groups having a photoreactive site among the horizontally alignable functional groups. Herein, the horizontally alignable functional group having a photoreactive site is also referred to as a "horizontally photoalignable functional group". The structures represented by the following chemical formulas (W-3-1) to (W-3-3) are examples of the horizontally photoalignable functional groups having a cinnamate group. The structure represented by the following chemical formula (W-3-4) is an example of the horizontally photoalignable functional group having a chalcone group. The structure represented by the following chemical formula (W-3-5) is an example of the horizontally photoalignable functional group having an azobenzene group. The structure represented by the following chemical formula (W-3-6) is an example of the horizontally photoalignable functional group having a coumarin group.

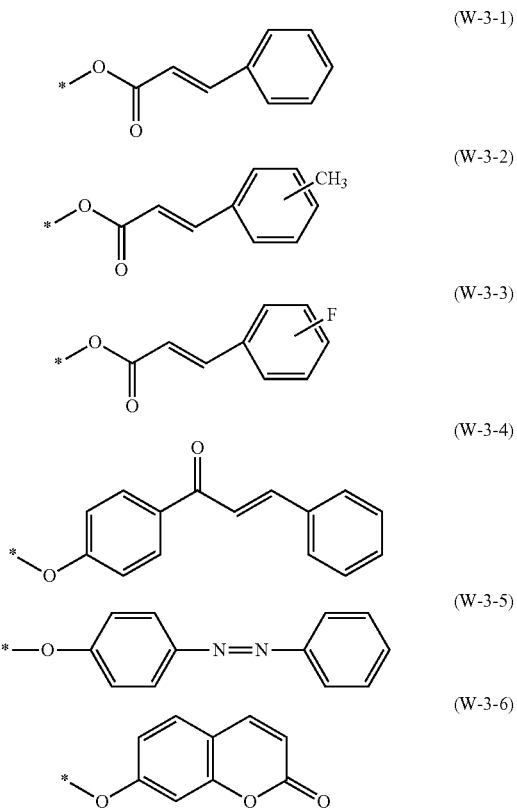

In the chemical formulas (2) and (3), W also preferably represents, for example, a structure represented by any one of the following chemical formulas (W-4-1) to (W-4-24). The structures represented by the following chemical formulas (W-4-1) to (W-4-24) are functional groups having a photoreactive site among the vertically alignable functional groups. Herein, the vertically alignable functional group having a photoreactive site is also referred to as a "vertically photoalignable functional group". The structures represented by the following chemical formulas (W-4-1) to (W-4-21) are examples of the vertically photoalignable functional groups having a cinnamate group. The structure represented by the following chemical formula (W-4-22) is an example of the vertically photoalignable functional group having a chalcone group. The structure represented by the following chemical formula (W-4-23) is an example of the vertically photoalignable functional group having an azobenzene group. The structure presented by the following chemical formula (W-4-24) is an example of the vertically photoalignable functional group having a coumarin group.

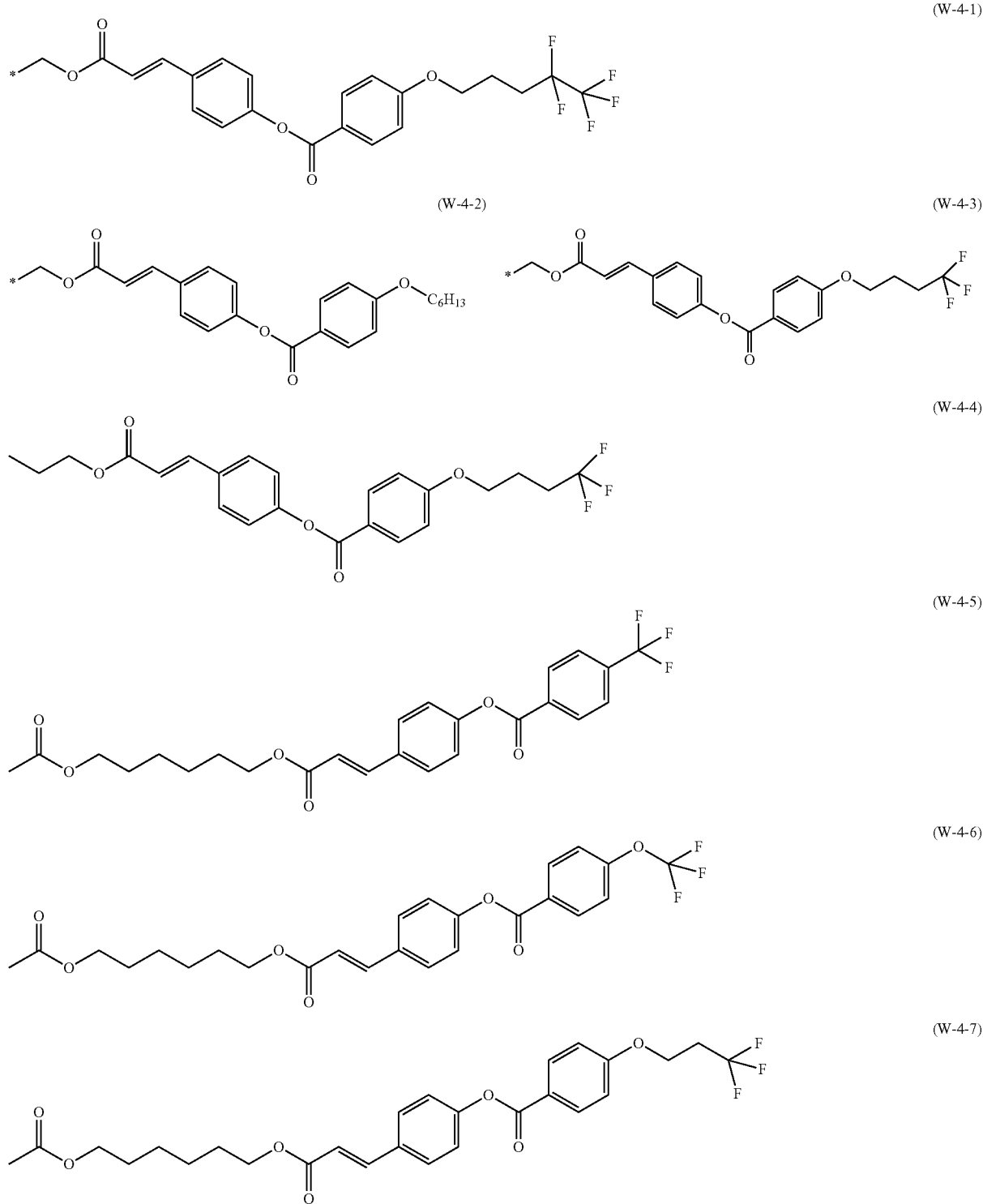

-continued
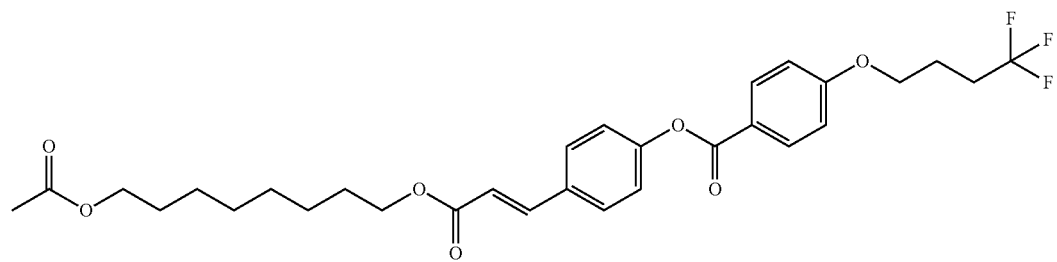
(W-4-8)
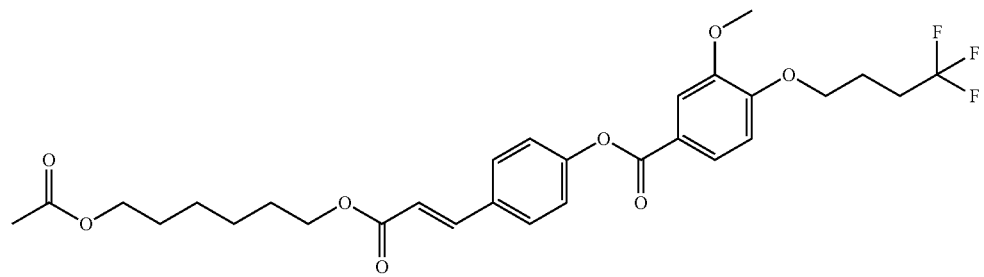
(W-4-9)
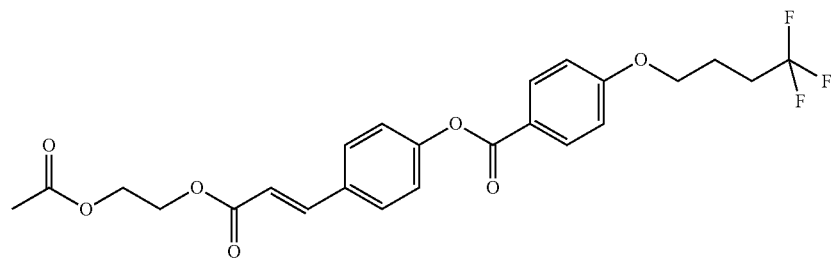
(W-4-10)
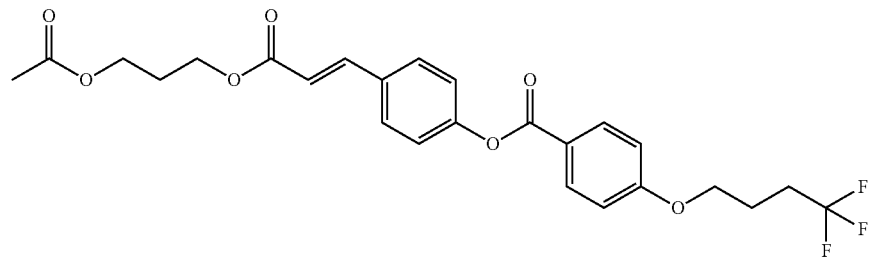
(W-4-11)
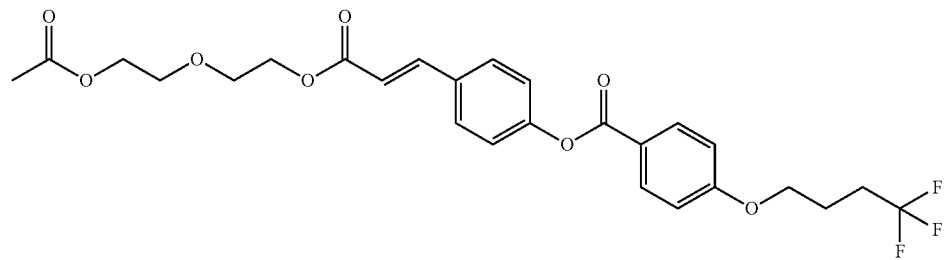
(W-4-12)
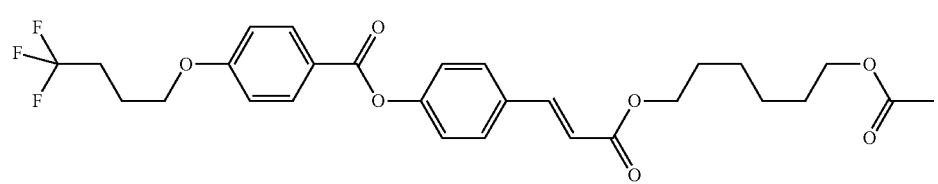
(W-4-13)

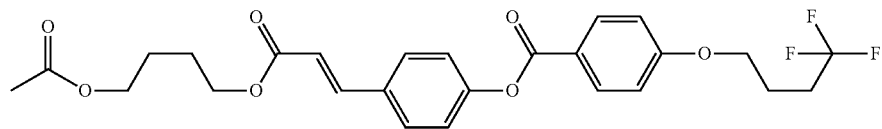
(W-4-14)
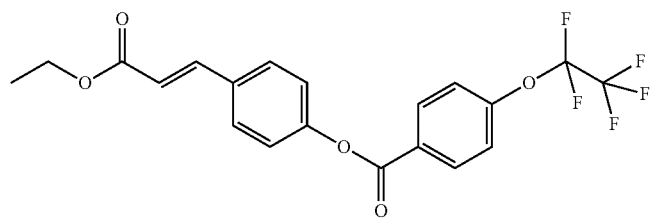
(W-4-15)
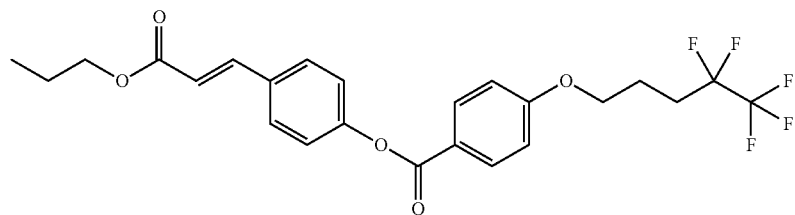
(W-4-16)
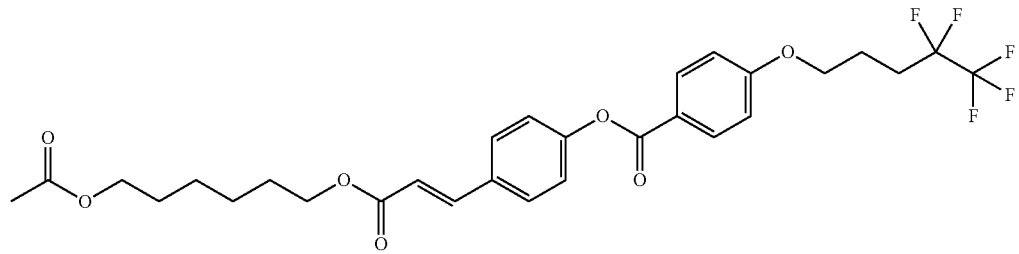
(W-4-17)
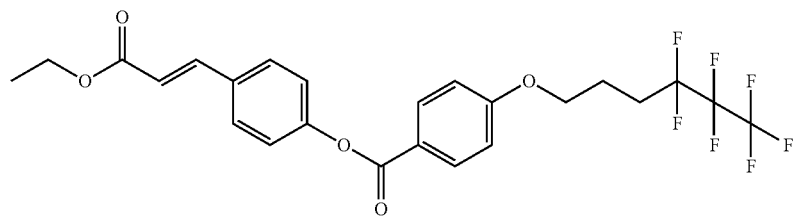
(W-4-18)
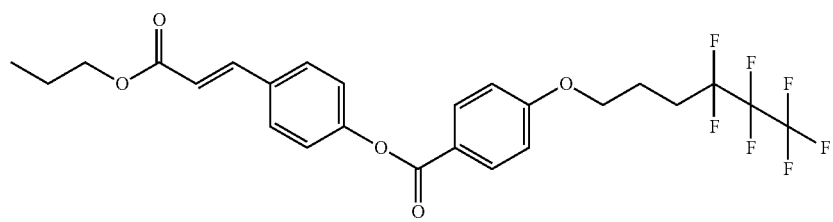
(W-4-19)

(W-4-20)
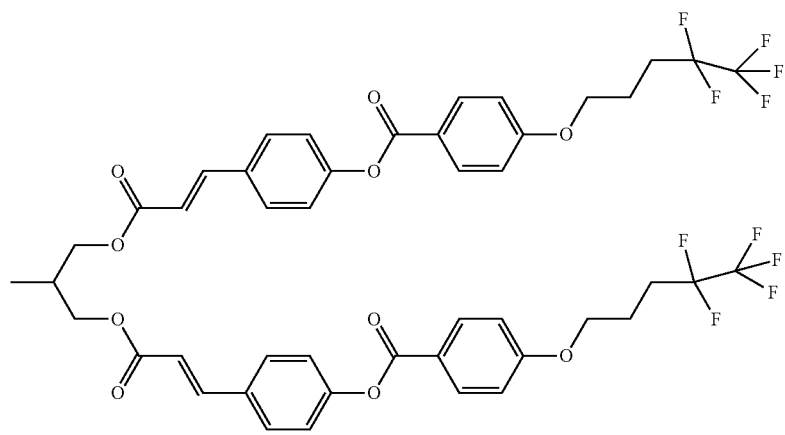
(W-4-21)
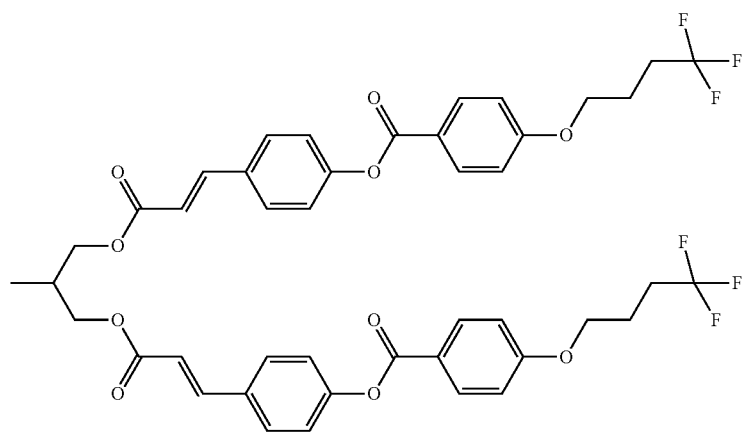
(W-4-22)
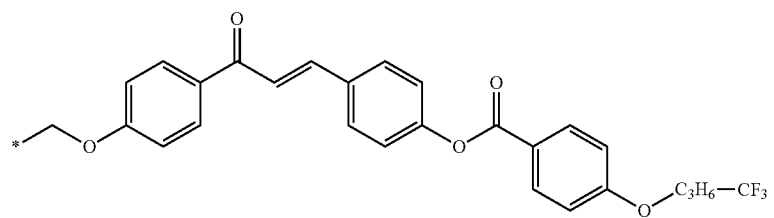
(W-4-23)
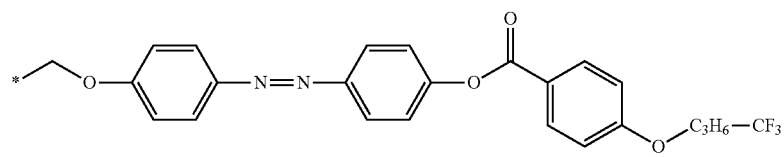
(W-4-24)
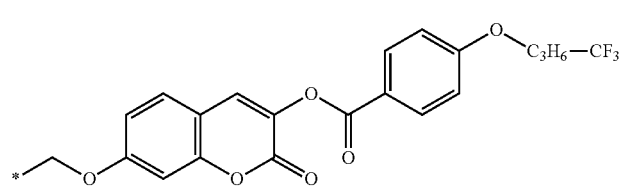

The second polymer for an alignment film is also preferably a polymer brush. This mode can reduce the polar anchoring energy of the alignment film to not greater than $1\times10^{-4}$ J/m$^2$, for example, and can therefore achieve a slippery alignment film. This mode thus enables more effective blocking of light from the backlight at large polar angles with voltage applied when the backlight is placed on the back surface side of the viewing angle-controlling liquid crystal panel 10.

A polymer brush is formed from a grafted polymer chain whose end on one side is fixed to a substrate surface and whose end on the other side extends in the direction away from the substrate surface. Such a grafted polymer chain may be formed to extend from the substrate or a polymer chain having a predetermined length may be attached to the substrate. The polymer brush contains, for example, poly(hexyl methacrylate) (PHMA).

The following shows an example of a method of producing the viewing angle-controlling liquid crystal panel 10 including the first alignment film 120 as a strong anchoring film and the second alignment film 140 as a weak anchoring film. First, a material of a rubbed alignment film is applied to the first substrate 110 including a solid ITO electrode as the first electrode 112 by spin coating at 2000 rpm for 12 seconds, pre-baked at 80° C. for 60 seconds, post-baked at 220° C. for 15 minutes, and then rubbed under the rubbing treatment conditions of a rotation speed of a roller of 300 rpm, a stage transfer speed of 15 mm/s, and an amount of indentation of 0.4 mm. The material is then washed with pure water (one minute) and dried (80° C./10 min), so that the first alignment film 120 as a strong anchoring film can be formed on the first substrate 110.

Also, a material of a rubbed alignment film having a reactive site that can fix a weak anchoring inducing monomer (hexyl methacrylate (HMA)) is applied to the second substrate 150 including a solid ITO electrode as the second electrode 152 by spin coating at 2000 rpm for 12 seconds, pre-baked at 80° C. for 60 seconds, post-baked at 220° C. for 15 minutes, and then rubbed under the rubbing treatment conditions of a rotation speed of a roller of 90 rpm, a stage transfer speed of 15 mm/s, and an amount of indentation of 0.4 mm. The material is then washed with pure water (one minute) and dried (80° C./10 min).

Next, beads are spread onto the first substrate 110 while a sealing material is drawn on the second substrate 150. The substrates are then attached to each other to produce an empty panel. Subsequently, a liquid crystal material containing HMA monomers (10 wt % of the liquid crystal material) is injected into the empty panel under a vacuum, and then subjected to realignment treatment at 110° C./10 min. Lastly, the resulting cell is irradiated with unpoarized UV light having a wavelength of 313 nm with an irradiation dose of 14 J (unpolarized UV light having a wavelength of 313 nm, 7 mW) for a treatment of polymerizing the HMA monomers (PSA treatment), whereby the second alignment film 140 as a weak anchoring film containing PHMA is formed on the second substrate 150. Thus, a switching cell is produced which includes the liquid crystal layer 130 in a homogeneous alignment state between the first substrate 110 and the second substrate 150. Furthermore, the switching cell is sandwiched between the first polarizing plate 10P1 and the second polarizing plate 10P2 arranged in parallel Nicols, so that the viewing angle-controlling liquid crystal panel 10 is produced which includes the first alignment film 120 as a strong anchoring film and the second alignment film 140 as a weak anchoring film.

The liquid crystal layer 130 contains the liquid crystal molecules 131 and controls the amount of light passing therethrough by changing the alignment of the liquid crystal molecules 131 based on the voltage applied to the liquid crystal layer 130. The liquid crystal molecules 131 have a positive value of the anisotropy of dielectric constant ($\Delta\varepsilon$) defined by the following formula (L). The liquid crystal molecules 131 are homogeneously aligned when no voltage is applied (with no voltage applied). The direction of the long axes of the liquid crystal molecules 131 with no voltage applied is also referred to as the initial alignment direction of the liquid crystal molecules. The liquid crystal molecules having a positive anisotropy of dielectric constant are referred to as positive liquid crystal molecules. The liquid crystal molecules having a negative anisotropy of dielectric constant are referred to as negative liquid crystal molecules.

$\Delta\varepsilon$=(dielectric constant of liquid crystal molecules in long axis direction)−(dielectric constant of liquid crystal molecules in short axis direction)  (L)

Herein, the homogeneous alignment means an alignment state where the liquid crystal molecules are aligned horizontal to the surfaces of a substrate constituting the viewing angle-controlling liquid crystal panel (e.g., the surfaces of at least one of the first substrate 110 or the second substrate 150) and the orientations of the liquid crystal molecules are the same. The state with no voltage applied means a state where voltage of not lower than the threshold for the liquid crystal molecules is not applied to the liquid crystal layer. For example, the same constant voltage may be applied to the first electrode 112 and the second electrode 152, or a constant voltage may be applied to one of the first electrode 112 and the second electrode 152 while a voltage lower than the threshold for the liquid crystal molecules relative to the constant voltage may be applied to the other of the electrodes. The state with voltage applied means a state where a voltage of not lower than the threshold for the liquid crystal molecules is applied to the liquid crystal layer.

The birefringence $\Delta n$ of the liquid crystal molecules 131 may be not lower than 0.08 and not higher than 0.24. For a high degree of reliability (high voltage holding ratio, wide operation temperature range), the birefringence $\Delta n$ is preferably not lower than 0.08 and not higher than 0.16.

The thickness d of the liquid crystal layer 130 is preferably not smaller than 3 μm and not greater than 10 μm. This mode can increase the response speed of the liquid crystal molecules 131. Also, the thickness of the viewing angle-controlling liquid crystal panel 10 can be further reduced. In terms of reduction of thickness, the thickness d of the liquid crystal layer 130 is more preferably not smaller than 3 μm and not greater than 5 μm. In terms of the yield, the thickness d of the liquid crystal layer 130 is more preferably not smaller than 5 μm and not greater than 10 μm. The liquid crystal layer 130 having a thickness d of not smaller than 5 μm can cause the display unevenness due to contamination with a foreign material to be less noticeable, thus increasing the yield.

The maximum retardation And (hereinafter, also simply referred to as a "retardation") of the liquid crystal layer 130 with voltage applied between the first electrode and the second electrode is preferably not less than 600 nm and not more than 1600 nm at a wavelength of 550 nm. This mode can achieve a sufficient light-blocking ability as well as sufficient production stability. The retardation of the liquid crystal layer 130 is more preferably not less than 1000 nm and not more than 1600 nm. The retardation is expressed as a product of the birefringence (Δn) of the liquid crystal molecules by the thickness (d) of the liquid crystal layer.

The first polarizing plate 10P1 and the second polarizing plate 10P2 are both absorptive polarizers. The first polarizing plate 10P1 and the second polarizing plate 10P2 may each be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The polarization axis of the first polarizing plate 10P1 is preferably parallel to the polarization axis of the second polarizing plate 10P2. In other words, the first polarizing plate 10P1 and the second polarizing plate 10P2 are preferably arranged in parallel Nicols. This mode enables more effective transmission of light from the backlight in a region ranging from small to large polar angles with no voltage applied when the backlight is placed on the back surface side of the viewing angle-controlling liquid crystal panel 10.

Herein, the expression that two axes (e.g., polarization axes) are "parallel to each other" means that these axes form an angle of 0° to 6°, preferably 0° to 2°, more preferably 0° to 1°, particularly preferably 0° (perfectly parallel). The expression that two axes (e.g., polarization axes) are "perpendicular to each other" mean that these axes form an angle of 87° to 93°, preferably 89° to 91°, more preferably 89.5° to 90.5°, particularly preferably 90° (perfectly perpendicular).

The polarization axis of the first polarizing plate 10P1 and the polarization axis of the second polarizing plate 10P2 are each parallel to the long axes of the liquid crystal molecules 131 with no voltage applied. This mode enables still more effective transmission of light from the backlight in a region ranging from small to large polar angles with no voltage applied when the backlight is placed on the back surface side of the viewing angle-controlling liquid crystal panel 10.
(Modified Example of Embodiment 1)

The viewing angle-controlling liquid crystal panel 10 of Embodiment 1 is a passive liquid crystal panel adopting passive driving. The viewing angle-controlling liquid crystal panel 10 is not limited thereto and may be, for example, an active matrix liquid crystal panel adopting active matrix driving. The present modified example is the same as Embodiment 1, except for the matters described here. For convenience of description, the components having the same function as those shown in the drawings for Embodiment 1 are assigned with the same reference signs, and description thereof is omitted.

The viewing angle-controlling liquid crystal panel 10 of the present modified example is an active matrix liquid crystal panel adopting active matrix driving. This mode enables switching between the public mode and the privacy mode partially, not entirely, on the screen.

The first substrate 110 of the viewing angle-controlling liquid crystal panel 10 includes, as in a typical active matrix liquid crystal panel, gate lines 113 and source lines 114 arranged perpendicularly to each other and forming a grid pattern, and thin film transistors (TFTs) 115 as switching elements at or near the respective intersections. Regions surrounded by the gate lines 113 and the source lines 114 define pixels 11P, and each pixel 11P includes as the first electrode 112 a pixel electrode connected to a corresponding TFT 115.

The second substrate 150 facing the first substrate 110 includes as the second electrode 152 a common electrode that is a solid electrode covering the entire screen 50.

The viewing angle-controlling liquid crystal panel 10 may be driven by any method such as a typical active matrix driving method. In other words, the TFTs 115 in the respective pixels are switched (turned on or off) via the gate driver. In response to the switching, voltage is applied via the source driver to the pixels to be turned on, and electric charge is accumulated as storage capacitance in the pixels via the drain buses of the corresponding TFTs 115. This storage capacitance keeps the pixels turned on.

The gate lines 113 are conductive lines connected to the gate electrodes of the respective TFTs 115 (typically, the bus lines connected to the gate electrodes). Scanning signals (signals that control the on and off states of the TFTs) are supplied to the gate electrodes of the connected TFTs 115. The source lines 114 are conductive lines (typically, bus lines connected to the source electrodes) connected to the source electrodes of the respective TFTs 115. Data signals (e.g., video signals) are supplied to the connected TFTs 115. Typically, either the gate lines 113 or the source lines 114 are in the form of lines vertically crossing an array region with the TFTs 115 arranged in a matrix pattern while the others are in the form of lines horizontally crossing the array region.

The gate lines 113, the source lines 114, and the conductive lines and electrodes of the TFTs 115 can be formed by forming a single- or multi-layered film of a metal such as copper, titanium, aluminum, molybdenum, or tungsten, or an alloy of any of these metals by a method such as sputtering, followed by patterning of the film by a method such as photolithography. Various conductive lines and electrodes to be formed in the same layer are produced from the same material for a higher efficiency of production.
(Embodiment 2)

The features unique to the present embodiment are mainly described here, and description of the matters already described in Embodiment 1 is omitted. The present embodiment relates to a liquid crystal display device including the viewing angle-controlling liquid crystal panel 10 of Embodiment 1 as the first liquid crystal panel as well as the second liquid crystal panel different from the first liquid crystal panel.

Figure 5:
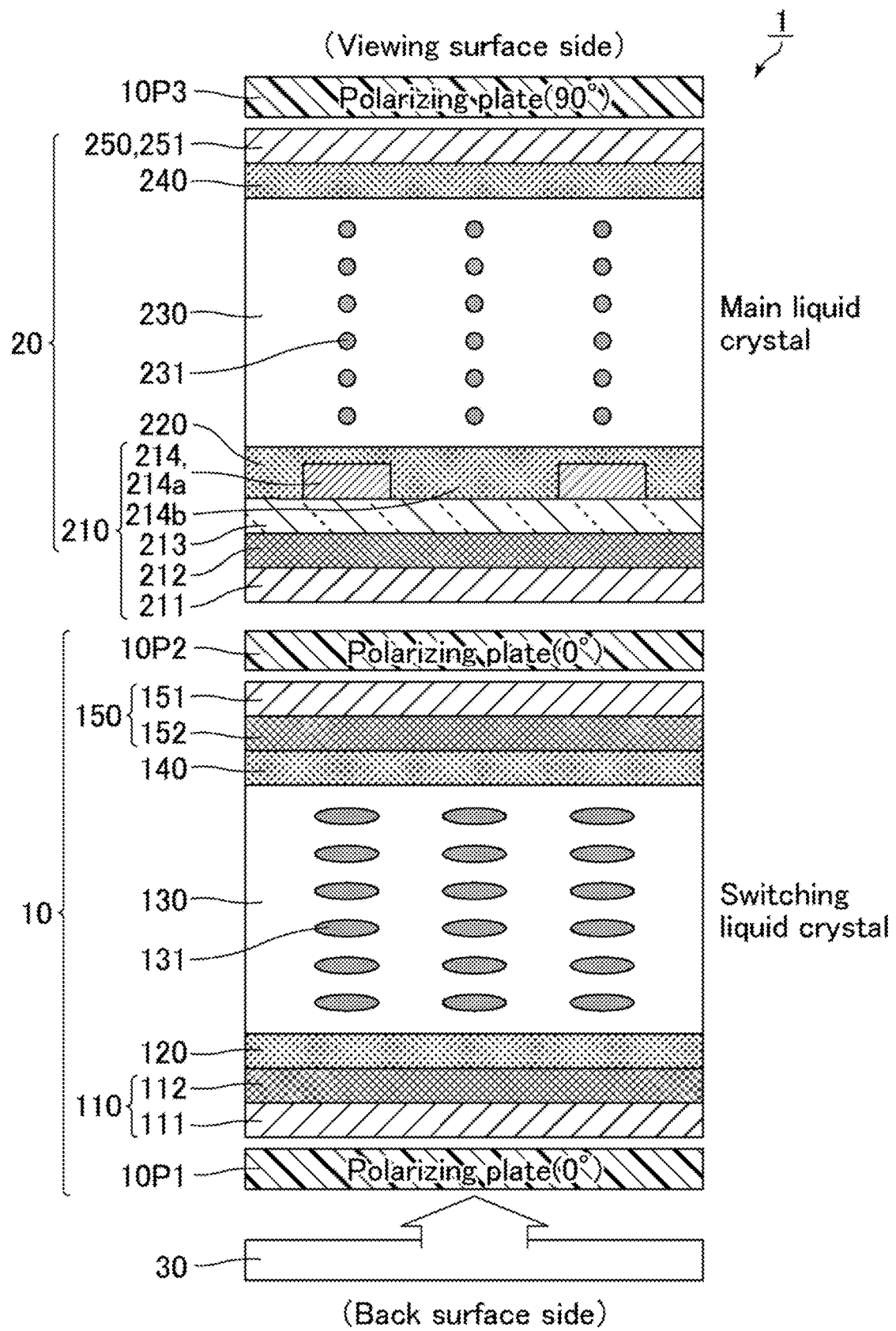
FIG. 5 is a schematic cross-sectional view of an example of a liquid crystal display device of Embodiment 2.
Figure 6:
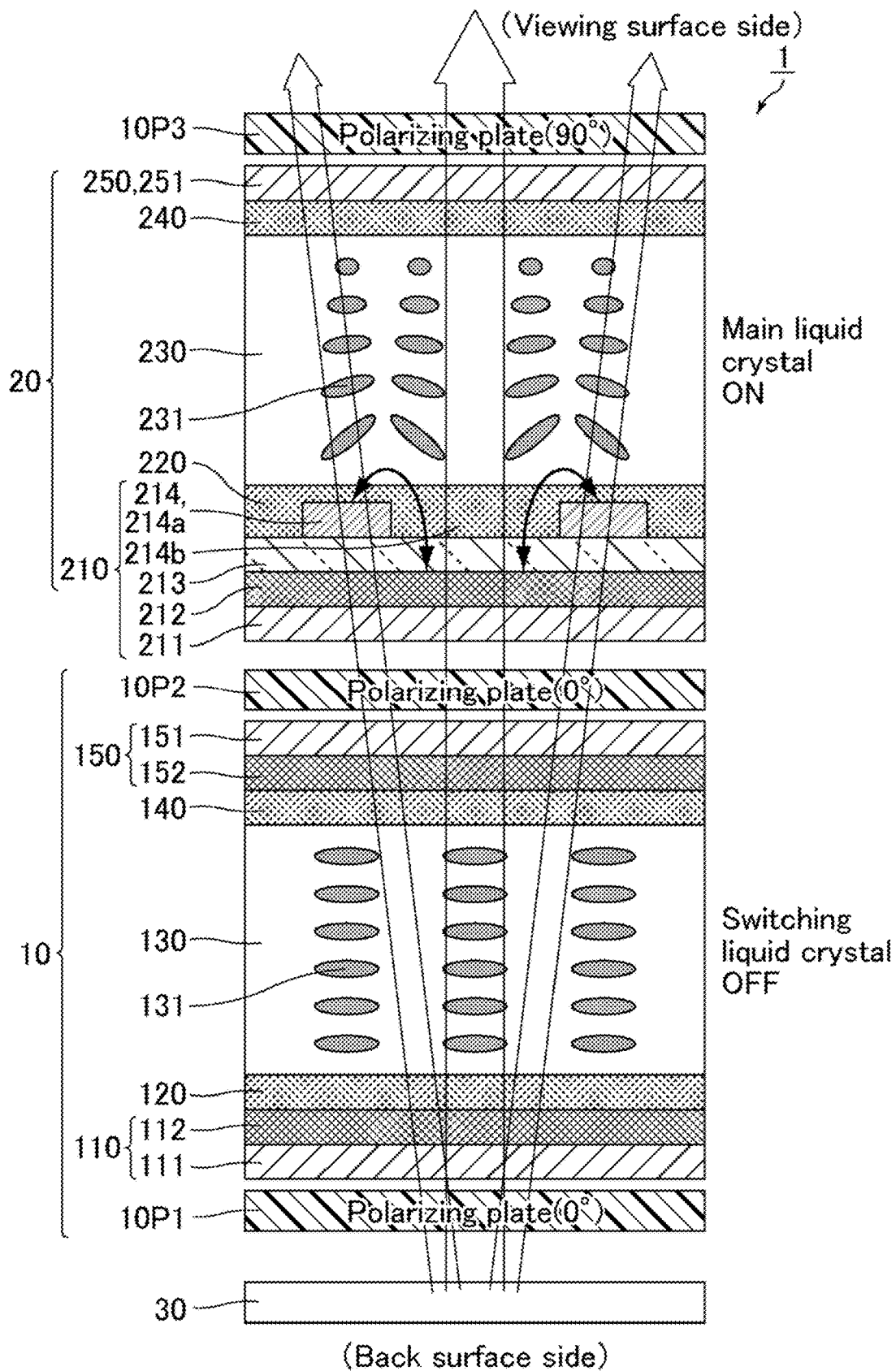
FIG. 6 is a schematic cross-sectional view of an example of the liquid crystal display device of Embodiment 2, with voltage applied to its display-providing liquid crystal panel and with no voltage applied to its viewing angle-controlling liquid crystal panel.
Figure 7:
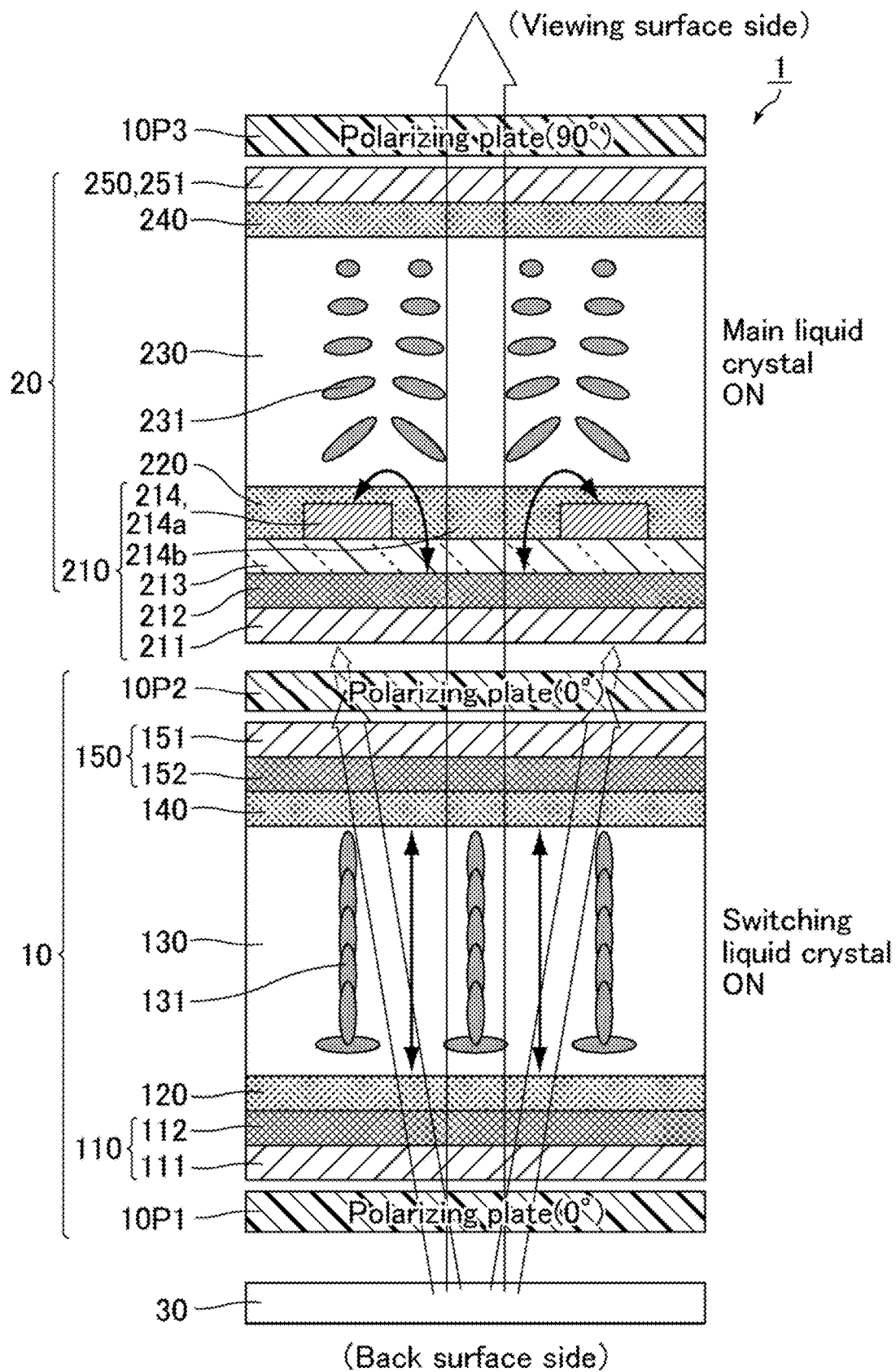
FIG. 7 is a schematic cross-sectional view of an example of the liquid crystal display device of Embodiment 2, with voltage applied to its display-providing liquid crystal panel and its viewing angle-controlling liquid crystal panel.

FIG. 5 is a schematic cross-sectional view of an example of the liquid crystal display device of Embodiment 2. FIG. 6 is a schematic cross-sectional view of an example of the liquid crystal display device of Embodiment 2, with voltage applied to its display-providing liquid crystal panel and with no voltage applied to its viewing angle-controlling liquid crystal panel. FIG. 7 is a schematic cross-sectional view of an example of the liquid crystal display device of Embodiment 2, with voltage applied to its display-providing liquid crystal panel and its viewing angle-controlling liquid crystal panel.

The liquid crystal display device 1 of the present embodiment shown in FIG. 5 to FIG. 7 includes the viewing angle-controlling liquid crystal panel 10 as the first liquid crystal panel, and the display-providing liquid crystal panel 20 as the second liquid crystal panel. This mode puts the viewing angle-controlling liquid crystal panel 10 in a state with no voltage applied as shown in FIG. 6 to cause an image on the display-providing liquid crystal panel 20 to be observable in a wide viewing angle range. This mode also puts the viewing angle-controlling liquid crystal panel 10 in a state with voltage applied as shown in FIG. 7 to cause the image on the display-providing liquid crystal panel 20 to be observable only at polar angles smaller than a certain polar angle (e.g., 45°) while causing the image to be unobservable at polar angles not smaller than the certain polar angle.

The liquid crystal display device 1 of the present embodiment is a dual cell-type viewing angle controlling liquid crystal display device. The liquid crystal display device 1 is a liquid crystal display device including the viewing angle-controlling liquid crystal panel 10 and the display-providing liquid crystal panel 20 overlaid with each other. The viewing angle-controlling liquid crystal panel 10 is in the ECB mode and has, for example, an alignment film (e.g., the first alignment film 120 on which light from the backlight 30 is incident) as a strong anchoring film on one side and an alignment film (e.g., the second alignment film 140 from which light from the backlight 30 is emitted) as a weak anchoring film on the other side. The device functions in the wide viewing angle mode when no voltage is applied to the ECB liquid crystal, while functioning in the narrow viewing angle mode that enables sufficient blocking of light not only at a certain polar angle (e.g., 45°) but also at polar angles not smaller than the certain polar angle when voltage is applied to the ECB liquid crystal. Thus, the device can achieve privacy switching.

The liquid crystal display device 1 of the present embodiment includes, sequentially from the back surface side toward the viewing surface side, the backlight 30, the viewing angle-controlling liquid crystal panel 10, and the display-providing liquid crystal panel 20.

The viewing angle-controlling liquid crystal panel 10 includes, sequentially from the back surface side toward the viewing surface side, the first polarizing plate 10P1, the first substrate 110, the first alignment film 120, the liquid crystal layer 130, the second alignment film 140, the second substrate 150, and the second polarizing plate 10P2.

The display-providing liquid crystal panel 20 includes, sequentially from the back surface side toward the viewing surface side, a third substrate 210, a third alignment film 220, a display-providing liquid crystal layer 230 as the liquid crystal layer of the second liquid crystal panel, a fourth alignment film 240, a fourth substrate 250, and a third polarizing plate 10P3.

The third substrate 210 preferably includes third electrodes 212 and fourth electrodes 214 as shown in FIG. 5 to FIG. 7. This mode can achieve the in-plane switching (IPS) mode or the fringe field switching (FFS) mode and allows the display-providing liquid crystal panel 20 alone to operate in the wide viewing angle mode.

The display-providing liquid crystal panel 20 includes pixels arranged in a matrix in the in-plane direction. The third substrate 210 includes, on the third substrate 210, parallel gate lines and parallel source lines crossing the gate lines via an insulating film. The gate lines and the source lines as a whole are formed in a grid pattern. TFTs are arranged as switching elements at the respective intersections of the gate lines and the source lines.

As shown in FIG. 5 to FIG. 7, the third substrate 210 includes, sequentially from the back surface side toward the viewing surface side, a third support substrate 211, the third electrodes 212 arranged in the respective pixels, an insulating layer 213, and the fourth electrodes 214 each including linear electrodes 214a. In other words, the third substrate 210 has an FFS-mode electrode structure in which the third electrodes 212 and the fourth electrodes 214 are stacked with the insulating layer 213 in between.

The present embodiment is described with reference to the display-providing liquid crystal panel 20 having an FFS-mode electrode structure as an example. Yet, the concept of the present embodiment is also applicable to an IPS-mode electrode structure in which the third electrodes 212 and the fourth electrodes 214 are both comb-teeth electrodes, and the third electrodes 212 as comb-teeth electrodes and the fourth electrodes 214 as comb-teeth electrodes are formed in the same electrode layer such that their comb teeth fit each other.

Non-limiting examples of the third support substrate 211 of the third substrate 210 include the same support substrates as the first support substrate 111 and the second support substrate 151.

The third electrodes 212 and the fourth electrodes 214 are arranged in the respective pixels. The third electrodes 212 are preferably planar electrodes. Herein, the "planar electrode" means an electrode without any slit or opening in a plan view. The third electrodes 212 preferably overlap at least the later-described linear electrodes 214a of the fourth electrodes 214 in a plan view.

The fourth electrodes 214 are electrically connected to one another over the pixels. The fourth electrodes 214 each include the linear electrodes 214a. The planar shape of the fourth electrodes 214 may be, for example, a structure in which the ends of the linear electrodes 214a are both closed. The fourth electrodes 214 may each be provided with an opening 214b surrounded by its electrode portion.

The fourth electrodes 214 arranged in the respective pixels may be electrically connected to one another and a common constant voltage may be applied to the pixels, while each of the third electrodes 212 arranged in the respective pixels may be electrically connected to the corresponding source line via the semiconductor layer of the corresponding TFT and different voltages may be applied to the respective pixels according to the respective image signals. Also, each of the fourth electrodes 214 may be electrically connected to the corresponding source line via the semiconductor layer of the corresponding TFT and different voltages may be applied to the respective pixels according to the respective image signals, while the third electrodes 212 may be electrically connected to one another and a common constant voltage may be applied to the pixels.

Examples of the third electrodes 212 and the fourth electrodes 214 include the same electrodes as the first electrodes 112 and the second electrodes 152.

Examples of the insulating layer 213 include inorganic insulating films and organic insulating films. The inorganic insulating films may be, for example, inorganic films (relative dielectric constant $\varepsilon$=5 to 7) such as a silicon nitride (SiNx) film or a silicon oxide (SiO$_2$) film, or a laminate of these films. The organic insulating films may be, for example, organic films such as an acrylic resin film, a polyimide resin film, or a novolac resin film, or a laminate of any of these films.

The third alignment film 220 and the fourth alignment film 240 control the initial alignment azimuth of the liquid crystal molecules 231 with no voltage applied and the polar angle (pre-tilt angle) of the liquid crystal molecules 231 with no voltage applied. The third alignment film 220 and the fourth alignment film 240 may each be a horizontal alignment film or a vertical alignment film. To control the in-plane liquid crystal retardation and achieve sufficient white luminance, the third alignment film 220 and the fourth alignment film 240 are preferably horizontal alignment films.

The third alignment film 220 and the fourth alignment film 240 may be rubbed alignment films or photoalignment films. The third alignment film 220 and the fourth alignment film 240 contain, for example, a polymer for an alignment film such as a polymer having a polyimide structure in its main chain, a polymer having a polyamic acid structure in its main chain, or a polymer having a polysiloxane structure in its main chain. The third alignment film 220 and the fourth alignment film 240 can be formed by, for example, applying an alignment film material containing the polymer for an alignment film to the third substrate 210 and the fourth substrate 250, respectively. The application method may be any method such as flexo printing or inkjet coating.

The polar anchoring energy and the azimuthal anchoring energy of the third alignment film 220 may be, but are not limited to, not smaller than $1\times10^{-9}$ J/m$^2$ and not greater than $1\times10^3$ J/m$^2$.

The azimuthal anchoring energy of the fourth alignment film 240 is preferably not greater than $1\times10^{-3}$ J/m$^2$. This mode can more easily rotate the liquid crystal molecules 231 which are near the fourth alignment film 240 and remote from the fringe electric fields generated between the third electrodes 212 and the fourth electrodes 214 when voltage is applied between these electrodes, thus widening the viewing angle. The lower limit of the azimuthal anchoring energy of the fourth alignment film 240 is not limited. The azimuthal anchoring energy of the fourth alignment film 240 is, for example, not smaller than $1\times10^{-9}$ J/m$^2$.

The polar anchoring energy of the fourth alignment film 240 may be, but is not limited to, for example, not smaller than $1\times10^{-9}$ J/m$^2$ and not greater than $1\times10^3$ J/m$^2$.

The fourth alignment film 240 preferably contains at least one polymer of polyethylene glycol (PEG) or polymethyl methacrylate (PMMA). This mode can reduce the azimuthal anchoring energy of the fourth alignment film 240, thus giving an azimuthal anchoring energy of, for example, not greater than $1\times10^{-3}$ J/m$^2$.

The display-providing liquid crystal layer 230 contains the liquid crystal molecules 231 and controls the amount of light passing therethrough by changing the alignment of the liquid crystal molecules 231 based on the voltage applied to the display-providing liquid crystal layer 230. The anisotropy of dielectric constant (Δε) of the liquid crystal molecules defined by the formula (L) may be positive or negative, and is preferably positive.

The fourth substrate 250 includes the fourth support substrate 251. Non-limiting examples of the fourth support substrate 251 include the same support substrate as the first support substrate 111 and the second support substrate 151.

The third substrate 210 or the fourth substrate 250 may include a color filter layer. The color filter layer includes, for example, red color filters, green color filters, and blue color filters. The material of the color filters of each color may be, for example, a photosensitive resin containing a color material such as a dye or a pigment. Examples of the pigment include a single pigment or a mixture of multiple pigments. The dye and the pigment may be those commonly used in the field of color filters. The photosensitive resin is a polymer whose properties change when irradiated with light. Examples of the photosensitive resin include those commonly used in the field of color filters, such as a photoresist. The photosensitive resin may be of a negative or positive resin. A color filter of each color is formed by applying a photosensitive resin containing a color material such as a dye or a pigment to form a film, followed by photolithography including exposure and development.

The third polarizing plate 10P3 is an absorptive polarizer. The third polarizing plate 10P3 may be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The polarization axis of the third polarizing plate 10P3 is preferably perpendicular to the polarization axis of the first polarizing plate 10P1 and the polarization axis of the second polarizing plate 10P2. This mode enables black display with no voltage applied.

The backlight 30 may be one commonly used in the field of liquid crystal display devices. The backlight 30 may be any one that can be placed on the back surface side of the viewing angle-controlling liquid crystal panel 10 and emit light from the backlight 30 to the viewing surface side. The backlight 30 may be a direct-lit one or an edge-lit one. The light source of the backlight 30 may be of any type such as a light emitting diode (LED) or a cold cathode fluorescent lamp (CCFL).

The display-providing liquid crystal panel 20 may further include a viewing angle widening film on the back surface side of the third substrate 210 or on the viewing surface side of the fourth substrate 250. Examples of the viewing angle widening film include SAM films that have a fine wedge-like slope structure and disperse straight-forward-travelling light to all the azimuths.

EXAMPLES

Hereinafter, the effects of the present invention are described with reference to examples and comparative examples. The present invention is not limited to these examples.

Example 1-1

Figure 8A:
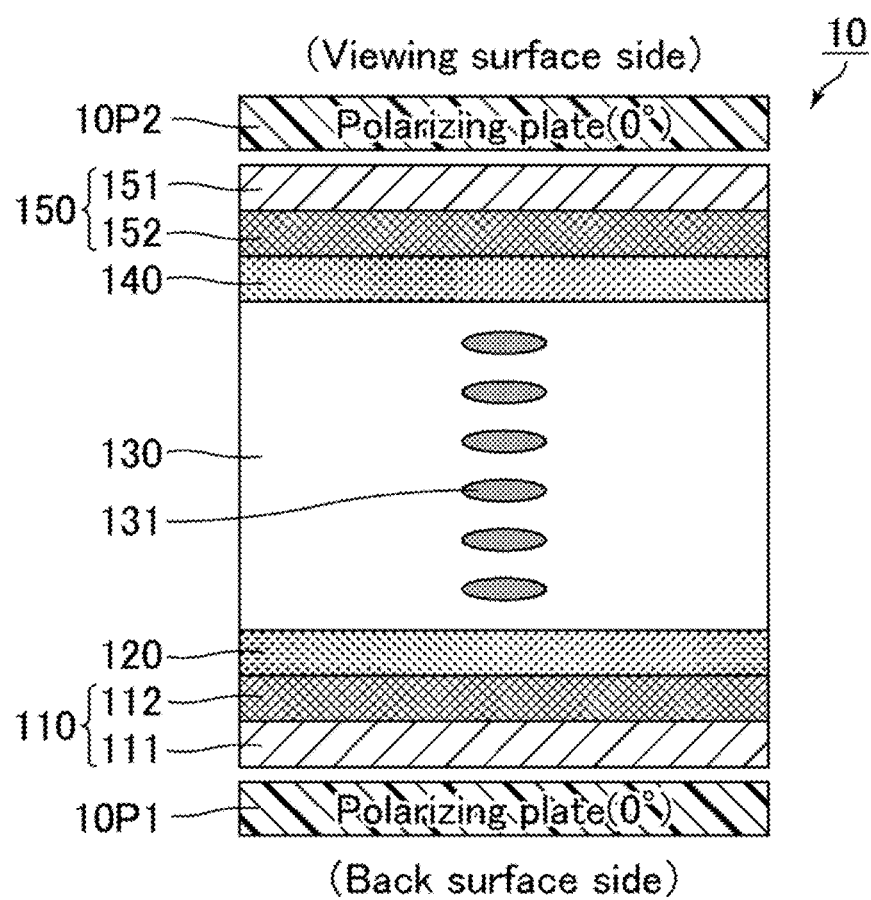
FIG. 8A is a schematic cross-sectional view of a viewing angle-controlling liquid crystal panel of Example 1-1 with no voltage applied.

FIG. 8A is a schematic cross-sectional view of a viewing angle-controlling liquid crystal panel of Example 1-1 with no voltage applied. FIG. 8B is a schematic cross-sectional view of the viewing angle-controlling liquid crystal panel of Example 1-1 with voltage applied. The polar angle dependence of transmittance and the viewing angle dependence of white transmittance were calculated using the viewing angle-controlling liquid crystal panel 10 of Example 1-1 having the same structure as that of Embodiment 1 shown in FIG. 1 to FIG. 4, FIG. 8A, and FIG. 8B. Specifically, the backlight was placed on the back surface side of the viewing angle-controlling liquid crystal panel 10, and the polar angle dependence of transmittance and the viewing angle dependence of white transmittance of light passing through the viewing angle-controlling liquid crystal panel 10 were calculated at a wavelength of 550 nm with the LCD master 2D (LCD simulator available from Shintech, Inc.).

The first electrode 112 and the second electrode 152 in the viewing angle-controlling liquid crystal panel 10 of Example 1-1 were solid ITO electrodes. The first alignment film 120 (rubbed alignment film) had a pre-tilt angle of 1° to 2° and a polar anchoring energy 1EA and an azimuthal anchoring energy 1EB of $1\times10^3$ J/m$^2$. The second alignment film 140 had a polar anchoring energy 2EA and an azimuthal anchoring energy 2EB of $1\times10^{-3}$ J/m$^2$. In other words, the first alignment film 120 was a strong anchoring film while the second alignment film 140 was a weak anchoring film. The liquid crystal layer 130 contained the positive liquid crystal molecules 131 and had a birefringence Δn of 0.22, a cell thickness d of 3.64 μm, and a retardation Δnd of 808 nm. The first polarizing plate 10P1 and the second polarizing plate 10P2 were arranged in parallel Nicols. The viewing angle-controlling liquid crystal panel 10 of Example 1-1 was a switching liquid crystal device (active louver) capable of switching between the narrow viewing angle mode and the wide viewing angle mode.

Example 1-2

The polar angle dependence of transmittance and the viewing angle dependence of white transmittance were calculated as in Example 1-1 using a viewing angle-controlling liquid crystal panel 10 of Example 1-2 having the same structure as that of Example 1-1 except that the azimuthal anchoring energy 2EB of the second alignment film 140 was changed to $1\times10^{-4}$ J/m$^2$.

Example 2

The polar angle dependence of transmittance and the viewing angle dependence of white transmittance were calculated as in Example 1-1 using a viewing angle-controlling liquid crystal panel 10 of Example 2 having the same structure as that of Example 1-1 except that the polar anchoring energy 2EA and the azimuthal anchoring energy 2EB of the second alignment film 140 were changed to $1\times10^{-7}$ J/m$^2$.

Example 3

The polar angle dependence of transmittance and the viewing angle dependence of white transmittance were calculated as in Example 1-1 using a viewing angle-controlling liquid crystal panel 10 of Example 3 having the same structure as that of Example 1-1 except that the polar anchoring energy 2EA and the azimuthal anchoring energy 2EB of the second alignment film 140 were changed to $1\times10^{-7}$ J/m$^2$ and the retardation And of the liquid crystal layer 130 was changed to 1554 nm.

Comparative Example 1-1

Figure 9A:
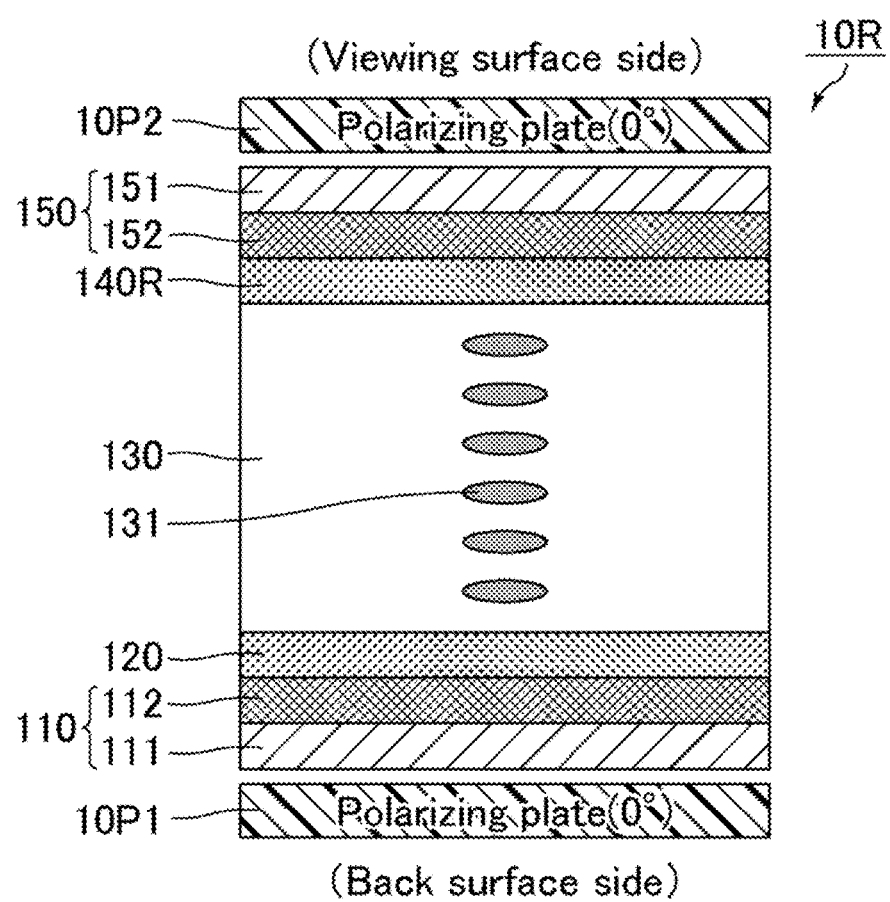
FIG. 9A is a schematic cross-sectional view of a viewing angle-controlling liquid crystal panel of Comparative Example 1-1 with no voltage applied.

FIG. 9A is a schematic cross-sectional view of a viewing angle-controlling liquid crystal panel of Comparative Example 1-1 with no voltage applied. FIG. 9B is a schematic cross-sectional view of the viewing angle-controlling liquid crystal panel of Comparative Example 1-1 with voltage applied. The polar angle dependence of transmittance and the viewing angle dependence of white transmittance were calculated as in Example 1-1 using a viewing angle-controlling liquid crystal panel 10R of Comparative Example 1-1 shown in FIG. 9A and FIG. 9B having the same structure as that of Example 1-1 except that the second alignment film 140 was changed to an alignment film 140R (strong anchoring film) having the same polar anchoring energy ($1\times10^3$ J/m$^2$) and the same azimuthal anchoring energy ($1\times10^3$ J/m$^2$) as the first alignment film 120. In the viewing angle-controlling liquid crystal panel 10R of Comparative Example 1-1, both the first alignment film 120 and the alignment film 140R were strong anchoring films.

Comparative Example 1-2

The polar angle dependence of transmittance and the viewing angle dependence of white transmittance were calculated as in Example 1-1 using a viewing angle-controlling liquid crystal panel 10R of Comparative Example 1-2 having the same structure as that of Example 1-1 except that the second alignment film 140 was changed to an alignment film 140R having a polar anchoring energy 2EA of $1\times10^3$ J/m$^2$ and an azimuthal anchoring energy 2EB of $1\times10^{-3}$ J/m$^2$.

Comparative Example 1-3

The polar angle dependence of transmittance and the viewing angle dependence of white transmittance were calculated as in Example 1-1 using a viewing angle-controlling liquid crystal panel 10R of Comparative Example 1-3 having the same structure as that of Example 1-1 except that the second alignment film 140 was changed to an alignment film 140R having a polar anchoring energy 2EA of $1\times10^{-3}$ J/m$^2$ and an azimuthal anchoring energy 2EB of $1\times10^3$ J/m$^2$.

Comparative Example 1-4

The polar angle dependence of transmittance and the viewing angle dependence of white transmittance were calculated as in Example 1-1 using a viewing angle-controlling liquid crystal panel 10R of Comparative Example 1-4 having the same structure as that of Example 1-1 except that the second alignment film 140 was changed to an alignment film 140R having a polar anchoring energy 2EA of $1\times10^{-4}$ J/m$^2$ and an azimuthal anchoring energy 2EB of $1\times10^{-3}$ J/m$^2$.

Comparative Example 2

Figure 10A:
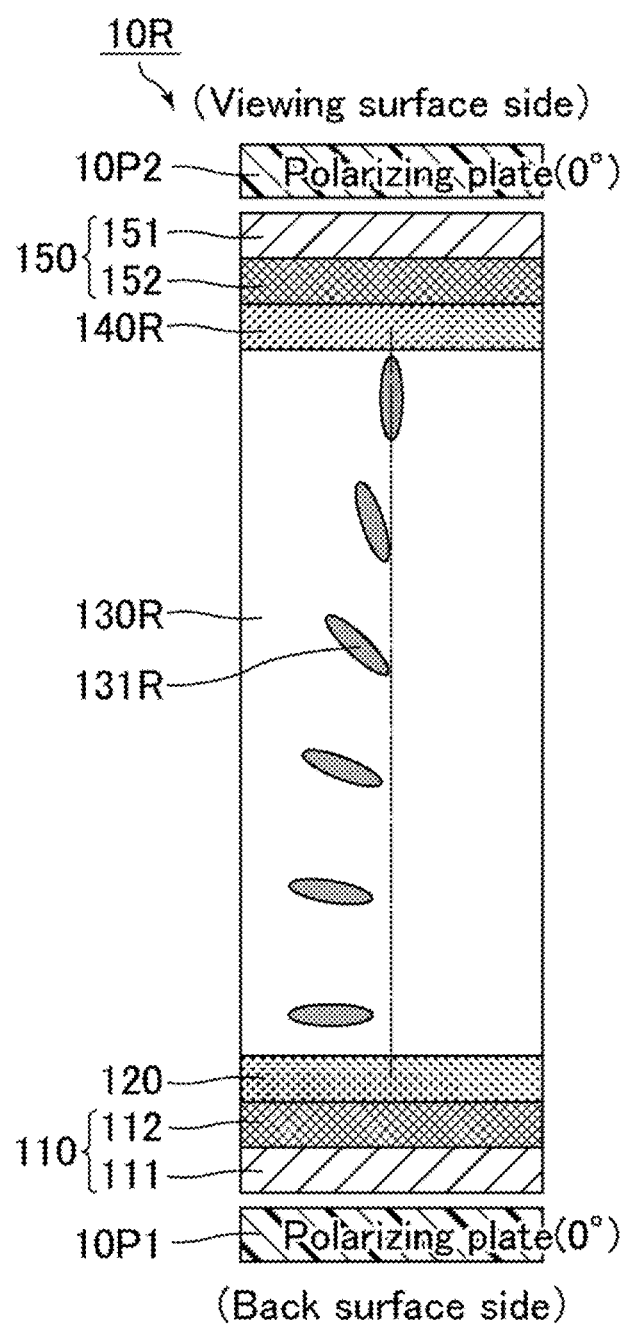
FIG. 10A is a schematic cross-sectional view of a viewing angle-controlling liquid crystal panel of Comparative Example 2 with no voltage applied.

FIG. 10A is a schematic cross-sectional view of a viewing angle-controlling liquid crystal panel of Comparative Example 2 with no voltage applied. FIG. 10B is a schematic cross-sectional view of the viewing angle-controlling liquid crystal panel of Comparative Example 2 with voltage applied. The polar angle dependence of transmittance and the viewing angle dependence of white transmittance were calculated as in Example 1-1 using a viewing angle-controlling liquid crystal panel 10R of Comparative Example 2 shown in FIG. 10A and FIG. 10B and having the same structure as that of Example 1-1 except that the second alignment film 140 was changed to an alignment film 140R (strong anchoring film) having the same polar anchoring energy ($1\times10^3$ J/m$^2$) and the same azimuthal anchoring energy ($1\times10^3$ J/m$^2$) as the first alignment film 120 and the liquid crystal layer 130 was changed to a liquid crystal layer 130R containing negative liquid crystal molecules 131R for operation in the HAN mode.

Comparative Example 3

The polar angle dependence of transmittance and the viewing angle dependence of white transmittance were calculated as in Example 1-1 using a viewing angle-controlling liquid crystal panel 10R of Comparative Example 3 having the same structure as that of Example 1-1 except that the second alignment film 140 was changed to an alignment film 140R (strong anchoring film) having the same polar anchoring energy ($1\times10^3$ J/m$^2$) and the same azimuthal anchoring energy ($1\times10^3$ J/m$^2$) as the first alignment film 120, the liquid crystal layer 130 was changed to the liquid crystal layer 130R containing the negative liquid crystal molecules 131R for operation in the HAN mode, and the retardation And of the liquid crystal layer 130R was changed to 1554 nm.

Comparative Example 4

The polar angle dependence of transmittance and the viewing angle dependence of white transmittance were calculated as in Example 1-1 using a viewing angle-controlling liquid crystal panel 10R of Comparative Example 4 having the same structure as that of Example 1-1 except that the second alignment film 140 was changed to an alignment film 140R (strong anchoring film) having the same polar anchoring energy ($1\times10^3$ J/m²) and the same azimuthal anchoring energy ($1\times10^3$ J/m²) as the first alignment film 120, the liquid crystal layer 130 was changed to the liquid crystal layer 130R containing the negative liquid crystal molecules 131R for operation in the HAN mode, and the retardation And of the liquid crystal layer 130R was changed to 5550 nm.

(Evaluation of Polar Angle Dependence of Transmittance and Viewing Angle Dependence of White Transmittance Using Viewing Angle-Controlling Liquid Crystal Panels of Example 1-1, Example 2, Example 3, Comparative Example 1-1, and Comparative Example 2 to Comparative Example 4)

Figure 12:
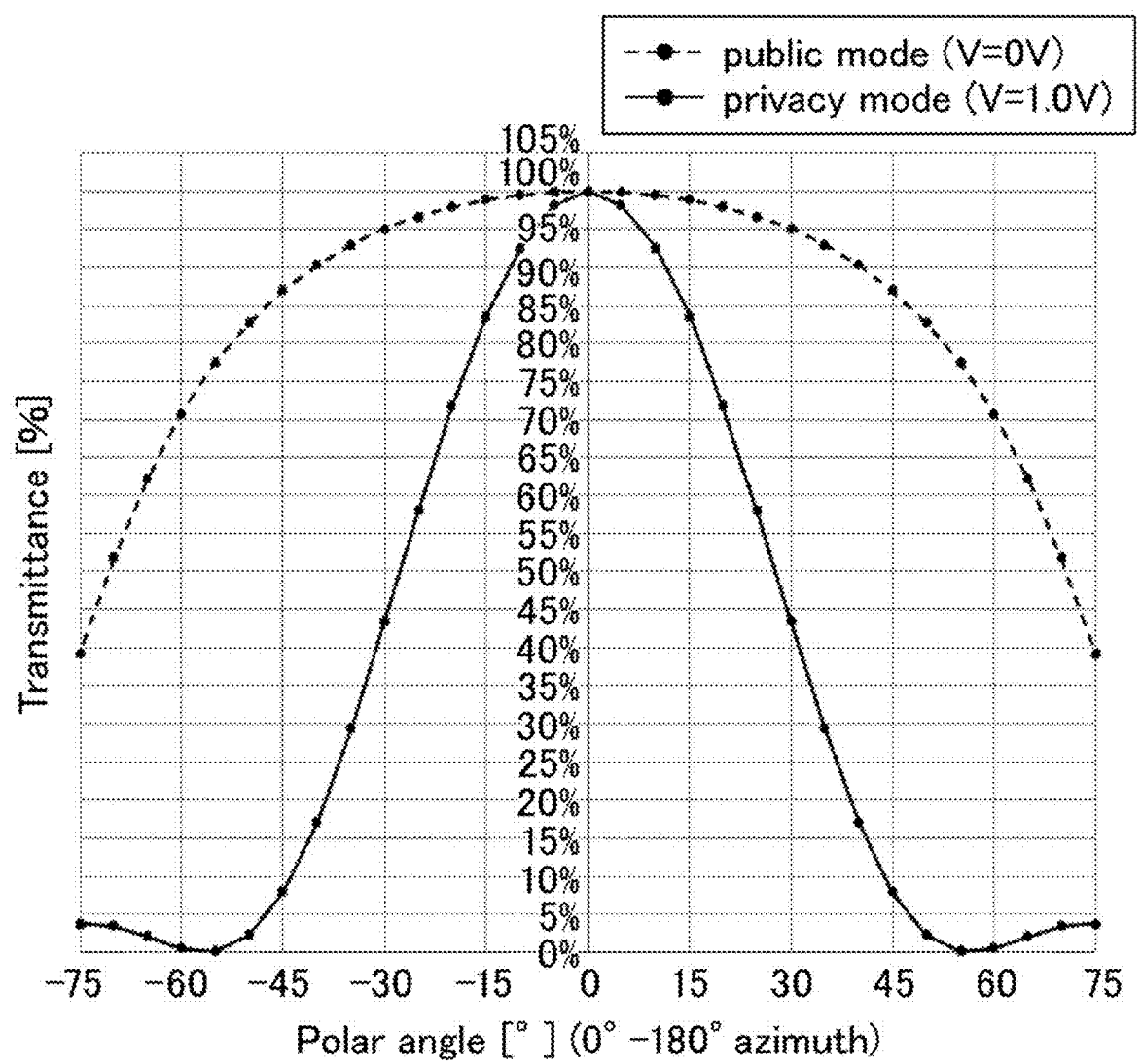
FIG. 12 is a graph showing the polar angle dependence of transmittance measured using the viewing angle-controlling liquid crystal panel of Example 2 with no voltage applied and with voltage applied.
Figure 13:
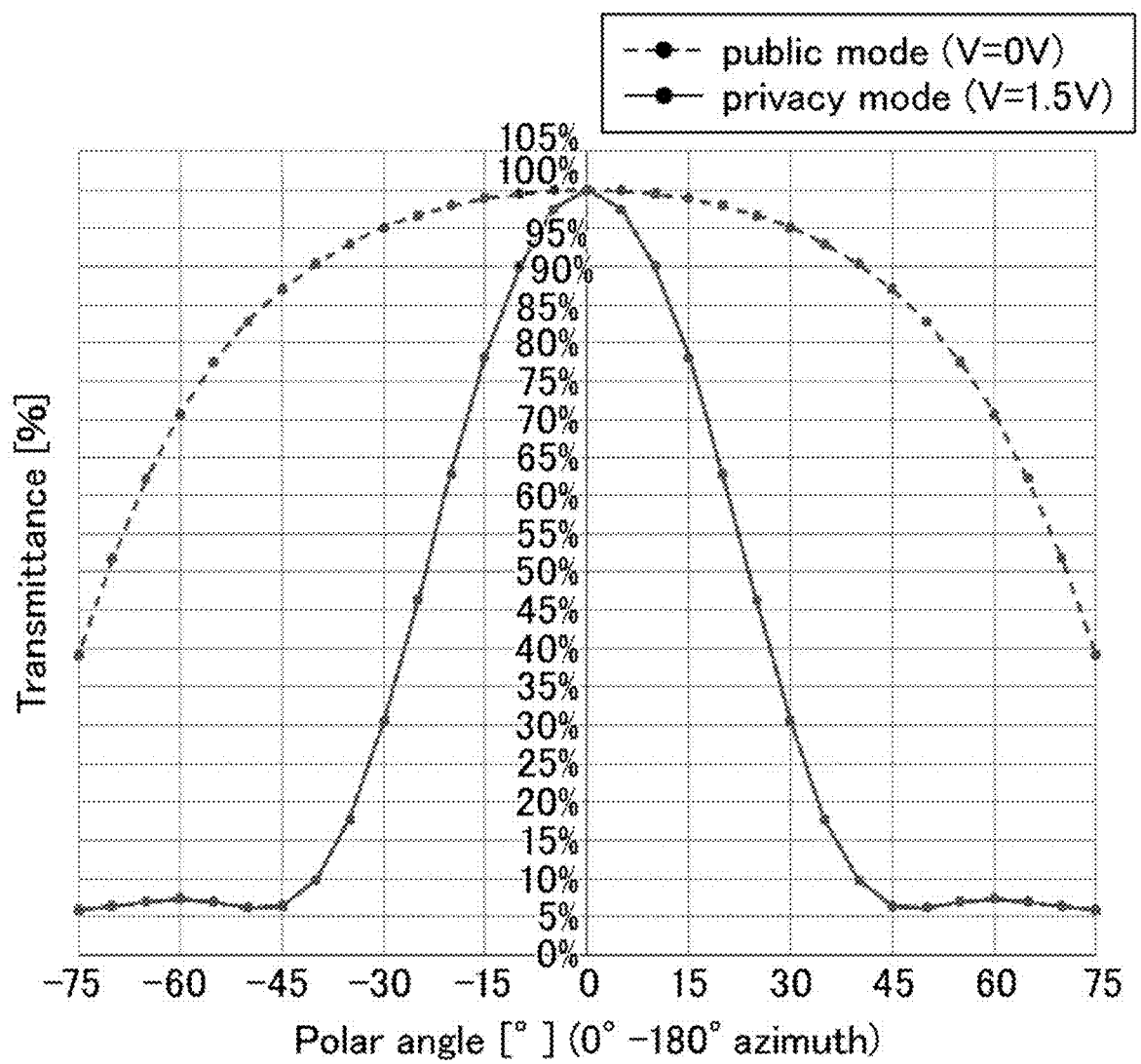
FIG. 13 is a graph showing the polar angle dependence of transmittance measured using the viewing angle-controlling liquid crystal panel of Example 3 with no voltage applied and with voltage applied.
Figure 14:
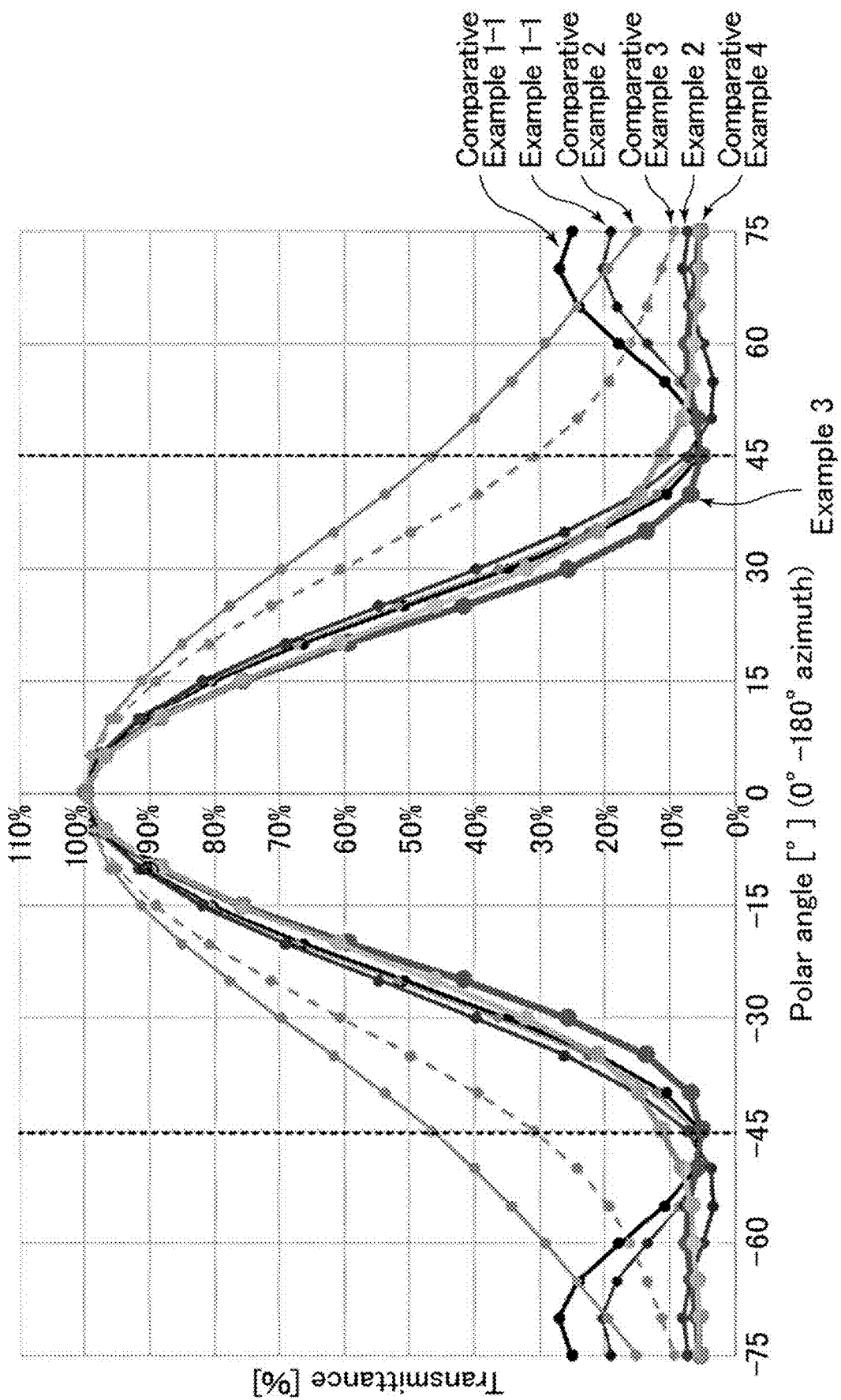
FIG. 14 is a graph showing the polar angle dependence of transmittance measured using the viewing angle-controlling liquid crystal panels of Example 1-1, Example 2, Example 3, Comparative Example 1-1, and Comparative Example 2 to Comparative Example 4 with voltage applied.
Figure 15A:
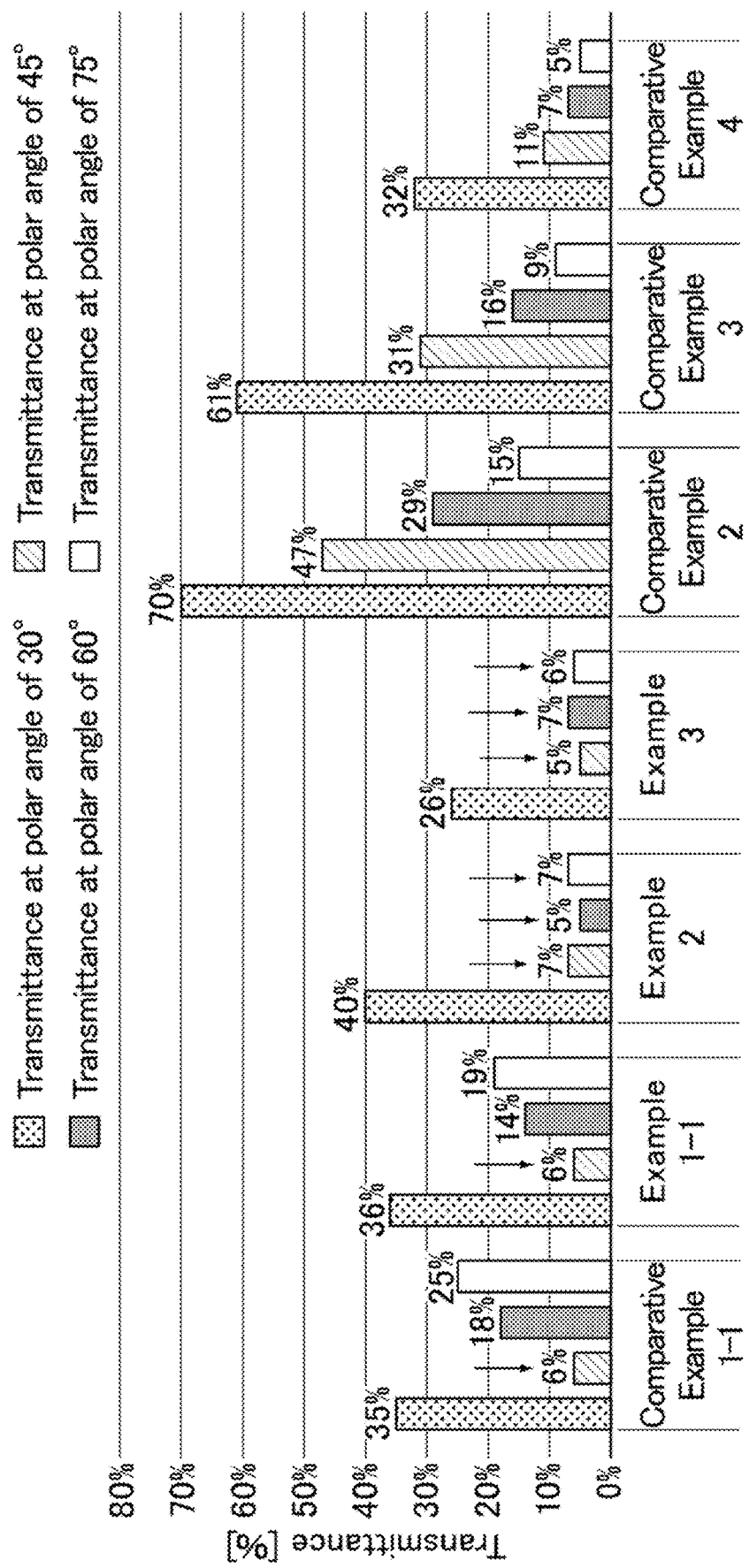
FIG. 15A is a graph showing the transmittances at polar angles of 30°, 45°, 60°, and 75° in FIG. 14 measured using the viewing angle-controlling liquid crystal panel of each of Example 1-1, Example 2, Example 3, Comparative Example 1-1, and Comparative Example 2 to Comparative Example 4.
Figure 15B:
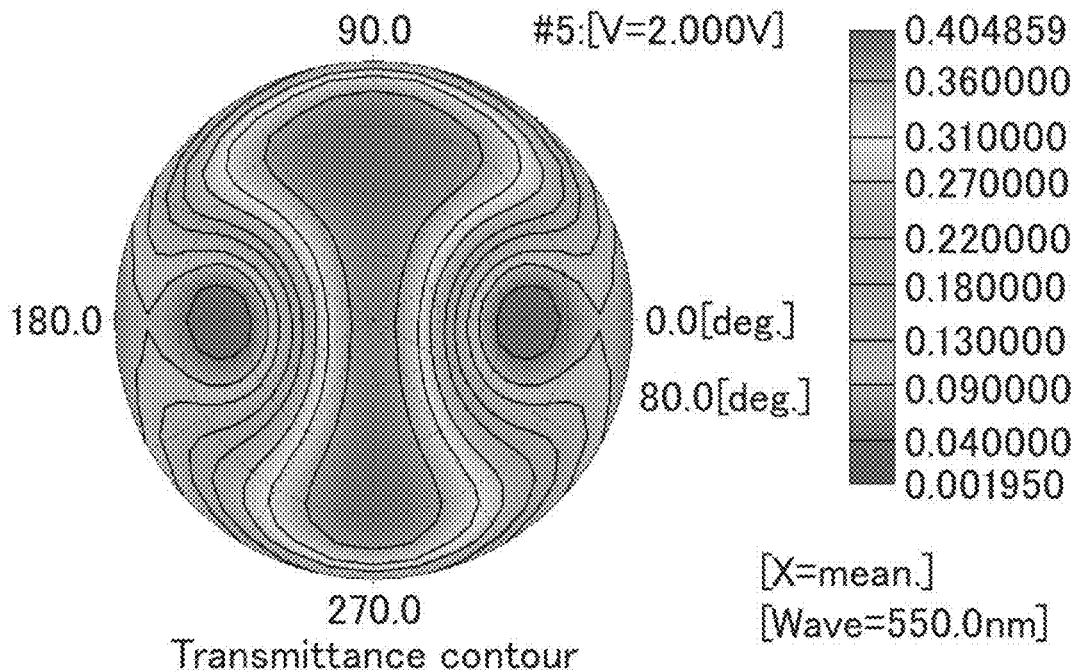
FIG. 15B is a graph showing the viewing angle dependence of white transmittance measured using the viewing angle-controlling liquid crystal panel of Comparative Example 1-1.
Figure 15C:
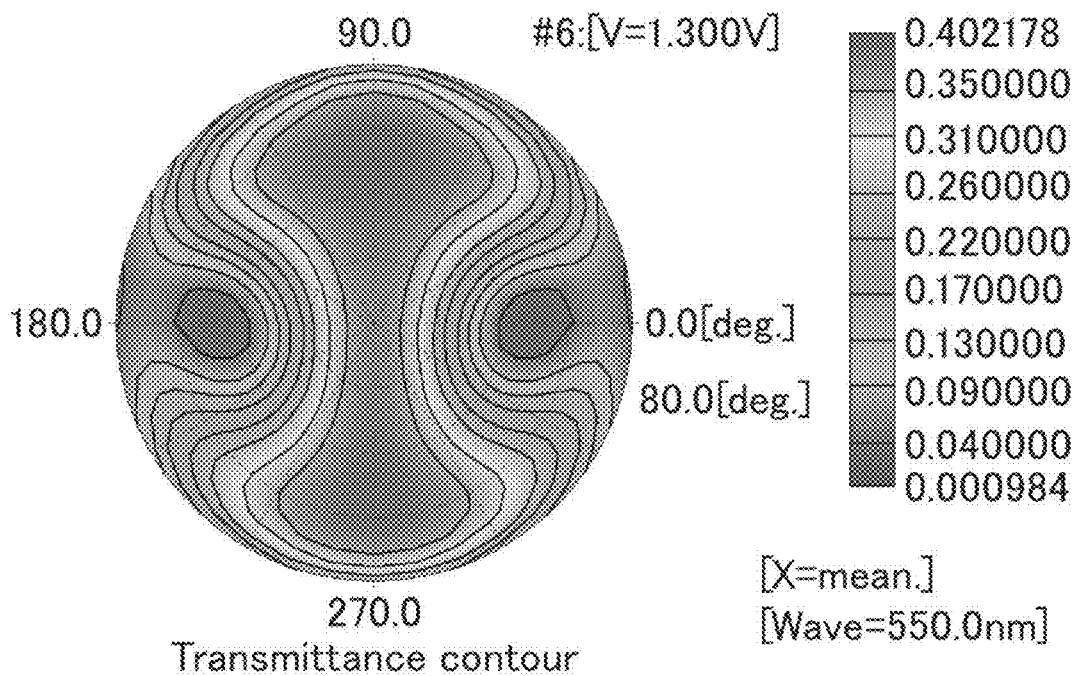
FIG. 15C is a graph showing the viewing angle dependence of white transmittance measured using the viewing angle-controlling liquid crystal panel of Example 1-1.
Figure 15D:
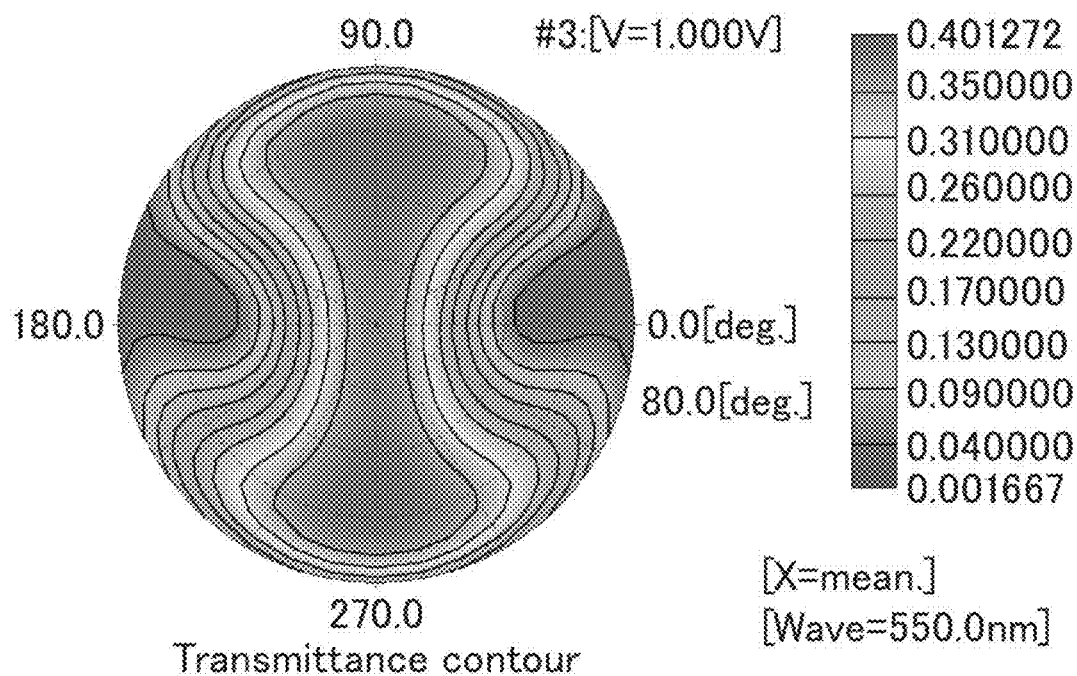
FIG. 15D is a graph showing the viewing angle dependence of white transmittance measured using the viewing angle-controlling liquid crystal panel of Example 2.
Figure 15E:
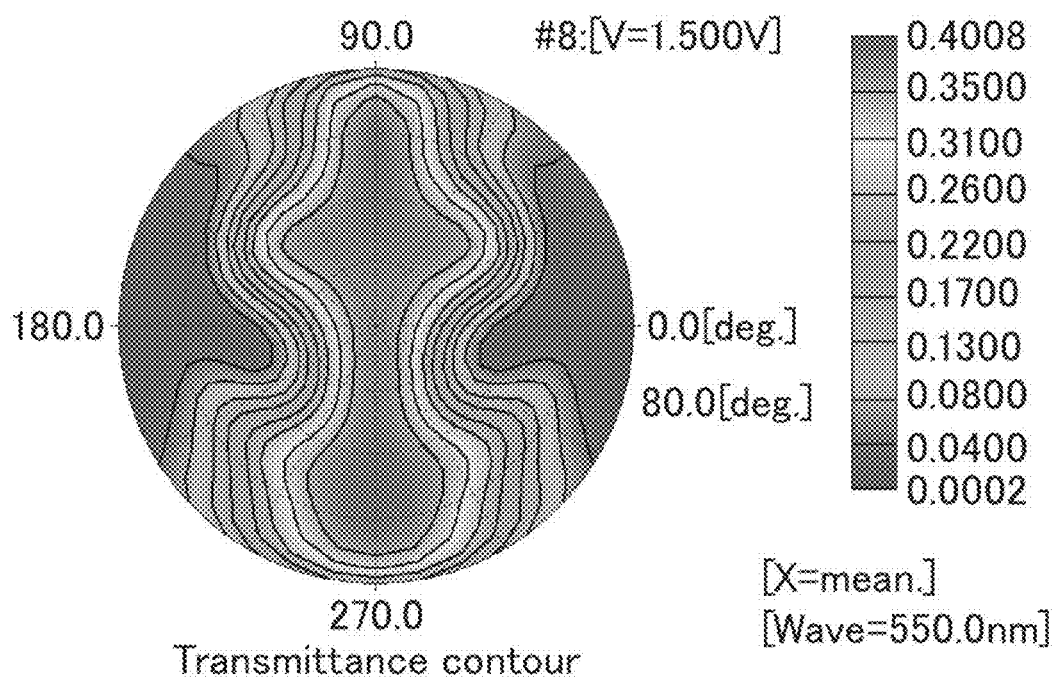
FIG. 15E is a graph showing the viewing angle dependence of white transmittance measured using the viewing angle-controlling liquid crystal panel of Example 3.
Figure 15F:
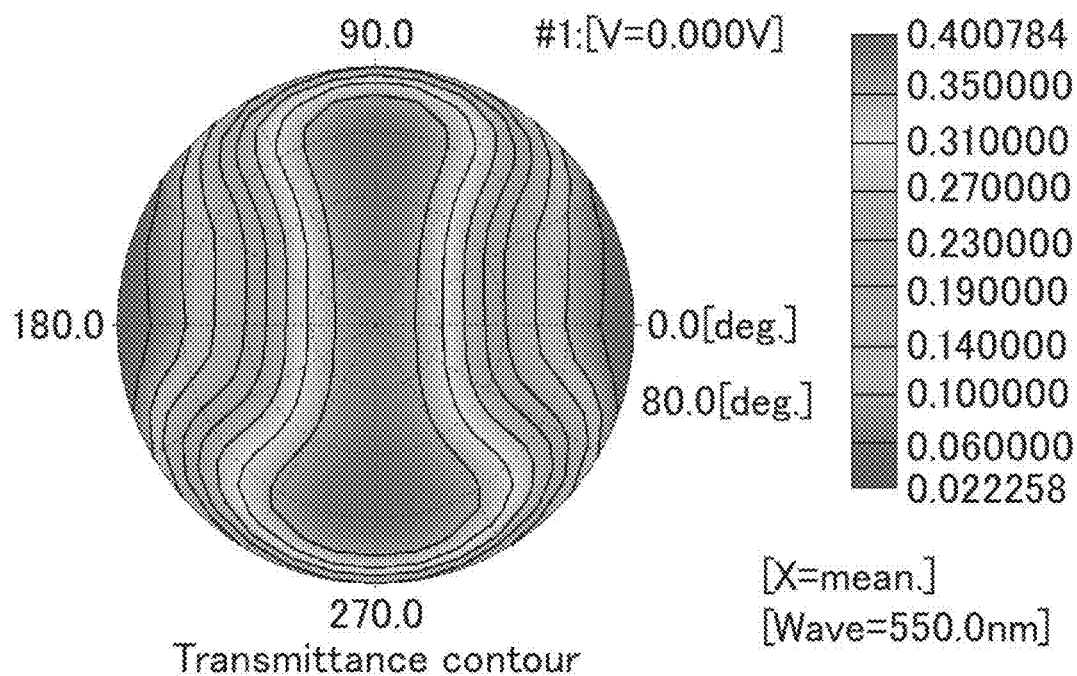
FIG. 15F is a graph showing the viewing angle dependence of white transmittance measured using the viewing angle-controlling liquid crystal panel of Comparative Example 2.
Figure 15G:
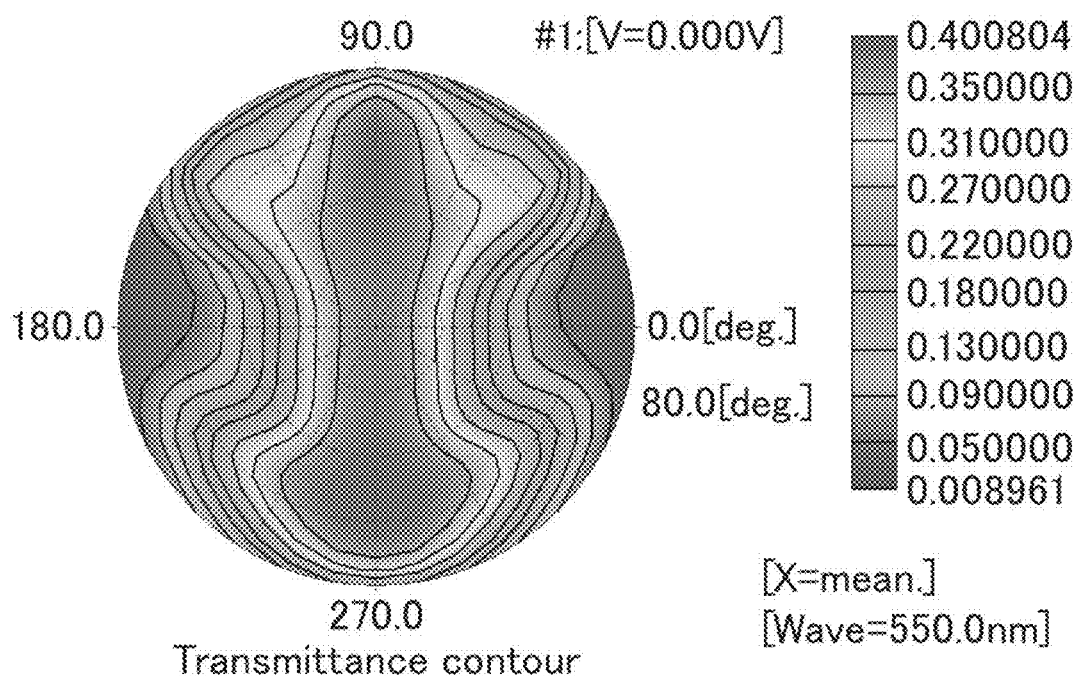
FIG. 15G is a graph showing the viewing angle dependence of white transmittance measured using the viewing angle-controlling liquid crystal panel of Comparative Example 3.

FIG. 11 is a graph showing the polar angle dependence of transmittance measured using the viewing angle-controlling liquid crystal panel of Example 1-1 with no voltage applied and with voltage applied. FIG. 12 is a graph showing the polar angle dependence of transmittance measured using the viewing angle-controlling liquid crystal panel of Example 2 with no voltage applied and with voltage applied. FIG. 13 is a graph showing the polar angle dependence of transmittance measured using the viewing angle-controlling liquid crystal panel of Example 3 with no voltage applied and with voltage applied. FIG. 14 is a graph showing the polar angle dependence of transmittance measured using the viewing angle-controlling liquid crystal panels of Example 1-1, Example 2, Example 3, Comparative Example 1-1, and Comparative Example 2 to Comparative Example 4 with voltage applied. FIG. 15A is a graph showing the transmittances at polar angles of 30°, 45°, 60°, and 75° in FIG. 14 measured using the viewing angle-controlling liquid crystal panel of each of Example 1-1, Example 2, Example 3, Comparative Example 1-1, and Comparative Example 2 to Comparative Example 4. FIG. 15B is a graph showing the viewing angle dependence of white transmittance measured using the viewing angle-controlling liquid crystal panel of Comparative Example 1-1. FIG. 15C is a graph showing the viewing angle dependence of white transmittance measured using the viewing angle-controlling liquid crystal panel of Example 1-1. FIG. 15D is a graph showing the viewing angle dependence of white transmittance measured using the viewing angle-controlling liquid crystal panel of Example 2. FIG. 15E is a graph showing the viewing angle dependence of white transmittance measured using the viewing angle-controlling liquid crystal panel of Example 3. FIG. 15F is a graph showing the viewing angle dependence of white transmittance measured using the viewing angle-controlling liquid crystal panel of Comparative Example 2. FIG. 15G is a graph showing the viewing angle dependence of white transmittance measured using the viewing angle-controlling liquid crystal panel of Comparative Example 3. FIG. 15H is a graph showing the viewing angle dependence of white transmittance measured using the viewing angle-controlling liquid crystal panel of Comparative Example 4.

As shown in FIG. 11 to FIG. 13, the viewing angle-controlling liquid crystal panels 10 of Example 1-1, Example 2, and Example 3 with no voltage applied were confirmed to moderately decrease the transmittance of the viewing angle-controlling liquid crystal panel 10 in response to the increase in the polar angle at the 0°-180° azimuth. This is presumably because the liquid crystal molecules 131 with no voltage applied are homogeneously aligned. Owing to such a feature, the viewing angle-controlling liquid crystal panels of Example 1-1, Example 2, and Example 3 successfully achieved the public mode (wide viewing angle mode). Example 1-2 achieved the same effect as Example 1-1.

Also, as shown in FIG. 11 to FIG. 14 and FIG. 15A, the viewing angle-controlling liquid crystal panel 10 of Example 1-1, Example 2, and Example 3 with voltage applied successfully reduced the transmittance not only at and around a polar angle of 45° but also at large polar angles (polar angles of 60° to 75°). This is presumably because the polar anchoring energy of the second alignment film 140, which was smaller than the polar anchoring energy of the first alignment film 120, caused the liquid crystal molecules 131 other than those in the vicinity of the first alignment film 120 to be vertically aligned with voltage applied as shown in FIG. 8B, thus achieving an alignment state similar to the HAN mode as shown in FIG. 10A. Owing to such a feature, the viewing angle-controlling liquid crystal panels of Example 1-1, Example 2, and Example 3 successfully achieved the privacy mode (narrow viewing angle mode). Example 1-2 achieved the same effect as Example 1-1.

In contrast, as shown in FIG. 14 and FIG. 15A, the viewing angle-controlling liquid crystal panel 10 of Comparative Example 1-1 with voltage applied blocked light only at a polar angle of 45° and failed to reduce the transmittance at the large polar angles. Comparative Example 1-2 to Comparative Example 1-4 demonstrated the same results as Comparative Example 1-1. The viewing angle-controlling liquid crystal panel 10 (HAN cell) of Comparative Example 2 had a transmittance as high as about 50% at a polar angle of 45°, meaning that it hardly blocked light. Increasing the retardation in Comparative Example 2 as in Comparative Example 3 and Comparative Example 4 successfully increased the oblique light-blocking ability (blocking of light at the large polar angles). Yet, the retardation And should be about 5000 nm in order to achieve the light-blocking ability of a level not lower than that in Example 1-1 at the large polar angles. For example, when liquid crystal molecules has a refractive index Δn as high as 0.22, the liquid crystal layer 130 was found to have poor mass productivity as it was required to have a thickness d of 25 μm.

FIG. 14 and FIG. 15A show that the transmittance at the large polar angles was reduced (the light-blocking ability was improved) in Example 2 as compared to that in Example 1-1. This is presumably because the polar anchoring energy 2EA and the azimuthal anchoring energy 2EB of the second alignment film 140 in Example 2 were each $1\times10^{-7}$ J/m² and were smaller than the polar anchoring energy 2EA and the azimuthal anchoring energy 2EB of the second alignment film 140 in Example 1-1, respectively.

FIG. 14 and FIG. 15A show that the transmittance at the large polar angles was reduced (the light-blocking ability was improved) in Example 3 as compared to that in Example 1-1 and Example 2. This is presumably because the polar anchoring energy 2EA and the azimuthal anchoring energy 2EB of the second alignment film 140 in Example 3 were each $1\times10^{-7}$ J/m² and were smaller than the polar anchoring energy 2EA and the azimuthal anchoring energy 2EB of the second alignment film 140 in Example 1-1, respectively, and the retardation And of the liquid crystal layer 130 in Example 3 was 1554 nm and was greater than the retardations And of the liquid crystal layers 130 in Example 1-1 and Example 2.

(Evaluation of Optimal Voltage for Viewing Angle-Controlling Liquid Crystal Panels of Example 1-1, Example 2, and Example 3)

Figure 17:
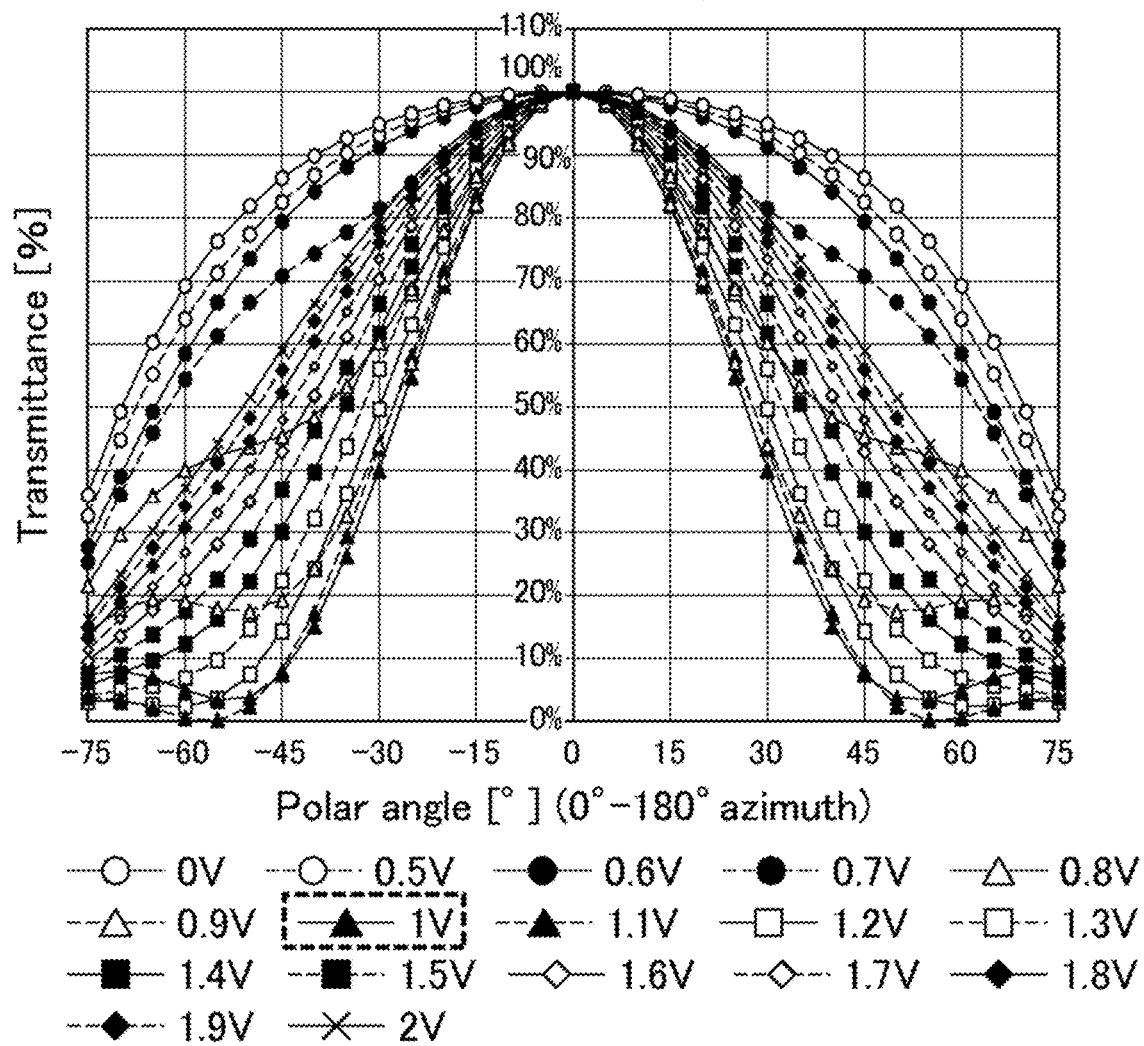
FIG. 17 is a graph showing the polar angle dependence of transmittance when the voltage applied to the viewing angle-controlling liquid crystal panel of Example 2 was varied.
Figure 18:
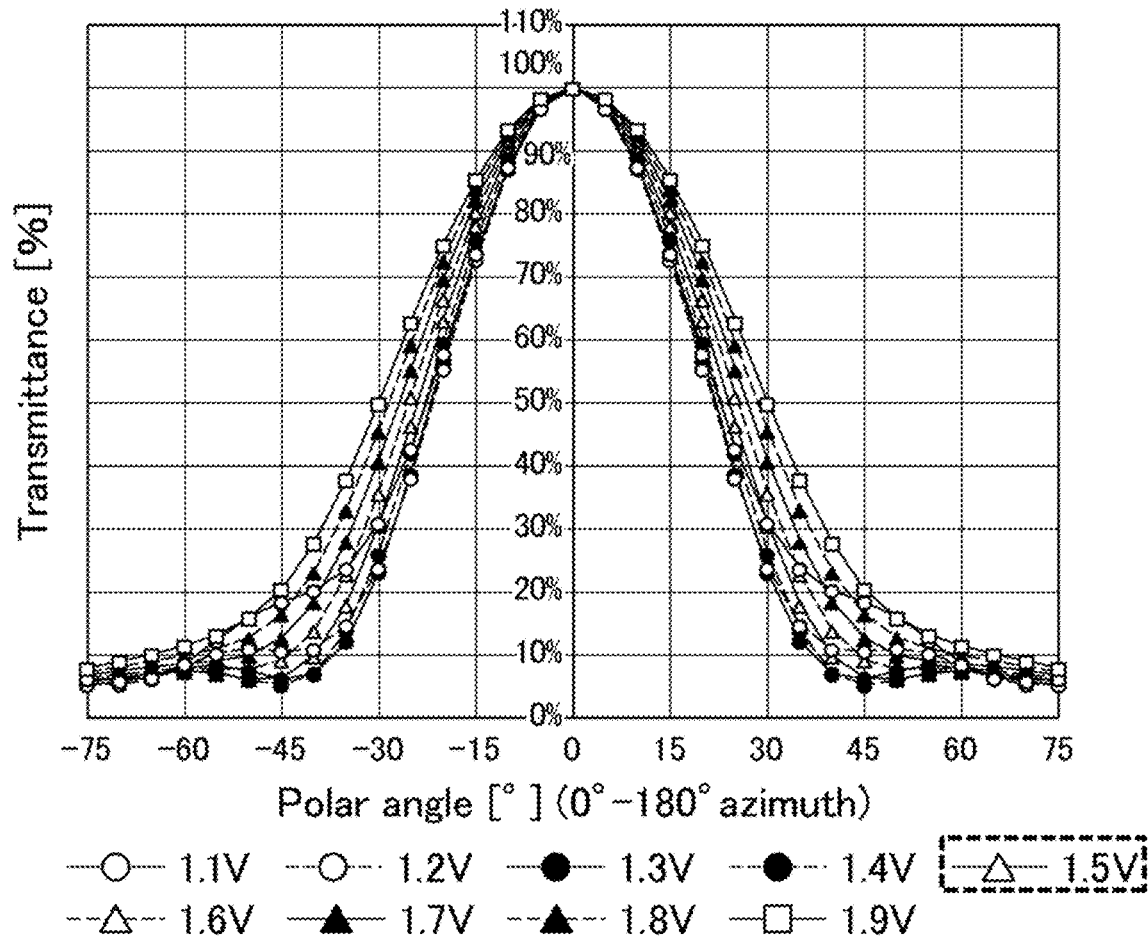
FIG. 18 is a graph showing the polar angle dependence of transmittance when the voltage applied to the viewing angle-controlling liquid crystal panel of Example 3 was varied.

A backlight was placed on the back surface side of the viewing angle-controlling liquid crystal panel 10 of each of Example 1-1, Example 2, and Example 3. The voltage applied thereto was varied to determine the polar angle dependence of transmittance of light passing through the viewing angle-controlling liquid crystal panel. FIG. 16 is a graph showing the polar angle dependence of transmittance when the voltage applied to the viewing angle-controlling liquid crystal panel of Example 1-1 was varied. FIG. 17 is a graph showing the polar angle dependence of transmittance when the voltage applied to the viewing angle-controlling liquid crystal panel of Example 2 was varied. FIG. 18 is a graph showing the polar angle dependence of transmittance when the voltage applied to the viewing angle-controlling liquid crystal panel of Example 3 was varied. In FIG. 16 to FIG. 18, the voltage applied, which is surrounded by the dashed line, indicates the optimal voltage at which the transmittance at the large polar angles can be most effectively reduced.

FIG. 16 shows that the viewing angle-controlling liquid crystal panel 10 of Example 1-1 most effectively reduced the transmittance at the large polar angles when the voltage applied was 1.3 V. FIG. 17 shows that the viewing angle-controlling liquid crystal panel 10 of Example 2 most effectively reduced the transmittance at the large polar angles when the voltage applied was 1.0 V. FIG. 18 shows that the viewing angle-controlling liquid crystal panel 10 of Example 3 most effectively reduced the transmittance at the large polar angles when the voltage applied was 1.5 V.
(Evaluation of Polar Angle Dependence of Transmittance of Viewing Angle-Controlling Liquid Crystal Panels of Example 1-1 to Example 1-2 and Comparative Examples 1-1 to 1-4)

Figure 19:
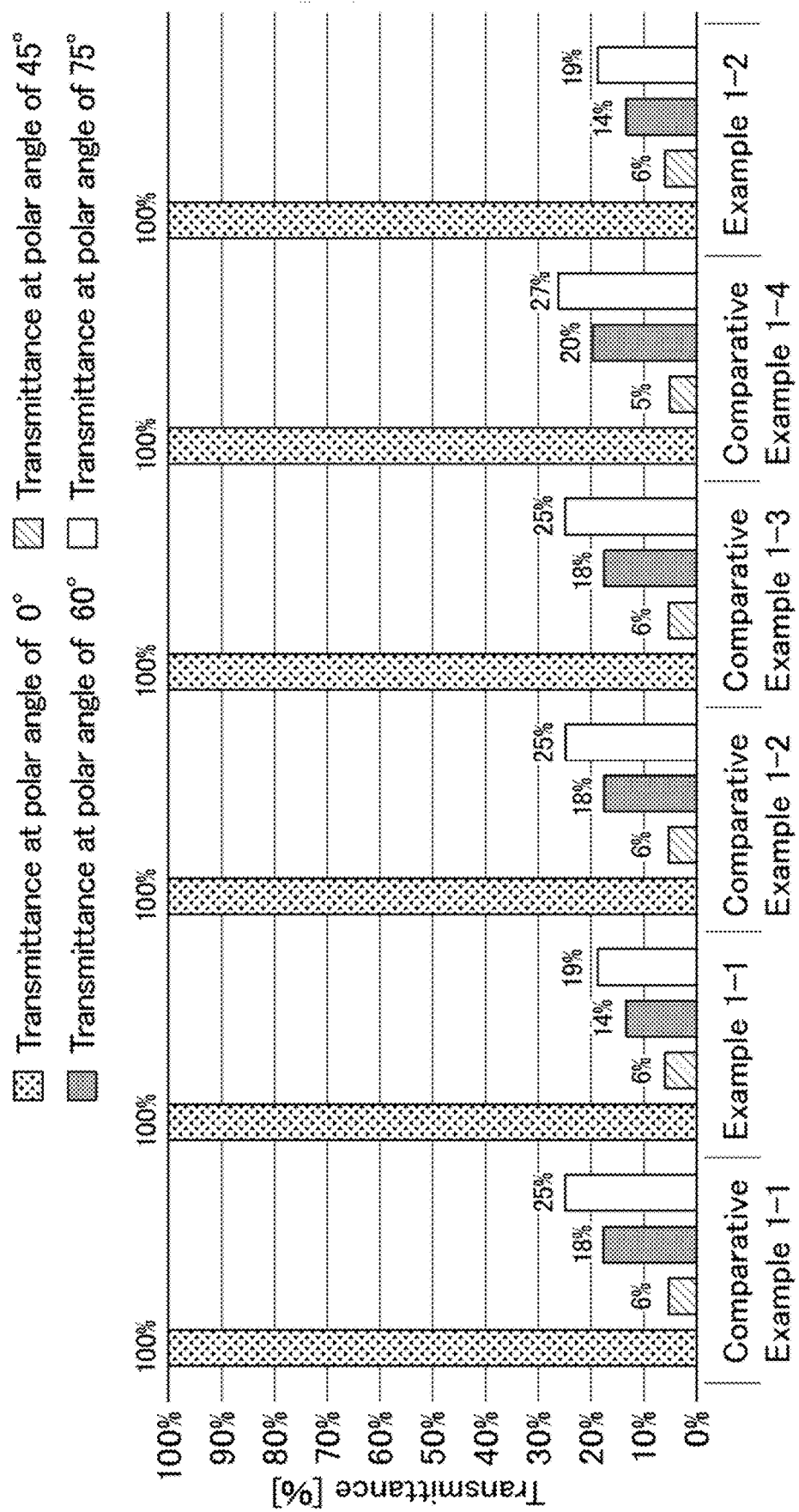
FIG. 19 is a graph showing the polar angle dependence of transmittance measured using the viewing angle-controlling liquid crystal panels of Example 1-1, Example 1-2, and Comparative Examples 1-1 to 1-4 with voltage applied.

A backlight was placed on the back surface side of the viewing angle-controlling liquid crystal panel of each of Example 1-1, Example 1-2, and Comparative Examples 1-1 to 1-4. The polar angle dependence of transmittance of light passing through the viewing angle-controlling liquid crystal panel was calculated. FIG. 19 is a graph showing the polar angle dependence of transmittance measured using the viewing angle-controlling liquid crystal panels of Example 1-1, Example 1-2, and Comparative Examples 1-1 to 1-4 with voltage applied. FIG. 19 shows the transmittances at polar angles of 45°, 60°, and 75° in each of the examples and the comparative examples when the transmittance at a polar angle of 0° was taken as 100%.

Example 1-1, Example 1-2, and Comparative Example 1-4 demonstrated that the polar anchoring energy 2EA of the second alignment film 140 not greater than the azimuthal anchoring energy 2EB of the second alignment film 140 contributes to reduction of transmittance at the large polar angles (polar angles of 60° to) 75°. Example 1-1, Example 1-2, and Comparative Example 1-3 also demonstrated that the polar anchoring energy 2EA of the second alignment film 140 not greater than the azimuthal anchoring energy 2EB failed to achieve a sufficient effect of reducing transmittance at the large polar angles when the polar anchoring energy 2EA and the azimuthal anchoring energy 2EB of the second alignment film 140 were not smaller than the polar anchoring energy 1EA and the azimuthal anchoring energy 1EB of the first alignment film 120, respectively.

Example 4-1

Figure 20A:
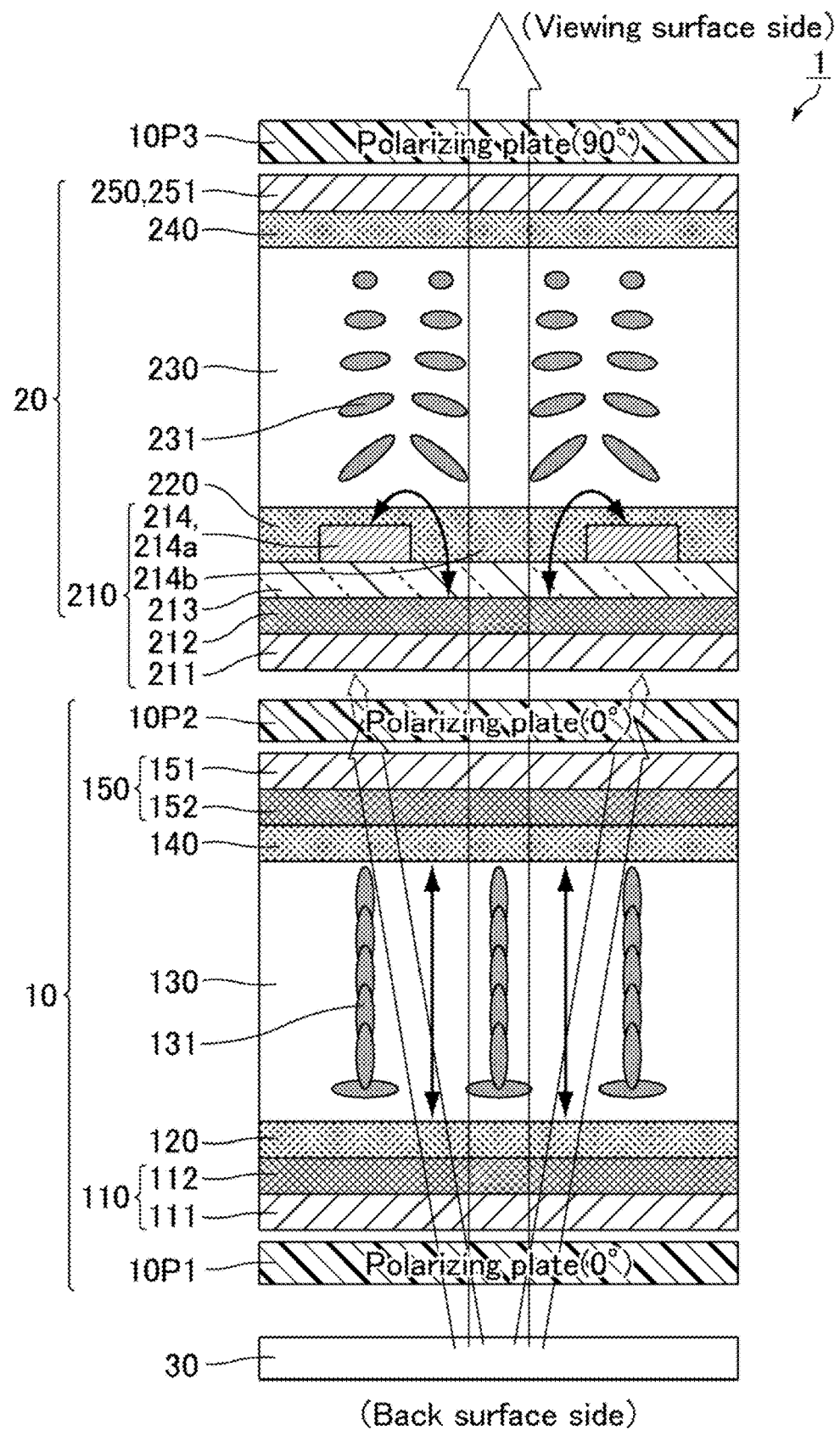
FIG. 20A is a schematic cross-sectional view of a liquid crystal display device of Example 4-1 with voltage applied to its display-providing liquid crystal panel and its viewing angle-controlling liquid crystal panel.
Figure 20B:
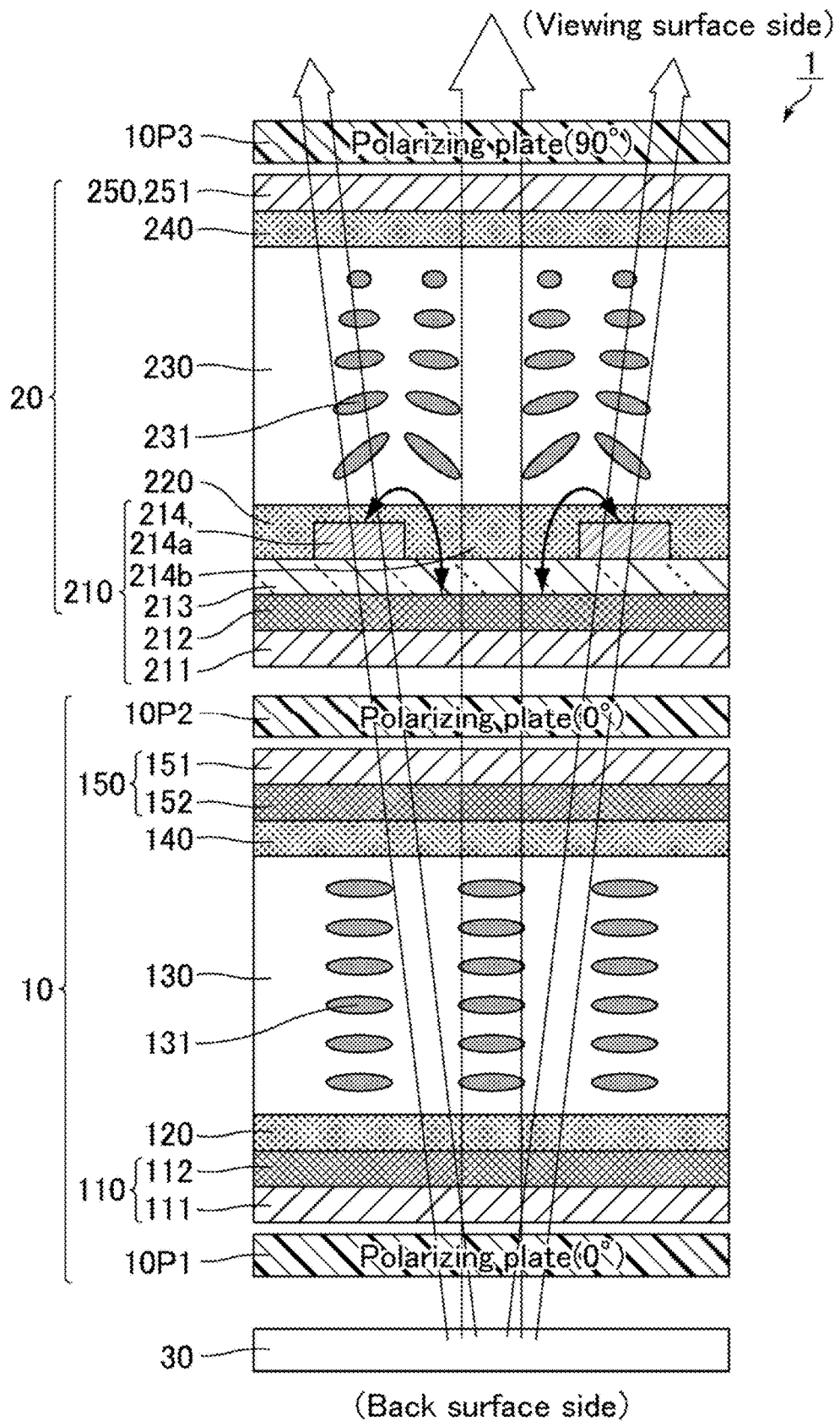
FIG. 20B is a schematic cross-sectional view of the liquid crystal display device of Example 4-1 with voltage applied to its display-providing liquid crystal panel and with no voltage applied to its viewing angle-controlling liquid crystal panel.

FIG. 20A is a schematic cross-sectional view of a liquid crystal display device of Example 4-1 with voltage applied to its display-providing liquid crystal panel and its viewing angle-controlling liquid crystal panel. FIG. 20B is a schematic cross-sectional view of the liquid crystal display device of Example 4-1 with voltage applied to its display-providing liquid crystal panel and with no voltage applied to its viewing angle-controlling liquid crystal panel. A liquid crystal display device 1 of Example 4-1 which has the same structure as that of Embodiment 2 and is shown in FIG. 5 to FIG. 7, FIG. 20A, and FIG. 20B was produced. The viewing angle-controlling liquid crystal panel 10 used was the viewing angle-controlling liquid crystal panel 10 of Example 1-1. The liquid crystal display device 1 of Example 4-1 is a dual cell-type viewing angle-switching liquid crystal display device in which the viewing angle-controlling liquid crystal panel 10 is overlaid with the display-providing liquid crystal panel 20. The display-providing liquid crystal panel 20 used was the FFS mode liquid crystal panel. The display-providing liquid crystal layer 230 in the display-providing liquid crystal panel 20 contained the positive liquid crystal molecules 231 which were homogenously aligned with no voltage applied. The third alignment film 220 and the fourth alignment film 240 were rubbed alignment films. Each of the third alignment film 220 and the fourth alignment film 240 was a strong anchoring film having a polar anchoring energy and an azimuthal anchoring energy of $1 \times 10^3$ J/m². The first polarizing plate 10P1 and the second polarizing plate 10P2 between which the viewing angle-controlling liquid crystal panel 10 was sandwiched were arranged in parallel Nicols. The second polarizing plate 10P2 and the third polarizing plate 10P3 between which the display-providing liquid crystal panel 20 was sandwiched were arranged in crossed Nicols.

With voltage applied to the viewing angle-controlling liquid crystal panel 10, as shown in FIG. 20A, light (polarized light) from the backlight 30 having passed through the first polarizing plate 10P1 was perpendicular to the polarization axis of the second polarizing plate 10P2 and was therefore absorbed by the second polarizing plate 10P2. This reduced the amount of light propagating in oblique directions, thus achieving the narrow viewing angle mode. In addition, in Example 4-1, the polar anchoring energy 2EA and the azimuthal anchoring energy 2EB of the second alignment film 140 in the viewing angle-controlling liquid crystal panel 10 were smaller than the polar anchoring energy 1EA and the azimuthal anchoring energy 1EB of the first alignment film 120, respectively. This mode effectively blocked light at the large polar angles in the narrow viewing angle mode.

With no voltage applied to the viewing angle-controlling liquid crystal panel 10, as shown in FIG. 20B, light (polarized light) from the backlight 30 having passed through the first polarizing plate 10P1 was parallel to the polarization axis of the second polarizing plate 10P2 and therefore passed through the second polarizing plate 10P2. This mode provided bright display in oblique directions.

Example 4-2

A liquid crystal display device 1 of Example 4-2 was produced as in Example 4-1, except that the viewing angle-controlling liquid crystal panel 10 of Example 2 was used. The liquid crystal display device 1 of Example 4-2 achieved the same effect as in Example 4-1.

Example 4-3

A liquid crystal display device 1 of Example 4-3 was produced as in Example 4-1, except that the viewing angle-controlling liquid crystal panel 10 of Example 3 was used. The liquid crystal display device 1 of Example 4-3 achieved the same effect as in Example 4-1.

Example 5-1

Figure 21:
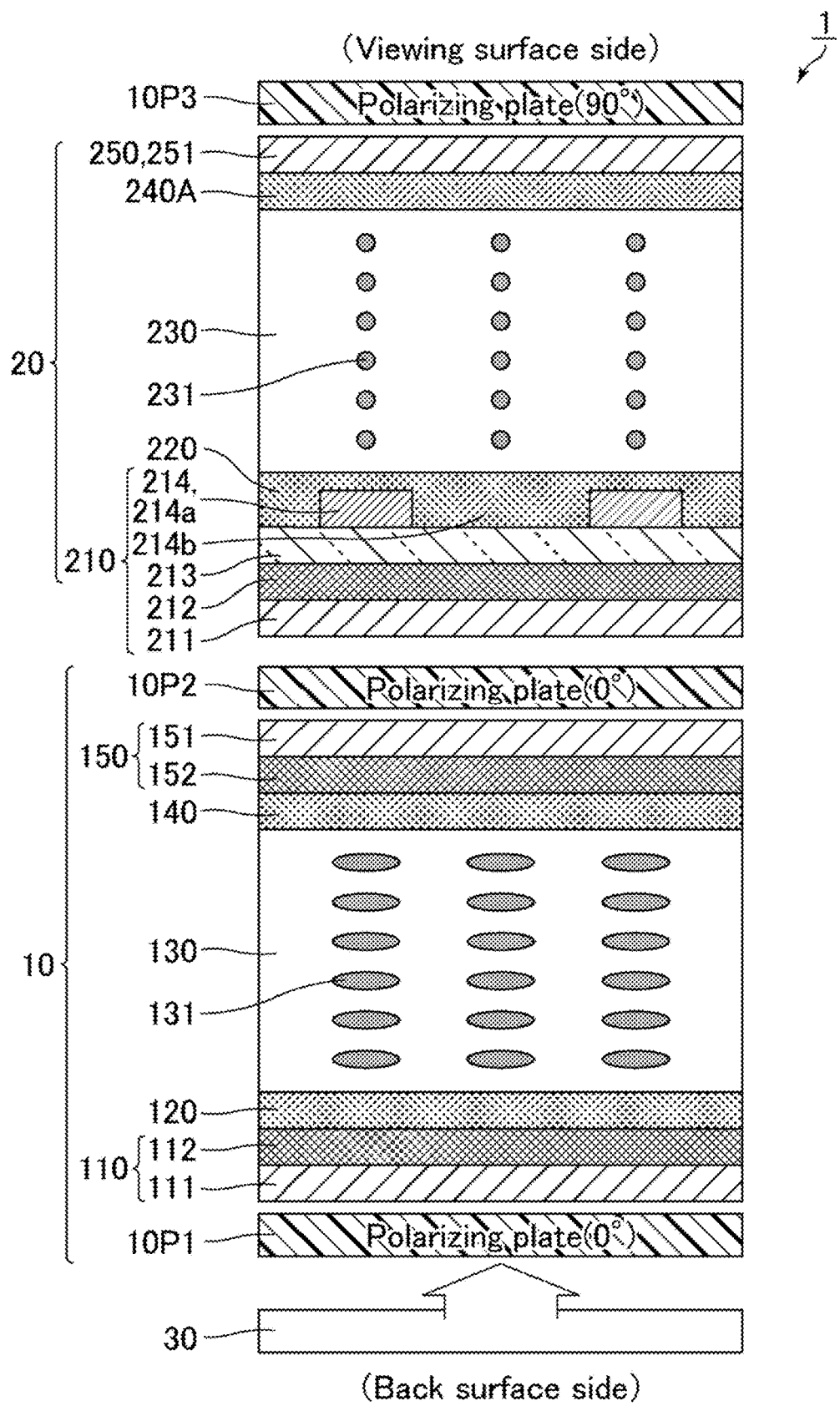
FIG. 21 is a schematic cross-sectional view of a liquid crystal display device of Example 5-1.
Figure 22A:
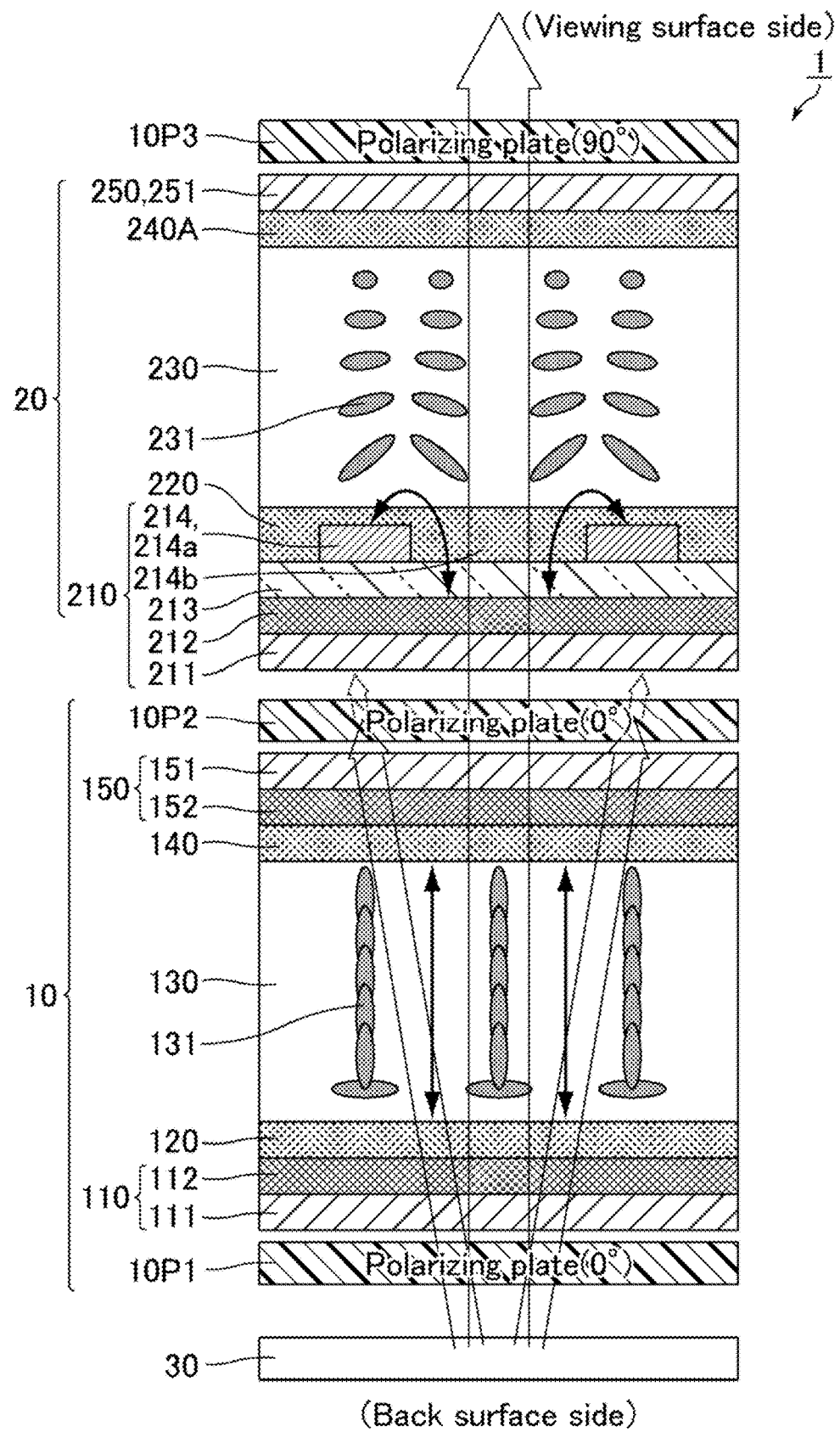
FIG. 22A is a schematic cross-sectional view of the liquid crystal display device of Example 5-1 with voltage applied to its display-providing liquid crystal panel and its viewing angle-controlling liquid crystal panel.
Figure 22B:
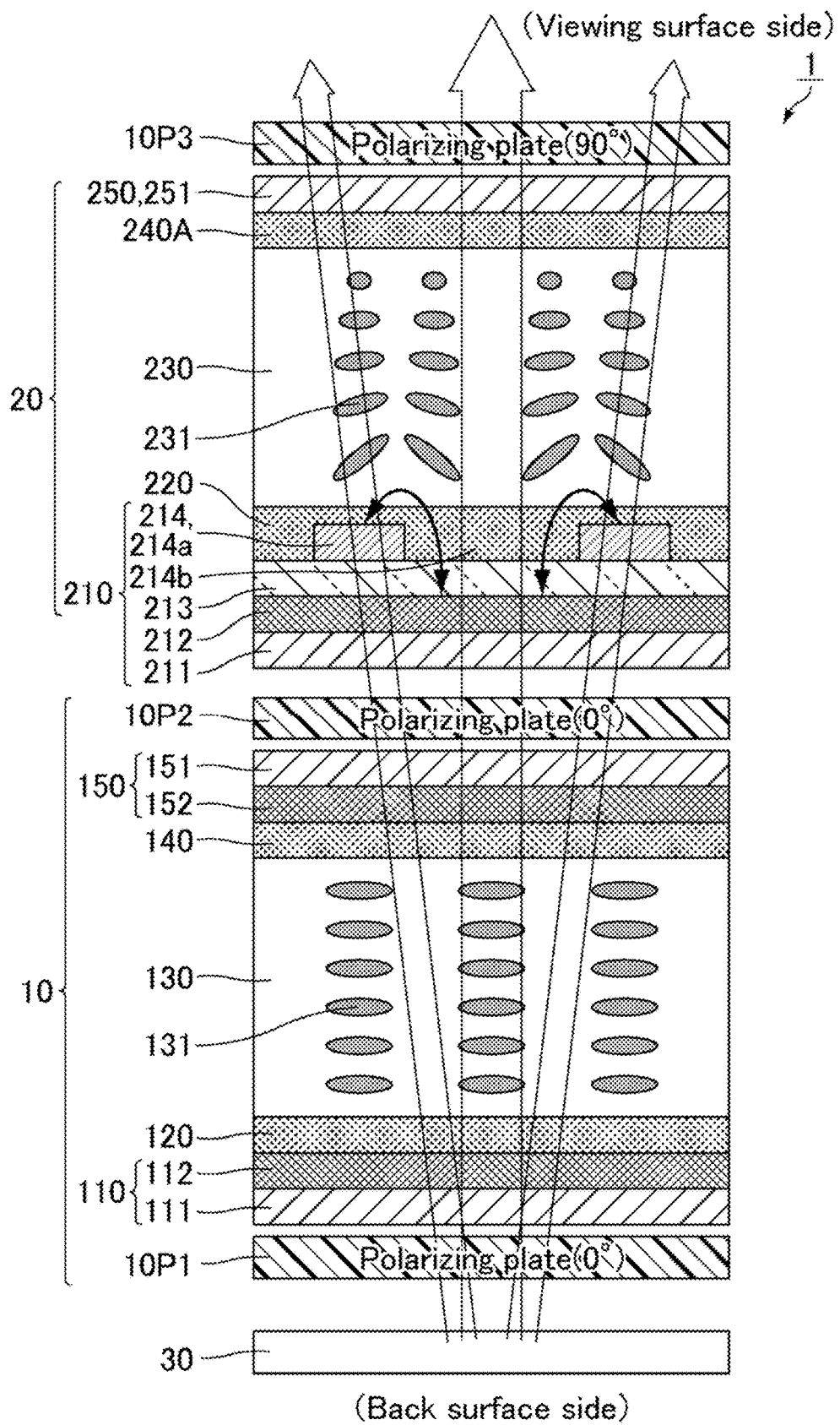
FIG. 22B is a schematic cross-sectional view of the liquid crystal display device of Example 5-1 with voltage applied to its display-providing liquid crystal panel and with no voltage applied to its viewing angle-controlling liquid crystal panel.

FIG. 21 is a schematic cross-sectional view of a liquid crystal display device of Example 5-1. FIG. 22A is a schematic cross-sectional view of the liquid crystal display device of Example 5-1 with voltage applied to its display-providing liquid crystal panel and its viewing angle-controlling liquid crystal panel. FIG. 22B is a schematic cross-sectional view of the liquid crystal display device of Example 5-1 with voltage applied to its display-providing liquid crystal panel and with no voltage applied to its viewing angle-controlling liquid crystal panel. A liquid crystal display device 1 of Example 5-1 shown in FIG. 21, FIG. 22A, and FIG. 22B was produced as in Example 4-1, except that the fourth alignment film 240 was changed to a fourth alignment film 240A having a polar anchoring energy of $1\times10^3$ J/m$^2$ and an azimuthal anchoring energy of $1\times10^{-3}$ J/m$^2$. In Example 5-1, the fourth alignment film 240A was a slippery alignment film.

With voltage applied to the viewing angle-controlling liquid crystal panel 10, as shown in FIG. 22A, light (polarized light) from the backlight 30 having passed through the first polarizing plate 10P1 was perpendicular to the polarization axis of the second polarizing plate 10P2 and was therefore absorbed by the second polarizing plate 10P2. This reduced the amount of light propagating in oblique directions. At this time, the liquid crystal molecules 231 in the vicinity of the fourth alignment film 240 were rotated by the fringe electric fields. Yet, since oblique light from the backlight 30 was cut by the viewing angle-controlling liquid crystal panel 10, the device successfully achieved the narrow viewing angle mode.

With no voltage applied to the viewing angle-controlling liquid crystal panel 10, as shown in FIG. 22B, light (polarized light) from the backlight 30 having passed through the first polarizing plate 10P1 was parallel to the polarization axis of the second polarizing plate 10P2 and therefore passed through the second polarizing plate 10P2. This resulted in bright display in oblique directions. Also, the amount of oblique light passing through the display-providing liquid crystal panel 20 increased as compared to that in Example 4-1. This is presumably because the viewing angle was further widened since when the display-providing liquid crystal panel 20 is a liquid crystal panel in a horizontal electric field mode such as the FFS mode, the liquid crystal molecules 231 in the vicinity of the fourth alignment film 240A, which is a slippery alignment film, can be rotated by a fringe electric field far from the molecules.

Example 5-2

A liquid crystal display device 1 of Example 5-2 was produced as in Example 5-1, except that the viewing angle-controlling liquid crystal panel 10 of Example 2 was used. The liquid crystal display device 1 of Example 5-2 achieved the same effect as in Example 5-1.

Example 5-3

A liquid crystal display device 1 of Example 5-3 was produced as in Example 5-1, except that the viewing angle-controlling liquid crystal panel 10 of Example 3 was used. The liquid crystal display device 1 of Example 5-3 achieved the same effect as in Example 5-1.

REFERENCE SIGNS LIST

1: liquid crystal display device
10, 10R: viewing angle-controlling liquid crystal panel
20: display-providing liquid crystal panel
30: backlight
10P1: first polarizing plate
10P2: second polarizing plate
10P3: third polarizing plate
11P: pixel
110: first substrate
111: first support substrate
112: first electrode
113: gate line
114: source line
115: thin film transistor (TFT)
120: first alignment film
130, 130R: liquid crystal layer
131, 131R, 231: liquid crystal molecule
140: second alignment film
140R: alignment film
150: second substrate
151: second support substrate
152: second electrode
210: third substrate
211: third support substrate
212: third electrode
213: insulating layer
214: fourth electrode
214a: linear electrode
214b: opening
220: third alignment film
230: display-providing liquid crystal layer
240, 240A: fourth alignment film
250: fourth substrate
251: fourth support substrate

What is claimed is:

1. A liquid crystal panel comprising, sequentially from a back surface side toward a viewing surface side:
    a first substrate including a first electrode;
    a first alignment film;
    a liquid crystal layer containing liquid crystal molecules having a positive anisotropy of dielectric constant;
    a second alignment film; and
    a second substrate including a second electrode, wherein:
    the liquid crystal molecules are homogeneously aligned with no voltage applied between the first electrode and the second electrode,
    a polar anchoring energy 2EA and an azimuthal anchoring energy 2EB of the second alignment film are smaller than a polar anchoring energy 1EA and an azimuthal anchoring energy 1EB of the first alignment film, respectively,
    the polar anchoring energy 2EA of the second alignment film is not greater than the azimuthal anchoring energy 2EB of the second alignment film, and
    each of the polar anchoring energy 2EA and the azimuthal anchoring energy 2EB of the second alignment film is not greater than $1\times10^{-4}$ J/m$^2$.

2. The liquid crystal panel according to claim 1, wherein the second alignment film includes a polymer containing a silsesquioxane group.

3. The liquid crystal panel according to claim 1, further comprising a first polarizing plate on a side of the first substrate remote from the liquid crystal layer and a second polarizing plate on a side of the second substrate remote from the liquid crystal layer,
    wherein a polarization axis of the first polarizing plate is parallel to a polarization axis of the second polarizing plate.

4. The liquid crystal panel according to claim 1,
wherein the liquid crystal panel is in an Electrically Controlled Birefringence (ECB) mode.

5. The liquid crystal panel according to claim 1,
wherein the liquid crystal layer has a maximum retardation And of not less than 600 nm and not more than 1600 nm with voltage applied between the first electrode and the second electrode.

6. The liquid crystal panel according to claim 1,
wherein the liquid crystal layer has a thickness d of not smaller than 3 μm and not greater than 10 μm.

7. A liquid crystal display device comprising:
the liquid crystal panel according to claim 1 as a first liquid crystal panel; and
a second liquid crystal panel different from the first liquid crystal panel.

8. The liquid crystal display device according to claim 7,
wherein the second liquid crystal panel is in an In-Plane Switching (IPS) mode or a Fringe Field Switching (FFS) mode.

9. The liquid crystal display device according to claim 7,
wherein the second liquid crystal panel includes, sequentially from a back surface side toward a viewing surface side, a third substrate, a third alignment film, a second liquid crystal layer, a fourth alignment film, and a fourth substrate, and
the fourth alignment film has an azimuthal anchoring energy of not greater than $1 \times 10^{-5}$ J/m$^2$.

10. A liquid crystal panel comprising, sequentially from a back surface side toward a viewing surface side:
a first substrate including a first electrode;
a first alignment film consisting of a first region;
a liquid crystal layer containing liquid crystal molecules having a positive anisotropy of dielectric constant;
a second alignment film consisting of a second region facing the first region via the liquid crystal layer; and
a second substrate including a second electrode, wherein:
the second region overlaps the first region along a thickness direction of the first substrate or the second substrate,
the first alignment film and the second alignment film are different, so that a distribution of an anchoring energy of the first alignment film is not the same as a distribution of an anchoring energy of the second alignment film,
the liquid crystal molecules are homogeneously aligned with no voltage applied between the first electrode and the second electrode,
a polar anchoring energy 2EA and an azimuthal anchoring energy 2EB in the second region of the second alignment film are smaller than a polar anchoring energy 1EA and an azimuthal anchoring energy 1EB in the first region of the first alignment film, respectively,
the polar anchoring energy 2EA in the second region of the second alignment film is not greater than the azimuthal anchoring energy 2EB in the second region of the second alignment film,
the polar anchoring energy 1EA is the same in the first region of the first alignment film,
the azimuthal anchoring energy 1EB is the same in the first region of the first alignment film,
the polar anchoring energy 2EA is the same in the second region of the second alignment film, and
the azimuthal anchoring energy 2EB is the same in the second region of the second alignment film.

11. The liquid crystal panel according to claim 10,
wherein each of the polar anchoring energy 2EA and the azimuthal anchoring energy 2EB of the second alignment film is not greater than $1 \times 10^{-4}$ J/m$^2$.

12. The liquid crystal panel according to claim 10,
wherein the second alignment film includes a polymer containing a silsesquioxane group.

13. The liquid crystal panel according to claim 10,
wherein the liquid crystal panel is in an Electrically Controlled Birefringence (ECB) mode.

14. A liquid crystal display device comprising:
the liquid crystal panel according to claim 10 as a first liquid crystal panel; and
a second liquid crystal panel different from the first liquid crystal panel, wherein:
the second liquid crystal panel includes, sequentially from a back surface side toward a viewing surface side, a third substrate, a third alignment film, a second liquid crystal layer, a fourth alignment film, and a fourth substrate, and
the fourth alignment film has an azimuthal anchoring energy of not greater than $1 \times 10^{-5}$ J/m$_2$.

15. A liquid crystal panel comprising, sequentially from a back surface side toward a viewing surface side:
a first substrate including a first electrode;
a first alignment film consisting of a first region;
a liquid crystal layer containing liquid crystal molecules having a positive anisotropy of dielectric constant;
a second alignment film consisting of a second region facing the first region via the liquid crystal layer; and
a second substrate including a second electrode, wherein:
the second region overlaps the first region along a thickness direction of the first substrate or the second substrate,
the first alignment film and the second alignment film are different, so that a distribution of an anchoring energy of the first alignment film is not the same as a distribution of an anchoring energy of the second alignment film,
the liquid crystal molecules are homogeneously aligned with no voltage applied between the first electrode and the second electrode,
a polar anchoring energy 2EA and an azimuthal anchoring energy 2EB in the second region of the second alignment film are smaller than a polar anchoring energy 1EA and an azimuthal anchoring energy 1EB in the first region of the first alignment film, respectively,
the polar anchoring energy 2EA in the second region of the second alignment film is not greater than the azimuthal anchoring energy 2EB in the second region of the second alignment film, and
the polar anchoring energy 2EA in the second region of the second alignment film is not less than $10^{-10}$ times of the polar anchoring energy 1EA in the first region of the first alignment film and not greater than the polar anchoring energy 1EA in the first region of the first alignment film.

16. The liquid crystal panel according to claim 15,
wherein each of the polar anchoring energy 2EA and the azimuthal anchoring energy 2EB of the second alignment film is not greater than $1 \times 10^{-4}$ J/m$^2$.

17. The liquid crystal panel according to claim 15,
wherein the second alignment film includes a polymer containing a silsesquioxane group.

18. The liquid crystal panel according to claim 15,
wherein the liquid crystal panel is in an Electrically Controlled Birefringence (ECB) mode.

19. A liquid crystal display device comprising:
the liquid crystal panel according to claim 15 as a first liquid crystal panel; and
a second liquid crystal panel different from the first liquid crystal panel, wherein:
the second liquid crystal panel includes, sequentially from a back surface side toward a viewing surface side, a third substrate, a third alignment film, a second liquid crystal layer, a fourth alignment film, and a fourth substrate, and
the fourth alignment film has an azimuthal anchoring energy of not greater than $1 \times 10^{-5}$ J/m².

20. A liquid crystal panel comprising, sequentially from a back surface side toward a viewing surface side:
a first substrate including a first electrode;
a first alignment film consisting of a first region;
a liquid crystal layer containing liquid crystal molecules having a positive anisotropy of dielectric constant;
a second alignment film consisting of a second region facing the first region via the liquid crystal layer; and
a second substrate including a second electrode, wherein:
the second region overlaps the first region along a thickness direction of the first substrate or the second substrate,
the first alignment film and the second alignment film are different, so that a distribution of an anchoring energy of the first alignment film is not the same as a distribution of an anchoring energy of the second alignment film,
the liquid crystal molecules are homogeneously aligned with no voltage applied between the first electrode and the second electrode,
a polar anchoring energy 2EA and an azimuthal anchoring energy 2EB in the second region of the second alignment film are smaller than a polar anchoring energy 1EA and an azimuthal anchoring energy 1EB in the first region of the first alignment film, respectively,
the polar anchoring energy 2EA in the second region of the second alignment film is not greater than the azimuthal anchoring energy 2EB in the second region of the second alignment film, and
the azimuthal anchoring energy 2EB in the second region of the second alignment film is not less than $10^{-10}$ times of the azimuthal anchoring energy 1EB in the first region of the first alignment film and not greater than the azimuthal anchoring energy 1EB in the first region of the first alignment film.

21. The liquid crystal panel according to claim 20, wherein each of the polar anchoring energy 2EA and the azimuthal anchoring energy 2EB of the second alignment film is not greater than $1 \times 10^{-4}$ J/m².

22. The liquid crystal panel according to claim 20, wherein the second alignment film includes a polymer containing a silsesquioxane group.

23. The liquid crystal panel according to claim 20, wherein the liquid crystal panel is in an Electrically Controlled Birefringence (ECB) mode.

24. A liquid crystal display device comprising:
the liquid crystal panel according to claim 20 as a first liquid crystal panel; and
a second liquid crystal panel different from the first liquid crystal panel, wherein:
the second liquid crystal panel includes, sequentially from a back surface side toward a viewing surface side, a third substrate, a third alignment film, a second liquid crystal layer, a fourth alignment film, and a fourth substrate, and
the fourth alignment film has an azimuthal anchoring energy of not greater than $1 \times 10^{-5}$ J/m².

* * * * *